United States Patent [19]

Cohn

[11] 4,267,571
[45] May 12, 1981

[54] ENERGY CONSERVATION BY IMPROVED CONTROL OF BULK POWER TRANSFERS ON INTERCONNECTED SYSTEMS

[75] Inventor: Nathan Cohn, Jenkintown, Pa.

[73] Assignee: Network Systems Development Associates, Jenkintown, Pa.

[21] Appl. No.: 39,459

[22] Filed: May 16, 1979

[51] Int. Cl.³ .......................................... G06G 7/635
[52] U.S. Cl. ................................. 364/493; 290/4 R; 307/57
[58] Field of Search .................. 364/492, 493; 307/57; 290/4 R

[56] References Cited

U.S. PATENT DOCUMENTS

| 2,773,994 | 12/1956 | Cohn | 364/493 X |
|---|---|---|---|
| 2,831,125 | 4/1958 | Cohn | 307/57 X |
| 2,866,102 | 12/1958 | Cohn | 307/57 |
| 3,076,898 | 12/1963 | Cohn | 307/57 |
| 3,270,209 | 8/1966 | Cohn | 364/493 X |
| 3,701,891 | 10/1972 | Cohn | 364/492 |
| 3,898,442 | 8/1975 | Cohn | 364/492 |

OTHER PUBLICATIONS

Cohn: Power Systems Interconnections, Standard Handbook for El. Eng. 11th edit, Control of Generation and Power Flow–Sect. 16, McGraw-Hill, N.Y., 1978.
Cohn: Power System Control Practice, Ninth Annual Allerton Conference, Allerton Park, Il. Oct. 1971.
Cohn: Power Flow Control–Basic Concepts for Interconnected Systems Electric Light and Power, vol. 28, No. 8 & 9, 1950.
Cohn: Source Aspects of Tie-Line Bias Control on Interconnected Power Systems, Transact., AIEE, vol. 75, Pt. III, 1957.
Cohn: Textbook; Control of Generation and Power Flow on Interconnected Systems, Sec. Edit, John Wiley & Sons, N.Y. and London 1971.
1975 Annual Report, National Electric Reliability Council, Princeton, N.J., Apr. 1976.
Connor et al., Current Operating Problems Associated with Automatic Generation Control, Paper A77-810-5, IEEE/ASME/ASCE Joint Power Generation Conference, Los Angeles, Sep. 1977.
North American Power Systems Interconnection Committee, (NAPSIC), Operating Manual, Overall Revision Date Jun. 1979.
Cohn: Techniques for Improving the Control of Bulk Power Transfers on Interconnected Systems, IEEE Transactions Power App. and Systems, vol. PAS-90, No. 6, 1971.
Cohn: Energy Balancing on Interconnected Systems Proceedings of the American Power Conference, Chicago, vol. 35, 1973.
IEEE Standard Definition of Terms for Automatic Generation Control on Electric Power Systems, IEEE Publication, No. 94, 1965.
Cohn: Considerations in the Regulation of Interconnected Areas, IEEE Transactions on Power Apparatus and Systems, vol. PAS 86, No. 12, Dec. 1967.
Cohn: Some New Thoughts on Energy Balancing and Time Correction on Interconnected Systems, IEEE Control of Power Systems, Conference, Oklahoma City, Ok. Mar. 1976.
Cohn: Research Opportunities in the Control of Bulk Power and Energy Transfers on Interconnected Systems, Engineering Foundation Conference, Henniker, NH, Aug. 1976.
Cohn, Power Systems Time and Frequency, Leeds & Northrup Journal, Issue 7, Fall 1969, pp. 1-9.
La Veau; A New Time Standard, Leeds and Northrup Journal, Issue 7, Fall 1969, pp. 10-15.
Cohn; Who Does What to Whom in Interconnected Systems Control Annual General Meeting of the North American Power Systems Interconnection Committee, Toronto, Ontario, May 1978.
Cohn: New Considerations for Achieving More Reliable and Equitable Bulk Power Transfers, Technical Advisory Committee of the National Electric Reliability Council, Denver, Colorado, Jul. 1978.
Cohn: Bias Revisited, Presented to the East Control Systems Group of the North American Power Systems Interconnection Committee, St. Joseph, Michigan, Apr. 1970.
Cohn: Improving the Regulation of Bulk Power Transfers, Presented to the North American Power Systems Interconnection Committee, Las Vegas, Nevada, Sep. 1970.

*Primary Examiner*—Felix D. Gruber
*Attorney, Agent, or Firm*—Woodcock, Washburn, Kurtz, Mackiewicz & Norris

[57] ABSTRACT

This invention introduces the concept that on an interconnected electric power system, the area-caused components of memory parameters system time deviation and the total inadvertent interchange of each constitutent control area are separable and measurable. Methods and means are disclosed for separating each of the components and determining its magnitude, utilizing known or measurable parameters, thereby providing new long-desired area memory parameters which are precise measures of the control performance of each area. The portion of system time deviation and the portion, designated primary inadvertent, of total area inadvertent interchange caused by an area's own regulating deficiencies, and the portion, designated secondary inadvertent, of total area inadvertent interchange caused by regulating deficiencies of each remote area, are identified. Certain of the components are then utilized in their respective areas to provide unilateral simultaneous corrective control of said area's component of system time deviation, said area's primary component of area inadvertent interchange, and the secondary inadvertent components of area in advertent interchange of all remote areas caused by the regulating deficiencies of said area, doing so more effectively, more equitably and more economically than is possible with prevailing conventional control techniques.

64 Claims, 16 Drawing Figures

| EASTERN SYSTEM ||||
|---|---|---|---|
| JAN. 11, 1977 | HE 0700 CST || $\epsilon = -3.04$ SEC. |
| REGION | "CONTROL ERROR" | $I_{nn}$ | $\Delta$ |
| 1 | 162 | 138 | 24 |
| 2 | 8 | 9 | −1 |
| 3 | −735 | −581 | −154 |
| 4 | −1806 | −1404 | −402 |
| 5 | −185 | −161 | −24 |
| 6 | −181 | −136 | −45 |
| TOTAL | −2737 | −2135 | −602 |

FIG. 11

| SYSTEM AND AREA MEMORY PARAMETERS ||
|---|---|
| $\epsilon$ | SYSTEM TIME DEVIATION |
| $\epsilon_n$ | † AREA n COMPONENT OF $\epsilon$ |
| $I_n$ | AREA n NET INADVERTENT INTERCHANGE |
| $I_{nn}$ | † AREA n PRIMARY INADVERTENT |
| $I_{ni}$ * | † AREA n SECONDARY INADVERTENT |
| $I_{in}$ * | † AREA i SECONDARY INADVERTENT |

\* ONE FOR EACH REMOTE AREA i
† NEW

FIG. 4

| $I_n$ |||| 
|---|---|---|---|
| AREA n INADVERTENT INTERCHANGE<br>MAY BE + (ENERGY OUT) OR − (ENERGY IN) ||||
| $I_{nn}$<br>PRIMARY INADVERTENT<br>SELF CAUSED || *$I_{ni}$<br>SECONDARY INADVERTENT<br>REMOTELY CAUSED ||
| $I_{nn}$ IS<br>+ | $I_{nn}$ IS<br>− | $I_{ni}$ IS<br>+ | $I_{ni}$ IS<br>− |
| AREA<br>OVER-GENERATES | AREA<br>UNDER-GENERATES | AREA<br>OVER-GENERATES | AREA<br>UNDER-GENERATES |
| EXCESS ENERGY<br>OUT | EXCESS ENERGY<br>IN | EXCESS ENERGY<br>OUT | EXCESS ENERGY<br>IN |

* THERE IS AN $I_{ni}$ FOR EACH REMOTE AREA i, AND EACH MAY BE + OR − OR 0.

FIG. 5

| WESTERN SYSTEM |||||||
|---|---|---|---|---|---|---|
| FEB. 22, 1977 || HE 0400 PST ||| $\varepsilon = -0.24$ ||
| REGION n | $I_{n1}$ | $I_{n2}$ | $I_{n3}$ | $I_{n4}$ | $\Sigma I_{ni}$ ||
| 1 | — | 4.2 | − 5.9 | 13.9 | 12.1 ||
| 2 | 14.9 | — | − 4.7 | 11.1 | 21.3 ||
| 3 | 2.8 | 0.6 | — | 2.1 | 5.6 ||
| 4 | 2.4 | 0.5 | − 0.8 | — | 2.1 ||
| $-I_{nn}$ | 20.1 | 5.3 | −11.4 | 27.1 | 41.1 ||

FIG. 12

| EASTERN SYSTEM |||| 
|---|---|---|---|
| JAN. 11, 1977 | | HE 0700 CST | $\epsilon = -3.04$ SEC. |
| REGION | $\epsilon_n$ | $I_{nn}$ | $I_n$ |
| 1 | 0.189 | 138 | 644 |
| 2 | 0.012 | 9 | 223 |
| 3 | −0.821 | −581 | −179 |
| 4 | −2.021 | −1404 | −1205 |
| 5 | −0.206 | −161 | 141 |
| 6 | −0.193 | −136 | 376 |
| TOTAL | −3.040 | −2135 | 0 |

| WESTERN SYSTEM ||||
|---|---|---|---|
| FEB. 22, 1977 | | HE 0400 PST | $\epsilon = -0.24$ |
| REGION | $\epsilon_n$ | $I_{nn}$ | $I_n$ |
| 1 | −0.145 | −20.1 | −8 |
| 2 | −0.032 | −5.3 | 16 |
| 3 | 0.046 | 11.4 | 17 |
| 4 | −0.109 | −27.1 | −25 |
| TOTAL | −0.240 | −41.1 | 0 |

EASTERN SYSTEM

JAN.11, 1977  HE 0700 CST  $\epsilon = -3.04$ SEC.

| REGION n | $I_{n1}$ | $I_{n2}$ | $I_{n3}$ | $I_{n4}$ | $I_{n5}$ | $I_{n6}$ | $\Sigma I_{ni}$ |
|---|---|---|---|---|---|---|---|
| 1 | — | −2 | 129 | 317 | 32 | 30 | 506 |
| 2 | −13 | — | 57 | 142 | 15 | 13 | 214 |
| 3 | −34 | −2 | — | 366 | 37 | 35 | 402 |
| 4 | −37 | −2 | 160 | — | 40 | 38 | 199 |
| 5 | −20 | −1 | 87 | 215 | — | 20 | 302 |
| 6 | −34 | −2 | 148 | 364 | 37 | — | 512 |
| $-I_{nn}$ | −138 | −9 | 581 | 1404 | 161 | 136 | 2135 |

FIG.13

ENERGY CONSERVATION BY IMPROVED CONTROL OF BULK POWER TRANSFERS ON INTERCONNECTED SYSTEMS

BACKGROUND OF THE INVENTION

Conventional practice of adjacent electric power companies is to interconnect to share generation and reserves, and thereby improve reliability and economy of service to users. The power industry has grown extensively during the past fifty years, and so have interconnections. As described in my chapter "Power Systems Interconnections—Control of Generation and Power Flow" in the 11th edition of the Standard Handbook for Electrical Engineers, McGraw Hill, N.Y., 1978, there are currently three large interconnected systems in the contiguous United States and portions of Canada.

The largest is the Eastern Interconnected System, extending from east of the Rocky Mountain to the eastern seaboard, and embracing parts of Eastern Canada. It includes some 220 utility companies or agencies of varying sizes, some investor-owned, some publicly-owned, arranged in about 100 control areas in six regions. Its present generating capacity is about 400 million kilowatts.

The second interconnected system extends from the Rocky Mountains to the Pacific Coast, embracing portions of Western Canada. It includes some 53 utility companies or agencies arranged in 33 control areas in four regions. Its present generating capacity is about 100 million kilowatts.

The third of the interconnected systems is in the state of Texas. It has seven control areas, and a generating capacity of about 30 million kilowatts.

There are many complexities to the reliable and economic operation of an interconnected electric power system composed of many independently owned companies or agencies, extending over thousands of square miles of territory, containing dozens or hundreds of electrical generating units of varying types and sizes, with hundreds of miles of telemetering channels, and serving millions of customers. Over the years, many concepts, technologies and processes for operating, monitoring and automatically controlling such a system have been well developed, and generally well embraced and applied by the industry. There are, however, some aspects of operation and control, particularly as they relate to system time deviation and unscheduled power transfers between areas, and their corrections, which have not until now been fully or satisfactorily resolved. Such matters, which have become of particular importance in light of the escalation of fuel prices and the growing need for energy conservation, are addressed in this invention, and solutions disclosed.

A control area of an interconnected system is that portion of the system, generally a company or agency or a group of companies or agencies operating as a pool, which is expected automatically to adjust its generation to follow its load changes, and to schedule and maintain bulk power transfers with other areas.

Two principal operating objectives of an interconnected system operating under a set frequency schedule and with preset schedules of bulk power transfers between areas are:

(1) to be certain that user power demand, wherever on the system it occurs, is met, and (2) to allocate generation changes made in response to load changes to areas in which the load changes occurred.

Electric power systems are self-regulating. That is to say that self-regulating forces, which are the rotating masses of the system, the frequency coefficient of connected load, and the speed governors of turbine-generator units, act to maintain a balance between total system load and total system generation so long as generation capability is available somewhere on the system and load limits of equipment and lines are not reached. The nature of these self-regulating forces is discussed in my paper, "Power System Control Practices," Proceedings of the Ninth Annual Allerton Conference on Circuit and Systems Theory, Allerton Park, Ill. (1971). Load changes in any area are therefore accomodated initially by load and generation changes in all areas resulting in departures of system frequency and area net interchanges from their respective schedules.

Departures of system frequency integrate into system time deviation, hereinafter referred to as a "memory parameter" representing a summation of system frequency departures from schedule during a designated time period.

Departures of area net interchange from schedule integrate into area inadvertent interchange, also referred to hereinafter as a "memory parameter" representing a summation of area departures from net interchange schedule during a designated time period.

The self-regulating forces of an interconnected system thus fulfill the first principal operating objective of satisfying user demand wherever on the system it occurs. It does so, however, at the expense of system frequency, and by placing corresponding generation changes randomly among the areas of the system, depending on the frequency coefficient of area loads, and the number, sizes and speed-governor characteristics of the turbine-generator units in the various areas. To fulfill the second principal operating objective of allocating generation changes to areas where the changes in load demand occurred, a supplementary automatic control is required. Such a supplementary control is generally slower than the self-regulating forces, and in effect reallocates generation changes to the appropriate areas after the initial self-regulating accomodations of changes in demand.

It is accordingly conventional practice to equip each control area with supplementary control identified as "frequency-biased net interchange control" (sometimes referred to as net interchange bias control) for the regulation of bulk power transfers, i.e., power interchanges with other areas. Such controls have the following functions:

1. Adjust area generation to match changes in area load,

2. Maintain bulk power transfers on preset schedules as long as the system frequency is on its schedule, 3. Depart from preset transfer schedules as a function of frequency deviation when frequency departs from its schedule, thereby providing assistance to areas in need, 4. Participate in system frequency regulation, 5. Periodically correct for its own accumulated departures from interchange schedules, and 6. Correct periodically in concert with other areas for accumulated deviations in system time.

Frequency-biased net interchange control has been the standard operating technique in the United States, Canada and elsewhere in the world for more than thirty years. Its applicability and effectiveness for the first four of the six functions tabulated above, are well understood and documented, see my papers, "Power Flow Control—Basic Concepts for Interconnected Systems," Electric Light and Power, Chicago, Volume 28, Nos. 8 and 9 (1950), and "Some Aspects of Tie-Line Bias Control on Interconnected Power Systems," Transactions A.I.E.E., Vol. 75, Pt III (1957), and my book, "Control of Generation and Power Flow on Interconnected Systems," John Wiley & Sons, Second Edition (1971). On the other hand, present practices for items 5 and 6 related to corrections for accumulated departures from transfer schedules and time deviation are frequently inadequate and uneconomical, resulting in unnecessary regulation and corresponding waste of energy. I shall refer additionally later in this specification to these two items and to new concepts, methods and means for correction of present deficiencies.

In the application for a given area of frequency-biased net interchange control, measurements are made of system frequency and of the net of area power interchanges with other areas, settings are made of the system frequency schedule, the area net interchange schedule, and the area frequency bias setting, and from these parameters an area control error is determined. This in turn activates control apparatus which automatically adjusts the energy input to one or more turbine-generator units in the area so that area generation output is adjusted in magnitude and direction to reduce the area control error to zero. In this process:

$$E_n = (T_n - T_{on}) - 10 B_n (F - F_o) \quad (1)$$

where $E_n$ = the area control error of area n, in megawatts, $T_n$ = the measured net interchange of the area with other areas, in megawatts, power out is +, $T_{on}$ = the scheduled net interchange of the area, in megawatts, as preset, power out is +, $B_n$ = the frequency bias setting for the area in MW/0.1 Hz, and is considered to have a minus sign, F = system frequency in Hz, $F_o$ = the system frequency schedule in Hz, as preset.

The control signals which are to effect the change in generation of the area generators are usually derived by coordination of the area control error signal with a number of other measured or computed parameters so that the effectiveness of the control and the economy and the security of the area are optimized while the area control error is being reduced to zero. Systems utilizing frequency biased net interchange control coordinated with other area objectives are disclosed in my U.S. Pat. No. 2,773,994, issued Dec. 11, 1956, my U.S. Pat. No. 2,831,125, issued Apr. 15, 1958, my U.S. Pat. No. 2,866,102, issued Dec. 23, 1958, my U.S. Pat. No. 3,076,898, issued Feb. 5, 1963, and my U.S. Pat. No. 3,270,209, issued Aug. 30, 1966.

For hypothetically perfect operation, the interconnection will automatically achieve its scheduled frequency, and net interchanges for all areas will be on their respective schedules when the area control error for each area is zero, and the following criteria are fulfilled:

1. All portions of the interconnection are included in one area or another so that the sum of all area generation, loads and losses is the same as the total system generation, load and losses.

2. The algebraic sum of all area net interchange schedules is equal to zero.

3. A common scheduled frequency is used for all areas, and

4. There are no metering or computational errors.

Such criteria and the requirement of returning the area control error for each area to zero are not always fulfilled. The reasons are:

1. There may be errors or offsets in one or more areas in setting the frequency schedule.

2. There may be errors or offsets in one or more areas in setting the net interchange schedules.

3. There may be errors in one or more areas in measuring system frequency.

4. There may be errors in one or more areas in measuring area net interchange.

5. There may be computational errors in one or more areas in calculating area control error, or 6. One or more areas may be unable or unwilling to adjust area generation in manner that will reduce the respective area control error to zero.

Each of these deficiencies will cause deviations of system frequency from schedule and deviations of net interchanges from schedules Accumulations of frequency deviations from normal schedule become system time deviations, by:

$$\epsilon = \frac{3600}{F_r} \int_o^t (F - F_r)dt \quad (2)$$

where, $\epsilon$ = system time deviation, in seconds, $F_r$ = system reference frequency, in Hz, F = system frequency, in Hz, and t = time span in hours over which the time deviation has accumulated.

When system reference frequency is 60 Hz, Equation (2) becomes:

$$\epsilon = 60 \int_o^t (F-60)dt \quad (2a)$$

The term "regulating state" will be used to define the prevailing conditions within an area with respect to its control responsibilities. When an area is devoid of errors in setting its frequency and net interchange schedules, in measuring frequency and net interchange, and has zero area control error, which is to say it is without "regulating deficiencies," it will have a zero-error regulating state. The degree to which such regulating deficiencies exist within an area defines its regulating state, and results in a corresponding contribution by the area to system frequency deviation. Thus system time deviation may be regarded as related to the algebraic summation of the regulating states of all areas of the interconnected system during a designated time span.

Frequency-biased net interchange controls are cooperative controls, which not only act to reallocate the generation changes to the area where the load changes occurred, but cause other areas to provide generation assistance to the load change area until the latter responds to its own control system and makes the requisite generation changes. When, however, the area in which the load change occurred fails to properly adjust its generation, the system frequency deviation from schedule and the corresponding area net interchange deviations from respective schedules persist. System time deviation then continues to accumulate, as do inadvertent interchanges not only in the area responsible for the prevailing condition, but in all areas who are assisting it pending its own corrective action. While this condition of the load change area receiving assistance from the other areas persists, the load change area has a non-zero regulating state. Other areas are also accumulating inadvertent interchange, but if they are providing the preprogrammed assistance and have no other prevailing regulating deficiencies, they are in zero-error regulating states.

The portion of an area's total inadvertent interchange accumulation that is caused by the area's own non-zero regulating states is defined in this invention as "primary inadvertent." The portion of an area's total inadvertent interchange accumulation that is caused by the non-zero regulating states of other areas is defined as "secondary inadvertent."

System time deviation, being a summary of frequency deviations over a designated time span, may be regarded as a "system memory parameter."

Accumulations in area net interchange deviations from schedule are defined as "Inadvertent Interchange," which may be regarded as an "area memory parameter," and is given by:

$$I_n = \int_o^t (T_n - T_{on})dt \qquad (3)$$

where, $I_n$ = inadvertent interchange of area n, in megawatt hours, energy out being +, $T_n$ = net interchange of the area, in megawatts, power out being +, $T_{on}$ = net interchange schedule of the area, in megawatts, and t = time span in hours over which the inadvertent interchange has accumulated.

Significant or frequent accumulations of system time deviation or area inadvertent interchange are deemed by system operators as undesirable. Unscheduled assistance to areas having regulating deficiencies is costly to the assisting areas. Also, such accumulations create the need for costly corrective control action to counterbalance past accumulations so that system time deviation is reduced to acceptable limits for system synchronous clocks, and area inadvertent interchanges are reduced to zero. A reason for the latter requirement, is that current practice is for each area to transfer energy to or to receive energy from other areas to compensate for past accumulations of unscheduled interchanges between one another. The compensating transfers may be made when a unit of energy, because of the time of day and the prevailing loading of the area, may have a value substantially different than the value existent when the unscheduled transfer was made.

Further, unscheduled transfers may reduce or fully absorb the available capacity margins of interconnecting transmission lines, so that power transfers to areas in need during emergencies may not be possible.

Despite the general agreement by system operators that good regulation by each control area is a desirable objective, and assistance from other areas should be provided primarily during emergency periods, there has nevertheless been a "deterioration" in area control performance in recent years. This is reported in the 1975 Annual Report of the National Electric Reliability Council, Princeton, N.J., by the North American Power Systems Interconnection Committee (NAPSIC), a voluntary coordinating organization representing most of the interconnected utilities in the United States and portions of Canada. To monitor, to take steps to correct for such regulating deficiencies, and to provide control that will help avoid them, requires that means be available to determine which area or areas are at fault, and by how much. In other words, how much of the accumulated system time deviation was caused by the non-zero regulating states of which areas, and how much of an area's inadvertent interchange is due to its own ineffective operation and how much is the result of assistance cooperatively given to areas in need?

Failure of an area to regulate effectively is costly to other areas. A precise performance measure would make it possible to identify the area or areas at fault, to encourage them to improve control performance as justification for their participation in the interconnected system, and would provide a means for effective control by each area for its past faults and errors.

Many of the points raised or questions asked by authors Connor, Denny, Huff, Kennedy and Frank concerning area and system regulation in the paper, "Current Operating Problems Associated With Automatic Generation Control," Paper No. 77 810-5 presented at the IEEE/ASME/ASCE Joint Power Generation Conference, Los Angeles, CA, September 18-21, 1977, could be answered given the availability of a precise measure of area control performance. Although techniques for such measurements have been developed and some are still in use, a truly precise practical means for measuring area control performance has not been available in the more than thirty years that frequency-biased net interchange control for all areas of an interconnected system has been in use.

Two techniques are currently in use for checking area control performance. One involves an analysis of area control error, and is described in the "Control Performance Criteria" supplement to the NAPSIC "Operating Manual" dated 1973, revised 1977. This has distinct limitations, however, for as noted in the criteria itself, "it does not take into account errors in measurement, telemetering, schedules, etc." A second technique used by NAPSIC systems is a "Control Error Survey." Here computations are made for all areas over a designated time period of the difference between an area's total inadvertent interchange accumulation and the product of the area's bias setting times one-sixth the system time deviation. As will be shown later in this specification, this computation produces inaccurate results and hence an inaccurate comparison of the regulating effectiveness of each of the areas. Both of the NAPSIC techniques are described by contributing author Huff in the paper, "Current Operating Problems Associated with Automatic Generation Control" already referred to.

It will now be useful to examine and cite the limitations of the prevailing industry techniques for corrective control of accumulations in system time error and in area inadvertent interchanges prior to disclosing the improvements for such control provided by this invention.

As described in Operating Guide No. 4 of the NAPSIC Operating Manual, already referred to, system time deviation correction is achieved by all control areas offsetting frequency schedule in the direction that will adjust generation to speed up or slow down system frequency to counterbalance the accumulated time deviation. As noted in the Guide, all control areas are expected to participate in time deviation correction, on instructions from the central timekeeping area, American Electric Power Company at Canton, Ohio, and the frequency schedule offset at present is minus or plus 0.02 Hz when a plus or minus two second error has developed. In effect, a non-zero regulating state is established by all control areas to compensate for the previous non-zero regulating states in the opposite direction that caused the system time deviation.

This procedure, with minor variations, has been standard on U.S. and Canadian interconnections for more than thirty years. While it corrects system time, it has the disadvantage that all areas are expected to participate in the time correction action, with its accompanying regulation of generation, although not all areas have shared in creating the prevailing time deviation. I shall show that such participation by all areas is, for some of them, counterproductive not only because of the costly regulation it requires, but also because this very action creates elements of inadvertent interchange for those areas which did not share in creating the prevailing system time deviation, and their contribution to its correction amounts to the creation, for them, of a new error for which they must later regulate additionally, in the opposite direction, to correct, and in the process will be recreating a component of the original system time deviation.

Operating Guide No. 5 of the previously referred to Operating Manual of NAPSIC describes presently approved techniques for area inadvertent interchange corrective control. Two methods are recommended. The first is a bilateral approach, wherein one area with inadvertent interchange in one direction arranges with another area having inadvertent interchange to the opposite direction to offset their respective net interchange schedules by the same amount but in the opposite directions, thereby correcting the inadvertent interchange of both areas, without creating a change in system-frequency or time deviation. On the face of it, this appears like an appropriate procedure. I shall show, however, that in many cases it is not, because the total inadvertent interchange of an area may well be wholly or in part secondary inadvertent, due to regulating deficiencies of other areas, which only such other areas can correct. When an area endeavors to correct for the secondary component of inadvertent interchange caused by the primary component of inadvertent interchange of other areas, it cannot, as I shall show, do so, but instead is creating primary inadvertent interchange of its own for which it must later itself correct.

The second technique for inadvertent interchange corrective control approved by NAPSIC in Operating Guide No. 5 of the previously referred to Operating Manual, is for a single area, unilaterally, to correct for its total inadvertent interchange if it is in the direction that aids in the correction of existing time error. This also has limitations, since such corrective control for its own total inadvertent interchange by an area (1) may not actually be correcting for that portion of its total inadvertent interchange for which it itself is responsible, namely, its primary component which may well be of opposite algebraic sign to its total inadvertent interchange, and (2) to the extent that it is correcting for secondary components of its inadvertent interchange for which other areas are responsible, it will only be creating primary inadvertent interchange for itself and secondary components for others, all of which must later be correctively controlled. Also, correlation between inadvertent interchange of an area and prevailing system time error is not necessarily a correct correlation. As I will show, the correlation should be between that portion of total inadvertent interchange for which the area itself is responsible, its primary component, and that portion of system time deviation for which that area is itself responsible.

Thus the NAPSIC Operating Guides for system-wide time error corrective control and unilateral or bilateral inadvertent interchange corrective control, Nos. 4 and 5 respectively, may well result in improper control action which does not control for the parameters that the area needs to regulate, and will result in the need for further additional regulation later to undo that which the control action has improperly done. Generating units operate more efficiently where base loaded with fixed output, than when inputs are altered to obtain the varying output needed when regulating. Regulation consumes energy. The improved control techniques of this invention, which will reduce unnecessary or counterproductive regulation, will thereby result in energy conservation.

In a paper, "Techniques for Improving the Control of Bulk Power Transfers on Interconnected Systems," presented at the 1971 IEEE Winter Power Meeting and published in IEEE Transactions, Volume PAS-90, No. 6 (1971), hereinafter referred to as the "1971 paper" I made an analysis of the effects on frequency, net interchange, inadvertent interchange and system time deviation of various types of errors or control inadequacies in a given area. The same material, with slightly different symbology, discussed from the viewpoint of system operators, was presented under the title, "Energy Balancing on Interconnected Systems," at the 1973 American Power Conference and published in the Proceedings of that Conference, Volume 35, Chicago, IL, 1973.

The frequency-biased net interchange control equation,, Equation (1), was expanded in these publications to include area measuring and schedule setting errors and offsets as follows:

$$E_n = (T_n + \tau_{1n} - T_{on} - \tau_{on}) - 10B_n(F + \phi_{1n} - F_o - \phi_{on}) \tag{4}$$

where,
$\tau_{1n}$ = errors in measurement of $T_n$,
$\tau_{on}$ = errors or offsets in setting $T_{on}$,
$\phi_{1n}$ = errors in measurement of F,
$\phi_{on}$ = errors or offsets in setting $F_o$.

The following relationships were also outlined in the referenced papers:

$$\tau_n = \tau_{on} - \tau_{1n} \tag{4a}$$

where
$\tau_n$ = the algebraic sum of errors in $T_n$, and errors or offsets in $T_{on}$.

$$\phi_n = \phi_{on} - \phi_{1n} \tag{4b}$$

where,
$\phi_n$ = the algebraic sum of errors in F, and errors or offsets in $F_o$.

$$T'_n = T_n + \tau_{1n} \tag{4c}$$

where,
$T'_n$ is the area n net interchange as measured.

$$T'_{on} = T_{on} + \tau_{on} \tag{4d}$$

where,

T$'_{on}$ is the area n net interchange schedule as set.

$$F_n' = F + \phi_{In} \tag{4e}$$

where,

F$'_n$ is the area n frequency as measured.

$$F_{on}' = F_o + \phi_{on} \tag{4f}$$

where,

F$'_{on}$ is the area n frequency schedule as set.
From which:

$$E_n = (T_n' - T_{on}') = 10B_n(F_n' - F_{on}') \tag{4g}$$

From Equations (1), (4a) and (4b):

$$E_n = (T_n - T_{on} - \tau_n) - 10B_n(F - F_o - \phi_n) \tag{4h}$$

Reference will be made to these relationships as the disclosure proceeds.

In the same references, the equations developed for system time deviation and total area inadvertent interchange are indicative of the fact that each of these parameters is made up of components, each specifically related to a specific area. The equations are, however, in terms of unknown or non-measurable parameters such as $\tau_n$ and $\phi_n$, and though of theoretical interest, have not been of practical value.

As concerns the components of area inadvertent interchange, these have traditionally been identified as the "intentional" and "unscheduled" components, in "Definitions of Terminology for Automatic Generation Control on Electric Power Systems," IEEE Publication No. 94 (1965). The latter term is frequently referred to in power systems practice, as the "unintentional" components, as noted in my paper, "Considerations in the Regulation of Interconnected Areas," IEEE Transactions, Volume PAS-86, No 12 (1967).

The "intentional" inadvertent was intended to define the area schedule deviation that occurs when making an assisting frequency-biased contribution to other areas, because of unfulfilled needs existing there. An equation for this component appears in my aforementioned paper, "Considerations in the Regulation of Interconnected Areas," but as noted therein, applies only to the special case of an area having zero control error. There is, however, ambiguity in the current use of the terms "intentional" and "unintentional." For example, consider that an area offsets its net interchange or frequency schedule to correctively control for inadvertant interchange or time deviation. That constitutes an intentional offset, but since it is not a result of frequency bias action, the resultant inadvertent is not regarded as "intentional." Similarly, if an area consciously decides that it does not want to regulate effectively, that is an intentional decision but it results in "unintentional" or unscheduled inadvertent.

For this disclosure I will utilize the new terminology referred to earlier, namely, "primary inadvertent" for that component of total area inadvertent interchange that results from its own inadequacies, errors or schedule offsets which is to say, its own regulating deficiencies, while "secondary inadvertent" will refer to that component of an area's total inadvertent interchange that reflects responses to regulating deficiencies in remote areas.

Other techniques for correcting area inadvertent interchange and system time deviation accumulations, though not now in use, have been disclosed in my U.S. Pat. Nos. 3,701,891 (1972) and 3,898,442 (1975).

The first, recognizing that the algebraic sum of inadvertent interchange for all control areas of the interconnected system is zero, but pursuing the traditional concept that time correction and inadvertent interchange correction are separate objectives, suggested that inadvertent interchange correction take place at stipulated times with participation by all areas, and at the same time that system-wide correction of time deviation by all areas was taking place. Two characteristics of this proposed technique as disclosed in U.S. Pat. No. 3,701,891, are that all areas are to participate in the inadvertent interchange correction and the inadvertent interchange correction would not necessarily be completed in the same time span as would the time deviation correction. The technique of the second of the two U.S. Pat. No. 3,898,442, described also in my paper, "Some New Thoughts on Energy Balancing and Time Correction on Interconnected Systems," published in the Proceedings of the IEEE Region Five Conference on "Control of Power Systems," IEEE Publication T6CH1057-9REG5 (1976), while still considering two separate control objectives, and still specifying that all areas participate simultaneously in inadvertent interchange correction, defines relationships between the modifiers for the inadvertent interchange correction factors and the time deviation correction factors which insure that both sets of corrections would be completed in the same time span.

SUMMARY OF THE INVENTION

Recognizing that the memory parameter representing system time deviation accumulated over any designated time span consists of area components, equal in number to the number of control areas of the interconnected system, each such component resulting from regulating deficiencies, namely, control inadequacies, measuring or schedule setting errors or schedule setting offsets in its respective area, each component being algebraically plus or minus or equal to zero, and the algebraic sum of the components being equal to the magnitude of the system time deviation, it is an object of this invention to separate a particular area component of system time deviation from all remaining area components of system time deviation and to measure its magnitude independently of the magnitude of the remaining components utilizing known or measurable parameters, thereby providing a new memory parameter which is a precise measure in units of time of the control performance of that particular area over the designated time span. Such a precise performance measure, not heretofore available in interconnected systems operations, would enable the interconnected system to determine which areas are controlling ineffectively, with attendant adverse influences on system reliability and economy, and to act to stimulate improved control performance by such areas.

Further, recognizing that the memory parameter representing area total inadvertent interchange consists of components, equal in number to the number of control areas of the interconnected system, with one component, identified in this invention as the primary component of area inadvertent interchange resulting from regulating deficiencies, namely, control inadequacies, measuring or schedule setting errors, or schedule setting offsets, in its own area, and with each of the remaining components, identified in this invention as a secondary component of area inadvertent interchange resulting respectively from regulating deficiencies, namely, control inadequacies, and measuring or schedule setting errors or offsets in all other areas, the primary and each of the secondary components each being algebraically plus or minus or equal to zero and the algebraic sum of all of these components being equal to the magnitude of total area inadvertent interchange, it is an object of this invention to separate the primary inadvertent component of a given area from all secondary inadvertent components of that area's inadvertent interchange, thereby providing a new area memory parameter, representing the portion of area inadvertent interchange caused by that area itself, and which is a precise measure in units of energy of the control performance of the area over the designated time span. Thus the interconnected system will know the precise effect, in megawatt hours or equivalent, that regulating deficiencies in each area has had on the inadvertent interchange of all areas including its own, as well as the precise effect regulating deficiencies in each of the other areas have had on the inadvertent interchange of that area. Such precise measures of area control performance have not heretofore been available and like the new area component of system time deviation, will enable interconnected systems to more effectively monitor and more equitably, more reliably, and more economically control their operations.

It will be a further object of this invention to demonstrate that for each area there is a linear relationship unique to that area between the area component of system time deviation and the area primary component of area inadvertent interchange, with the relationship, when plotted, passing through the intersection of the zero coordinates. It will thus be another object of this invention to show that this relationship and the coincidence of zero values, makes it possible for interconnected systems to depart from the traditional practice of a "dual" control technique for each area, i.e., participation with other control areas at designated times in area-wide corrective control by all areas of system time deviation, and separate unilateral or bilateral corrective control of area inadvertent interchange, as defined and recommended in the previously referred to NAPSIC Operating Guides 4 and 5. Instead, it would be an object of this invention to define methods and means that will enable an area, independently of whatever control action or lack of control action then prevailed in other control areas, to undertake unilateral corrective control action based on its own prevailing area component of system time deviation or with equal effectiveness, its own prevailing primary component of area inadvertent interchange. In either case, corrective control based on that single new memory parameter will simultaneously, and without further corrective control action in its own area of elsewhere, correct for that area's component of system time deviation, that area's primary component of area inadvertent interchange, and the secondary components of inadvertent interchange in all other areas caused by that area.

The detailed information which this invention makes available on primary and secondary components of inadvertent interchange for all areas makes if possible for an interconnected system not only to monitor and seek control improvement by individual areas, but would permit the imposition of penalties on those areas who create regulating problems for, and impose unscheduled bulk power transfers with other areas and with rewards for those who are thus called upon to regulate additionally and to provide or absorb unscheduled bulk power transfers. To the extent that such a program improves area control performance for scheduled transfers and for corrective control of accumulations resulting from previous regulating deficiencies, there would be corresponding improvement in overall system reliability and economy.

In accordance with the foregoing objectives and in one preferred embodiment of the invention, an interconnected electric power system includes a plurality of control areas, each of the areas including at least one turbine-generator unit. The system operates under a set frequency schedule and a selected net interchange power transfer schedule for each of its constituent control areas. Each of the constitutent control areas utilizes a frequency-biased net interchange control system to fulfill its operating objective of maintaining a zero-error summation of its regulating states by automatically adjusting area generation in order to: match changes in area load, maintain area net interchange power transfers at a preset schedule when system frequency is on schedule, deviate from said area net interchange power transfer schedule as a function of system frequency deviation when system frequency deviates from schedule, participate in control of system frequency, participate in correction of accumulations in the system memory parameter representing system time deviation, and correct for accumulations in the area memory parameter representing area inadvertent interchange.

The system time deviation is a total measure of the algebraic summation during a designated time span of the regulating states in all areas of the interconnected system, and consists of and is equal to the algebraic sum of area-caused components of varying magnitudes and signs including zero, in number equal to the number of constitutent control areas, and each of which is an area memory parameter totally representative of the algebraic summation of the regulating states of the area during the designated time span, and each of which is separable from all other components independently of their respective magnitudes and algebraic signs, and the magnitude and sign of each is determinable utilizing known or measurable area and system parameters.

The improvement comprises the method of and apparatus for measuring and utilizing the area-caused component of system time deviation for a particular area. The particular area is identified by selecting the area parameters related thereto including the area frequency-bias setting and the area memory parameter representing the measured total inadvertent interchange accumulated during the designated time span. The selected area parameters are utilized in combination with system parameters common to all areas including the measured system time deviation accumulated during the designated time span and the sum of the frequency-bias settings for all areas, to separate and measure the magnitude and sign of a new area memory parameter representing the component of system time deviation caused by the algebraic summation of regulating states in the particular area during the designated time span, and which is a total measure in units of time deviation, of the control performance of said particular area during said designated time span. The area generation is controlled through adjustment of the energy input to one or more area turbine-generator units so as to create an area regulating state that will simultaneously reduce toward zero the new area memory parameter as well as the primary component of the total inadvertent interchange of the area representing the portion of area total inadvertent interchange self-caused by regulating deficiencies of the area, and the secondary component of total inadvertent interchange of each remote area representing the portion of total inadvertent interchange of each the remote area caused by the regulating deficiencies of said particular area, by offsetting the frequency schedule of the frequency biased net interchange control system of said particular area to an extent that is a function of said new area parameter.

In another preferred embodiment, the total inadvertent interchange of a particular area during a designated time span consists of and is equal to the algebraic sum of components in number equal to the number of constituent control areas, all of which components are memory parameters, each of which is caused respectively by the regulating deficiencies of an area of the interconnected system, one by the regulating deficiencies of the particular area and identified as the primary component of total inadvertent interchange of the particular area, and totally representative of the algebraic summation of the regulating states of the particular area during the designated time span, while each of the others, identified as a secondary component of the total inadvertent interchange of the particular area, is caused by the regulating deficiencies of a corresponding remote area of the interconnected system, and the primary component and each of the secondary components of the total inadvertent interchange of the particular area are individually separable from all other components independently of their respective magnitudes and algebraic signs, and the magnitude and sign of each is determinable utilizing known or measurable area and system parameters.

The improvement comprises the method of and apparatus for measuring and utilizing the area-caused primary component of area inadvertent interchange for a particular area. The particular area is identified by selecting the area parameters related thereto including the area frequency-bias setting and the area memory parameter representing measured total inadvertent interchange accumulated during the designated time span. The selected area parameters are utilized in combination with system parameters common to all areas including the measured system time deviation accumulated during the designated time span and the sum of the frequency-bias settings for all areas, to separate and measure the magnitude and sign of a new area memory parameter representing the primary component of total area inadvertent interchange caused by the algebraic sum of regulating states in the particular area during the designated time span, and which is a total measure, in units of energy, of the control performance of the area during the designated time span.

The area generation is controlled through adjustment of the energy input to one or more area turbine-generator units so as to create an area regulating state that will reduce toward zero the new area memory parameter representing the primary component of total area inadvertent interchange, as well as the area component of system time deviation and the secondary component of total inadvertent interchange in each remote area caused therein by the regulating deficiencies of the particular area, by offsetting the net interchange schedule of the frequency-biased net interchange control system of the particular area to an extent that is a function of the new area parameter representing the primary component of the total area inadvertent interchange of the particular area.

BRIEF DESCRIPTION OF THE DRAWINGS

FIG. 4 is a table of the system and area memory parameters and the symbols used for them in this disclosure. Two of the parameters, system time deviation and area net or total inadvertent interchange, are of long standing. The other four, marked with daggers, are new parameters representing, respectively, components of system time deviation and area inadvertent interchange.

FIG. 5 is a tabulation of area n inadvertent interchange components and conditions, showing how the algebraic signs of the primary and secondary components relate to over-generation and under-generation.

FIG. 6 is a table showing the system time deviation and regional inadvertent interchange accumulations for a periodic Regulation Survey of the Western Interconnected Systems, dated Feb. 22, 1977, and the regional components of system time deviation and primary inadvertent interchange later separated and measured by the techniques of this invention.

FIG. 7 is a table similar to FIG. 6, but for the Eastern Interconnected Systems based on the data for total system time deviation and regional inadvertent interchanges of the Control Error Survey of Jan. 11, 1977.

FIG. 11 is a table comparing the "control error" determined in accordance with the NAPSIC Control Survey method compared with the primary component of area inadvertent interchange determined in accordance with this invention, for the six regions of the Eastern System applied to the Jan. 11, 1977, Control Survey.

FIG. 12 is an extension of the tabulation of FIG. 6, showing the spectrum of the secondary inadvertent interchange components for each region caused by each of the other regions of the Western Interconnected System.

FIG. 13 is an extension of the tabulation of FIG. 7, showing the spectrum of the secondary inadvertent interchange components for each region caused by each of the other regions of the Eastern Interconnected System.

DESCRIPTION OF THE PREFERRED EMBODIMENT

Figure 1A:
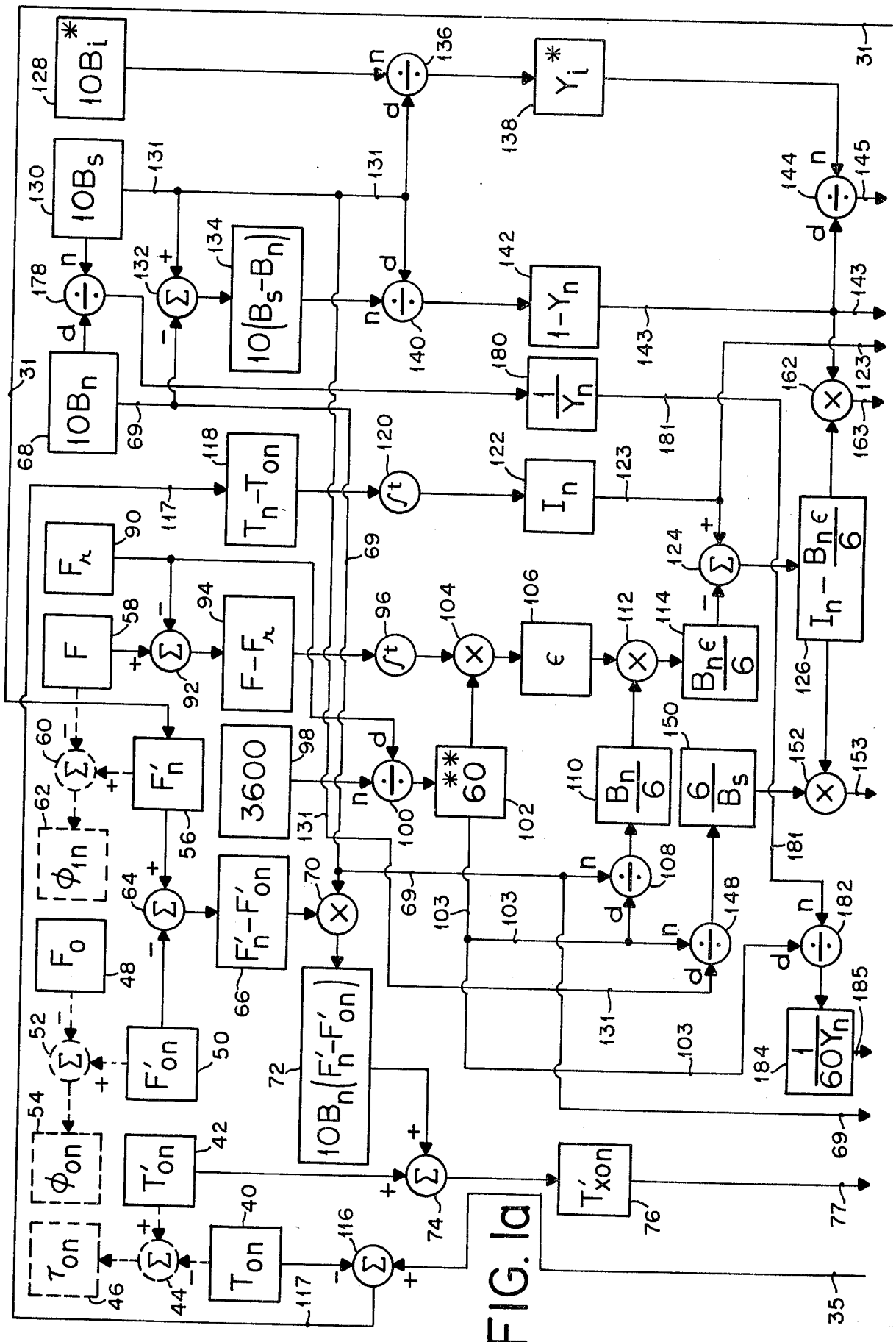
FIGS. 1a and 1b, taken together, are a block schematic representation for a typical area, n, of an interconnected system, showing the area generating facilities, the area connected load, the tie-lines with other areas, the generation control units, the utilization of known and measured parameters to separate and measure the magnitudes of the area n new component of system time deviation, the new primary component of its total inadvertent interchange and the new secondary component of inadvertent interchange it caused in other areas, and showing also use of either of the first two new parameters for unilateral corrective control to simultaneously reduce all three new parameters to zero.
Figure 1B:
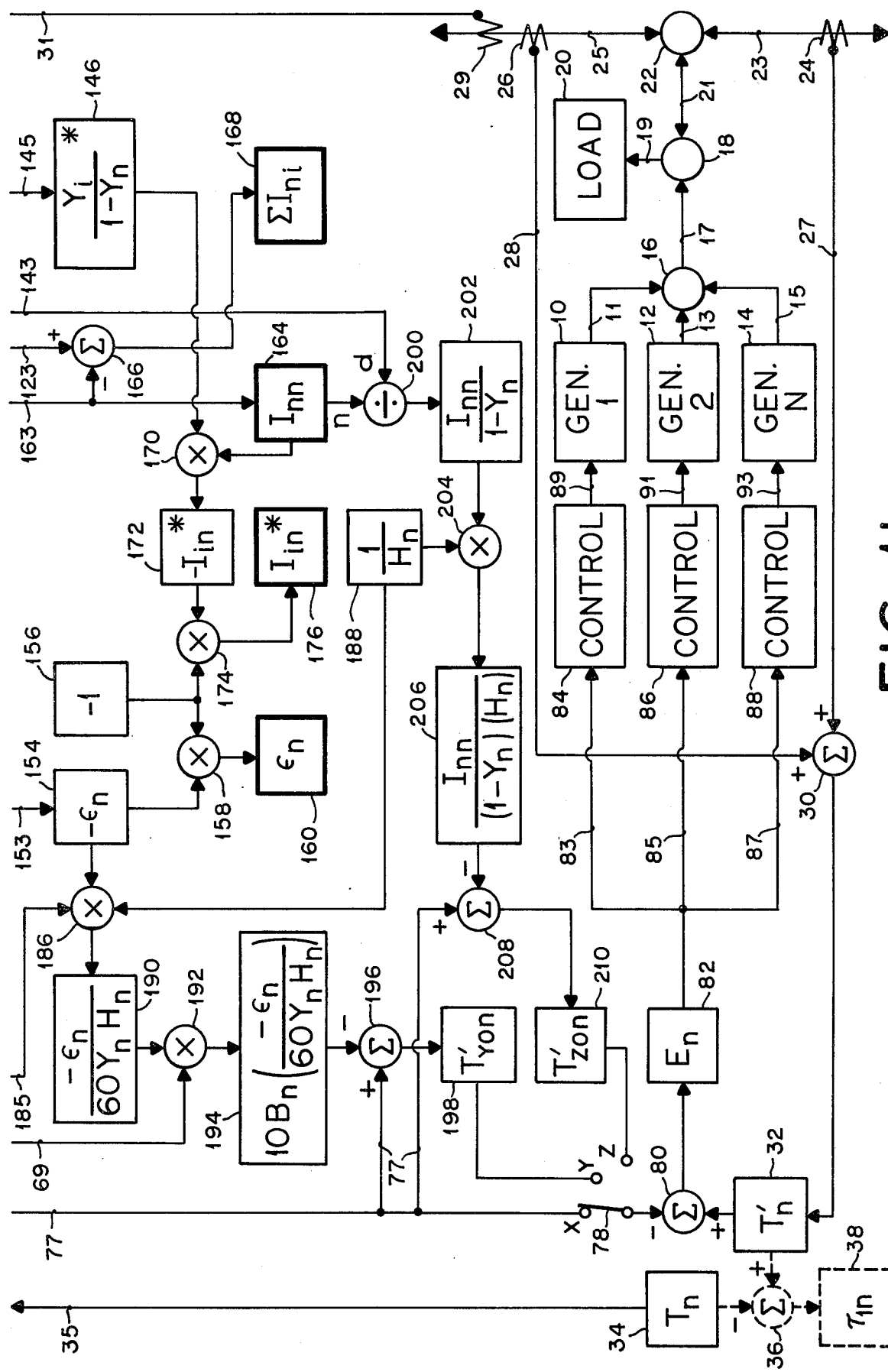
Figure 2:
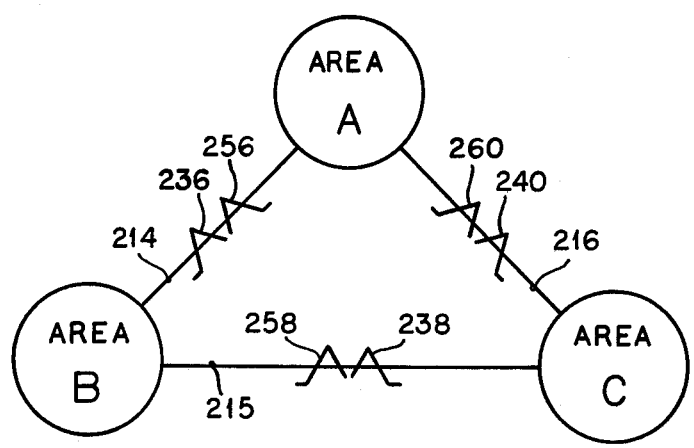
FIG. 2 is a representation of a three-area interconnected system.
Figure 3A:
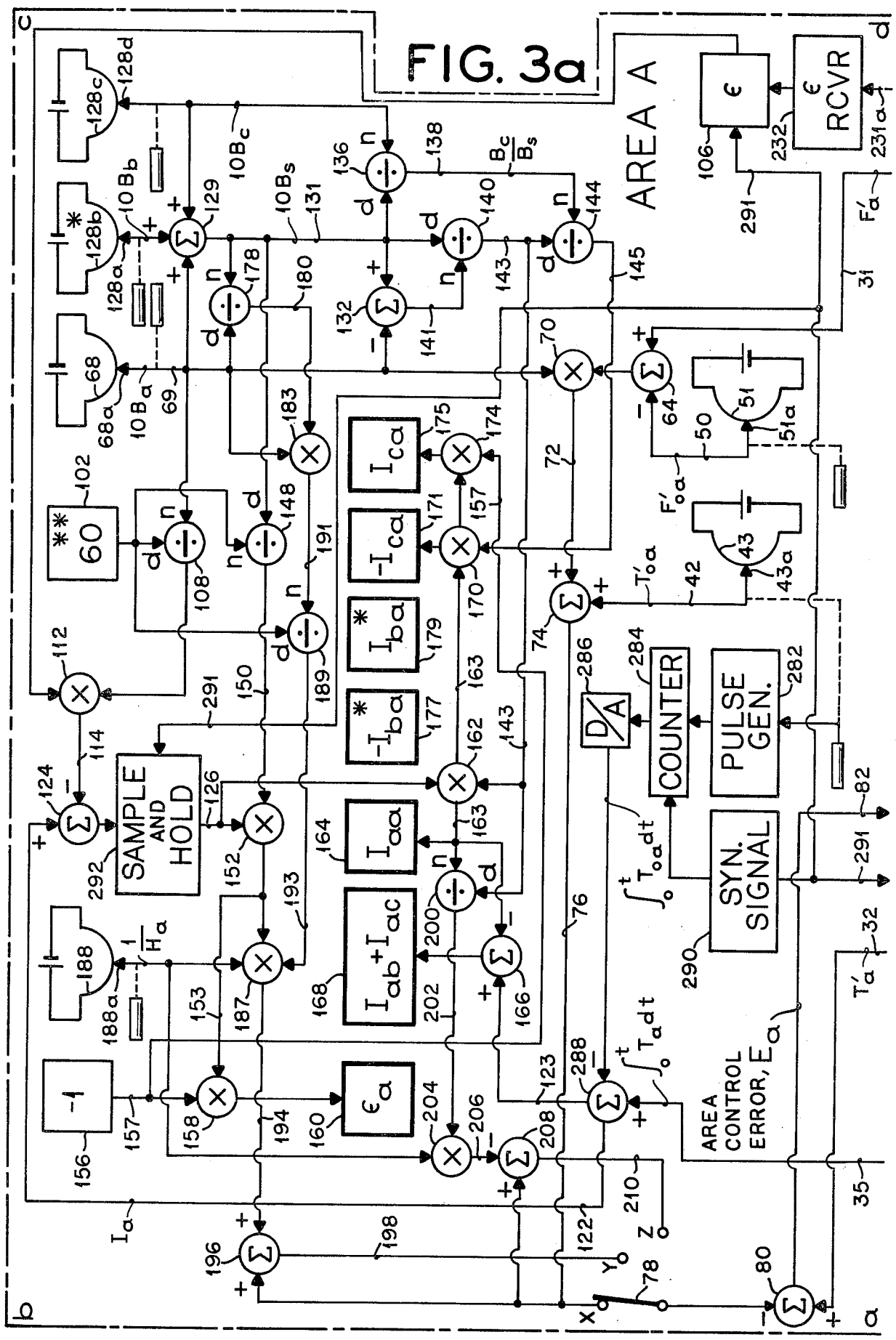
FIGS. 3a and 3b, taken together, are a detailed diagramatic representation of the three-area interconnected system of FIG. 2 showing the buses, interconnecting tielines and the interchange power and energy telemetering facilities for all three areas, and complete apparatus for one area, and partial for a second, utilizing the techniques of this invention for separating and measuring area components of system time deviation and inadvertent interchange, and using two of the components for unilateral simultaneous corrective control.
Figure 3B:
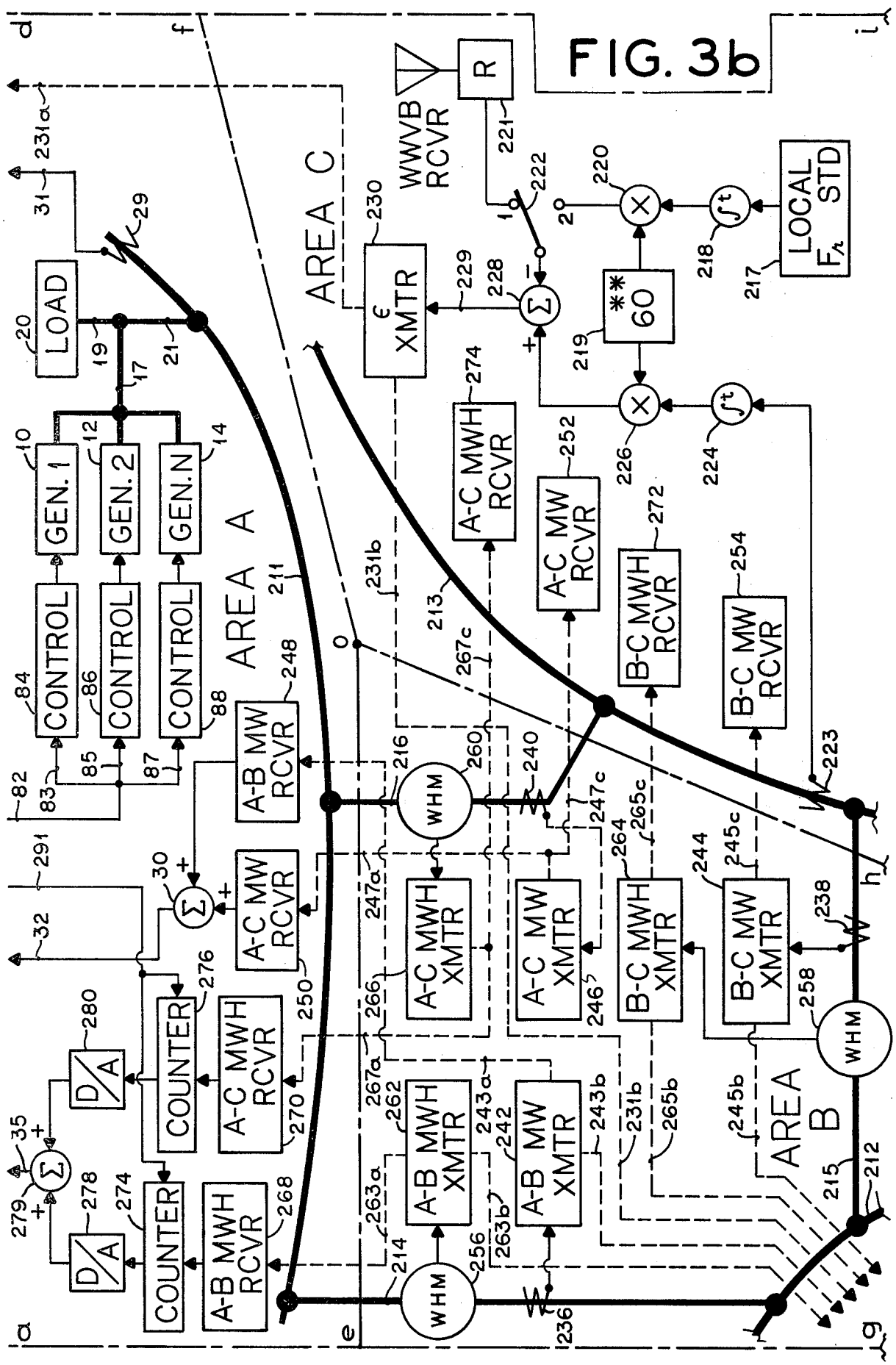

The principles on which my invention is based can be well understood by reference to the schematic block diagrams on FIGS. 1a and 1b, which, taken together, pertain to the arrangements applicable to a single area n of an interconnected system, and to the apparatus diagrams of FIGS. 3a and 3b whch pertain to arrangements applicable to the three-area interconnected system represented in simplified manner in FIG. 2. In FIGS. 1a and 1b area n includes a plurality of generating units, designated 10, 12 and 14, interconnected at 16 over lines 11, 13 and 15, to provide generation for area load 20 over lines 17 and 19, and also to provide or receive scheduled bulk power transfers at 18 to or from lines 21, 23 and 25, terminating at 22 and interconnecting area n with other areas of the system. Area n is equipped with a conventional frequency-biased net interchange control system which, with selector switch 78 in the X position, provides at block 82 a signal equal to area control error $E_n$, which through well known techniques is coupled over lines 83, 85 and 87 to control units 85, 86 and 88 which over lines 89, 91 and 93 adjust the level of energy input (fuel, air and water for steam units, water for hydro units) to the turbines of one or more of generating units 10, 12 and 14 respectively, so that the level of generation output for the area will reduce its area control error to zero. It will be understood that, though not shown, the area control error may be supplemented with additional widely known and used control features to provide economy, security and environmental dispatch for the area.

In position Y of switch 78, as will later be discussed, a factor related to the new area memory parameter, the area component of system time deviation, is utilized to offset the frequency schedule of the area frequency-biased net interchange control and is therefore part of the determination of area control error $E_n$, and provides the improved automatic corrective control of one or more of the area generating units 10, 12 and 14, which is one of the objectives of this invention.

Similarly, in position Z of switch 78, a factor related to the new memory parameter, the primary component of area inadvertent interchange, is utilized to offset the net interchange schedule of the area frequency-biased net interchange control and is therefore part of the determination of area control error, $E_n$, and provides the improved automatic corrective control of one or more of the area generating units 10, 12 and 14, which is one of the objectives of this invention.

It will be understood that control units 84, 86 and 88 each contain means with which operating personnel can turn the automatic control "on" or "off" for that particular generating unit.

On FIGS. 3a and 3b, taken together, the portion of the drawings bounded by a, b, c, d, f, o and e represents Area A. The portion bounded by e, o, h and g represents Area B, while the portion bounded by h, o, f and i represents Area C.

Area A generators are shown at 10, 12 and 14, the output of which on line 17 feeds area load 20 over line 19 and is interconnected over line 21 through area bus 211, and through tie lines 214 and 216 to Areas B and C respectively. Control assemblies in 84, 86, 88, which may be analog or digital systems, or combinations of the two, and are well known to practitioners in the art, regulate the output of one or more of generators 10, 12 and 14 respectively, based in part or in whole on inputs from the area control error, $E_a$, from line 82, and over lines 83, 85, and 87 respectively, operating to reduce area control error to zero.

Regulation of Area A by adjusting the energy input to one or more of the turbines of generating units 10, 12 and 14 to obtain the desired output of generation to reduce the area control error to zero may be in any of three modes, depending upon the position of selector switch 78. In position X regulation is by conventional frequency-biased net interchange control. In positions Y and Z, such conventional control is augmented by one of the corrective control factors disclosed in this invention, either of which provides at Area A simultaneous corrective control for the area component of system time deviation, the primary component of area inadvertent interchange and the secondary components of inadvertent interchange of Areas B and C caused by the primary inadvertent of Area A. In the case of switch position Y, the correction factor is based on the new parameter representing the Area A component of system time deviation. In switch position Z, the correction factor is based on the new parameter representing the primary component of Area A inadvertent interchange.

Before proceeding with further discussion of FIGS. 1a, 1b and 3a, 3b, an analysis of the characteristics and the regulating states of a control area with respect to its own control responsibilities and with respect to other control areas and to the system as a whole, will be helpful in understanding the nature and significance of the concepts on which the improvements in the electric power systems operations and control arts are provided by this invention.

A few words on the symbology used in this analysis may also be helpful. Standard symbology for the parameters related to power systems controls has not as yet been adopted by the engineering profession. The symbology used in this discussion is essentially that used in my most recent patents and technical papers already referred to. In FIG. 4 symbols have been assigned to the four new memory parameters introduced in this invention, and symbols not already used in this discussion are identified when initially used.

In my paper, "Techniques for Improving the Control of Bulk Power Transfers on Interconnected Systems," (1971), already referred to, there were developed equations for the effect on system frequency and system time deviation of various types of control inadequacies, measuring or schedule setting errors, or schedule setting offsets in any of the areas of an interconnected system. The equations were subsequently repeated and republished in a number of my technical papers. The equation for the effects on system frequency derived from Equation 4j of the aforementioned 1971 paper, and in slightly different but equivalent form for an interconnected system of N areas, is:

$$\Delta F = -\frac{1}{10B_s} \sum_{n=1}^{N} (E_n + \tau_n - 10B_n\phi_n) \tag{5}$$

where, $\Delta F = F - F_o$, the change in frequency in Hz caused by the summation of "E" errors (failure of an area to reduce its $E_n$ to zero), "tau" errors (errors in measuring area net interchange or setting net interchange schedules, or offsets in setting net interchange schedules), and "phi" errors (errors in measuring frequency or setting frequency schedules, or offsets in setting frequency schedules), in all N areas of the interconnected system, $$B_s = \sum_{n=1}^{N} B_n,$$

the total of frequency bias settings for all N areas of the interconnected system, in megawatts per one-tenth Hz, and has a minus sign.

The equation for system time deviation as a function of these same variables, based on integrating Equation (5) for a system having a reference frequency of $F_r$, in accordance with Equation (2) for time span t is:

$$\epsilon = -\frac{360}{B_s F_r} \sum_{n=1}^{N} ( \int_o^t E_n dt + \int_o^t \tau_n dt - 10B_n \int_o^t \phi_n dt) \tag{6}$$

For a 60 Hz system, this becomes:

$$\epsilon = -\frac{6}{B_n} \sum_{n=1}^{N} ( \int_o^t E_n dt + \int_o^t \tau_n dt - 10B_n \int_o^t \phi_n dt) \tag{6a}$$

Equations the equivalent of (5), (6) and (6a) have been widely published and circulated in recent years in my papers, handbook chapters and presentations. Inherent in them is the concept that system time deviation results from individual errors and offsets in the several areas of an interconnected system and hence is composed of area components directly caused by those errors. The NAPSIC practice currently continues to regard system time deviation as a single parameter to be correctively controlled by all areas. It should be noted, however, that even if the concept of components for system time deviation is drawn from these equations, it would lack practical value, for the equations include unknown and non-measurable variables. As already noted, it is an object of this invention to disclose techniquues which will permit the separation of an area component of system time deviation from the time deviation components of all other areas, and permit its measurement utilizing known or measurable parameters.

In comparable manner, equations for the effects of areas errors on area net interchange and area total inadvertent interchange were developed in my 1971 paper, "Techniques for Improving the Control of Bulk Power Transfers on Interconnected Systems," already referred to, and subsequently repeated in a number of my later technical papers and presentations. In each case the error effects were identified as components related to "local effects" and "remote effects." These relationships have not had practical value, however, since they contain unknown and non-measurable parameters.

Thus the concept of components in inadvertent interchange is not new, but there have not until now been available methods or means of separating the components or determining their magnitude. To provide such techniques is one of the objects of this invention.

The equation for the influence of regulating deficiencies, i.e., errors in all areas of the interconnected system on the net interchange of a particular area, n, in form slightly different from but equivalent to the 1971 equation is as follows:

$$\Delta T_n = (1 - Y_n)(E_n + \tau_n - 10B_n\phi_n) - Y_n \sum_{\substack{i=1 \\ i \neq n}}^{N} (E_i + \tau_i - 10B_i\phi_i) \tag{7}$$

where, $\Delta T_n = (T_n - T_{on})$, the change in area n net interchange, in megawatts, due to the sum of all E, tau and phi errors or offsets in all, N areas of the interconnected system; power out is +.

$Y_n$ = the ratio of area n frequency bias $B_n$ to $B_s$, the sum of all frequency bias settings for all areas.

i = subscript designating parameters for each area that is remote to area n.

Equation (7) may also be written:

$$\Delta T_n = (\frac{B_s - B_n}{B_s})(E_n + \tau_n - 10B_n\phi_n) - Y_n \sum_{\substack{i=1 \\ i \neq n}}^{N} (E_i + \tau_i - 10B_i\phi_i) \tag{7a}$$

The relationship of area n inadvertent interchange, $I_n$, to all E, tau and phi errors in its own area and all areas i, developed by integrating Equation (7) in accordance with Equation (3) for time span t, is:

$$I_n = (1 - Y_n)( \int_o^t E_n dt + \int_o^t \tau_n dt - 10B_n \int_o^t \phi_n dt) - Y_n \sum_{\substack{i=1 \\ i \neq n}}^{N} ( \int_o^t E_i dt + \int_o^t \tau_i dt - 10B_i \int_o^t \phi_i dt) \tag{8}$$

Equation (8) may also be written:

$$I_n = (\frac{B_s - B_n}{B_s})(\int_0^t E_n dt + \int_0^t \tau_n dt - 10B_n \int_0^t \phi_n dt) - Y_n \sum_{\substack{i=1 \\ i \neq n}}^{N} (\int_0^t E_i dt + \int_0^t \tau_i dt - 10B_i \int_0^t \phi_i dt) \quad (8a)$$

Refer now to the table of FIG. 4 for the symbology of the new memory parameters related to the components of system time deviation and area inadvertent interchange for which means and methods are to be disclosed to permit their separation and measurement. The first line of the table shows the symbol, $\epsilon$, already used in this disclosure for the memory parameter system time deviation.

In the second line, the component of system time deviation for area n is designated $\epsilon_n$. For other areas such as a, b, c or i, the corresponding subscript is used.

From the discussion thus far it will be clear that the following relationship for $\epsilon$ and its components on an interconnected system of N areas applies:

$$\epsilon = \sum_{n=1}^{N} \epsilon_n \quad (9)$$

Next, area inadvertent interchange and its components will be examined. The third line of the table shows the symbol $I_n$, already used in this disclosure for the area memory parameter, total area inadvertent interchange.

Where double subscripts are used to define components of area inadvertent interchange, the first subscript will define the area in which the component exists, and the second subscript will identify the area responsible for causing that component. Thus, in the fourth line of the table, the symbol, $I_{nn}$, represents the component of inadvertent interchange in area n caused by area n and hence is the primary component of inadvertent interchange in area n.

In the fifth line the component of inadvertent interchange, $I_{ni}$, represents a component in area n caused by remote area i, and hence is a secondary component of inadvertent interchange in area n.

From the foregoing, the following relationship will be clear:

$$I_n = I_{nn} + \sum_{\substack{i=1 \\ i \neq n}}^{N} I_{ni} \quad (10)$$

Equation (10) states the inadvertent interchange of area n in an interconnected system of N areas is the algebraic sum of its primary inadvertent and its (N−1) components of secondary inadvertent, each caused by the primary inadvertent of a remote area, i.

In the sixth line the symbol, $I_{in}$, represents a secondary component of inadvertent interchange caused at area i by the primary inadvertent of area n. The following relationship applies:

$$I_{nn} = - \sum_{\substack{i=1 \\ i \neq n}}^{N} I_{in} \quad (11)$$

Equation (11) states that the primary inadvertent of area n is equal to minus the arithmetic sum of the secondary inadvertent components it causes in (N−1) remote areas i. The minus sign prevails since primary inadvertent "out"(+) from area n, causes secondary inadvertent "in"(−) in all remote areas i.

A relationship for area inadvertent interchange in terms of area errors and system time deviation was defined in my previously referred to 1971 IEEE paper, "Techniques for Improving the Control of Bulk Power Transfers on Interconnected Systems," and was also included in my papers, "Energy Balancing on Interconnected Systems," (1973) already referred to; and, "Research Opportunities in the Control of Bulk Power and Energy Transfers on Interconnected Systems," Proceedings of the Engineering Foundation Conference, Electric Power Research Institute Publications EL-377-SR, Palo Alto, Calif, (1977). It is used in this invention. It serves as the means of converting the relationships for area components to practical use, substituting known and measurable parameters for the unmeasurable variables, thereby making possible the steps of separating the area component of system time deviation and the primary component of area inadvertent interchange of a particular area from the remaining components in system time deviation and area inadvertent interchange respectively, measuring their respective magnitudes, and applying either of them to area corrective control. It also leads to the steps of separating and measuring the magnitude of the secondary components of inadvertent interchange in each of the other areas caused by the primary component of a particular area, and utilizing these secondary components to evaluate the unscheduled energy flows between each pair of areas.

This relationship for area n of an interconnected system having a frequency reference, $F_r$, is:

$$I_n = \int_0^t E_n dt + \int_0^t \tau_n dt - 10B_n \int_0^t \phi_n dt + \frac{B_n F_r \epsilon}{360} \quad (12)$$

Equation (12) for a 60 Hz system becomes:

$$I_n = \int_0^t E_n dt + \int_0^t \tau_n dt - 10B_n \int_0^t \phi_n dt + \frac{B_n \epsilon}{6} \quad (12a)$$

Which may also be written:

$$I_n - \frac{B_n \epsilon}{6} = \int_0^t E_n dt + \int_0^t \tau_n dt - 10B_n \int_0^t \phi_n dt \quad (12b)$$

Equation (12) may be transposed to read:

$$I_n - \frac{B_n F_r \epsilon}{360} = \int_0^t E_n dt + \int_0^t \tau_n dt - 10B_n \int_0^t \phi_n dt \quad (12c)$$

Now, rewriting Equation (9) to set forth the area component of system time deviation for a particular area n as separated from the summation of the area components of system time deviation for all remaining areas i, results in:

$$\epsilon = \epsilon_n + \sum_{\substack{i=1 \\ i \neq n}}^{N} \epsilon_i \quad (13)$$

Rewriting Equation (6) to conform with the separation of terms in Equation (13), the following is obtained for an interconnected system having a reference frequency $F_r$:

$$\epsilon = -\frac{360}{B_s F_r} \left( \int_0^t E_n dt + \int_0^t \tau_n dt - 10 B_n \int_0^t \phi_n dt \right) - \frac{360}{B_s F_r} \sum_{\substack{i=1 \\ i \neq n}}^{N} \left( \int_0^t E_i dt + \int_0^t \tau_i dt - 10 B_i \int_0^t \phi_i dt \right) \quad (14)$$

From which, noting that all the terms in the first parenthetical expression pertain to area n and none therein pertains to areas i, and that all terms in the second parenthetical expression pertain to area i and none therein pertains to area n, the relationship for the area component of system time deviation for any area n becomes:

$$\epsilon_n = -\frac{360}{B_s F_r} \left( \int_0^t E_n dt + \int_0^t \tau_n dt - 10 B_n \int_0^t \phi_n dt \right) \quad (15)$$

Having now separated the area n component from all other area components of system time deviation, the next step is to utilize the relationships of Equation (12c) to substitute known and measurable parameters for the unmeasurable parameters in Equation (15). This is done by substituting the left-hand portion of Equation (12c) for the parenthetical expression of Equation (15), yielding:

$$\epsilon_n = -\frac{360}{B_s F_r} \left( I_n - \frac{B_n F_r \epsilon}{360} \right) \quad (16)$$

which, for a 60 Hz system becomes:

$$\epsilon_n = -\frac{6}{B_s} \left( I_n - \frac{B_n \epsilon}{6} \right) \quad (16a)$$

In similar manner the primary component of inadvertent interchange of a particular area n, may be separated from the total inadvertent interchange of that area by applying the relationships of Equation (10) to the relationships of Equation (8), noting that in Equation (8) the first two parenthetical terms contain parameters related only to area n, while the remainder of the right-hand side of the equation contains parameters related only to areas i, yielding:

$$I_{nn} = (1 - Y_n) \left( \int_0^t E_n dt + \int_0^t \tau_n dt - 10 B_n \int_0^t \phi_n dt \right) \quad (17)$$

The relationships of Equation (17) separate the area n primary component of inadvertent interchange from all of the secondary components of inadvertent interchange of the area, and there remains now the need to alter Equation (17) so that known or measurable parameters replace the unmeasurable variables currently in it. This step is taken by substituting the left-hand side of Equation (12c) for the second parenthetical term of Equation (17), yielding for a system having a reference frequency of $F_r$:

$$I_{nn} = (1 - Y_n)\left(I_n - \frac{B_n F_r \epsilon}{360}\right) \quad (18)$$

Which, for a 60 Hz system becomes:

$$I_{nn} = (1 - Y_n)\left(I_n - \frac{B_n \epsilon}{6}\right) \quad (18a)$$

Equation (18a) may also be written:

$$I_{nn} = \frac{B_s - B_n}{B_s}\left(I_n - \frac{B_n \epsilon}{6}\right) \quad (18b)$$

It will be clear that the system memory parameter total system time deviation, in seconds, accumulated over a designated time span is related to the algebraic summation of regulating states as they have occurred in all system areas during that time span. Similarly, the area memory parameter, the total inadvertent interchange, in megawatt hours, accumulated for that same time span in a particular area is related to the algebraic summation of regulating states in that area and in all other areas of the interconnected system. Using these memory parameters along with data on system and area frequency bias settings, Equation (16) provides the new area memory parameter, the area component of system time deviation which is related to the summation of regulating states of that area itself, regardless of the concurrent and past regulating states of other areas. Also, Equation (18), utilizing the same memory parameters and system and area frequency bias settings as Equation (16), separates the primary component of inadvertent interchange from all secondary components of that area, and determines the magnitude of the primary component, which is related to the summation of regulating states in that area during the designated time span, regardless of the concurrent or past regulating states in other areas.

For a specific area n, there are unique relationships between these two new area memory parameters. These can readily be derived for a 60 Hz system from Equations (16a) and (18a) and are as follows:

$$I_{nn} = -\frac{(1 - Y_n)(B_s)\epsilon_n}{6} \quad (19)$$

or, $$I_{nn} = -\frac{(B_s - B_n)\epsilon_n}{6} \quad (19a)$$

Also, $$\epsilon_n = \frac{-6 I_{nn}}{(1 - Y_n) B_s} \quad (20)$$

or, $$\epsilon_n = -\frac{6 I_{nn}}{B_s - B_n} \quad (20a)$$

From the foregoing relationships it will be clear, bearing in mind that frequency bias always has a minus algebraic sign, that $\epsilon_n$ and $I_{nn}$, as would from the earlier discussion be expected, always have the same algebraic sign, and when one is zero the other is zero. This latter point will be of particular importance in the later discussion on improved corrective control techniques.

Considering now secondary components of inadvertent interchange accumulations, it will be clear that for a specific remote area i, its primary component of inadvertent interchange, $I_{ii}$, can be separated from its own secondary inadvertents by proper choice of parameters, and the magnitude can be determined in accordance with the following relationship, which for a 60 Hz system is comparable for remote area i to Equation (18a) which applied to a particular local area n:

$$I_{ii} = (1 - Y_i)(I_i - \frac{B_i\epsilon}{6}) \qquad (21)$$

The influence of the area i primary component of inadvertent interchange, $I_{ii}$, on area n is to create a secondary inadvertent component, $I_{ni}$, which by separation from the second half of the right-hand side of Equation (8), becomes:

$$I_{ni} = -Y_n(\int_0^t E_i dt + \int_0^t \tau_i dt - 10B_i \int_0^t \phi_i dt) \qquad (22)$$

Using relationships of Equation (22) and the equivalent of Equation (12c) for area i, this becomes, for a 60 Hz system:

$$I_{ni} = -Y_n(I_i - \frac{B_i\epsilon}{6}) \qquad (23)$$

Which, coordinated with Equation (21) becomes:

$$I_{ni} = -\frac{Y_n I_{ii}}{(1 - Y_i)} \qquad (23a)$$

Similarly, the secondary inadvertent component, $I_{in}$, at remote area i, caused by the primary component of inadvertent interchange $I_{nn}$ at particular local area n is given by:

$$I_{in} = -\frac{Y_i}{1 - Y_n}(I_{nn}) \qquad (24)$$

Bearing in mind the relationship between $\epsilon_n$ and $I_{nn}$ shown in Equation (19), Equation (24) can also be written:

$$I_{in} = (B_i/6)\epsilon_n \qquad (25)$$

The use of the new area memory parameters representing the area components of system time deviation and the primary component of area inadvertent interchange to automatically adjust area generation output of a particular area for simultaneous corrective control of the area component of system time deviation, of the primary component of area inadvertent interchange, and of the secondary components of inadvertent interchange in all remote areas caused by the particular area's primary component of inadvertent interchange will now be discussed. Such simultaneous control can be achieved with either an appropriate offset of area frequency schedule based on the magnitude of the area component of system time deviation, or by an appropriate offset of area net interchange schedule based on the magnitude of the primary component of the inadvertent interchange of the area. Only one of the offsets need be used. The frequency schedule offset will be considered first.

Let the desired frequency schedule offset for area n be represented by $\hat{\phi}_n$. The area control operating equation, Equation (4g), it being understood that $\hat{\phi}_n$ is separate and independent of any phi errors already included in $F'_{on}$ in accordance with Equation (4f), becomes:

$$E_n = (T_n - T_{on}) - 10B_n(F_n - F_{on} - \hat{\phi}_n) \qquad (26)$$

It will be clear from Equation (5) that the individual effect of a frequency schedule offset of $\hat{\phi}_n$ in Equation (26) will result, on operation of the area control, in a system frequency deviation of:

$$\Delta F = Y_n \hat{\phi}_n \qquad (27)$$

On a system with frequency reference $F_r$, and with the frequency schedule shift to persist for a length of time, $H_n$ in hours, the magnitude of the desired frequency schedule shift, $\hat{\phi}_n$, to correct for the area component of system time deviation $\epsilon_n$ by causing an area regulating state that will create an equal and algebraically opposite area component of system time deviation in time $H_n$, is given by:

$$\hat{\phi}_n = -(F_r \epsilon_n / 3600 Y_n H_n) \qquad (28)$$

Which, for a 60 Hz system is:

$$\hat{\phi}_n = -(\epsilon_n / 60 Y_n H_n) \qquad (28a)$$

Control equation, Equation (26), including the unilateral shift in frequency schedule offset for area n, which will correct for that area's component of system time deviation in $H_n$ hours, for a 60 Hz system, will be as follows:

$$E_n = (T_n' - T_{on}') - 10B_n(F_n' - F_{on}' + \frac{\epsilon_n}{60 Y_n H_n}) \qquad (29)$$

Bearing in mind that $Y_n = B_n/B_s$, Equation (29) may also be written:

$$E_n = (T_n' - T_{on}') - 10B_n(F_n' - F_{on}') - \frac{B_s \epsilon_n}{6 H_n} \qquad (29a)$$

It is to be noted that the area control containing the frequency schedule corrective factor based on the area component of system time deviation, will correct in time $H_n$ not only for the area component of system time deviation, and will also, with the same control action, correct for the primary component of inadvertent interchange in its own area, and also correct in all other areas for the secondary components of inadvertent interchange caused by the area n primary component of inadvertent interchange.

The use of area n primary component of inadvertent interchange as the basis for unilateral corrective control in area n will now be discussed.

To achieve corrective control for a primary inadvertent interchange component of $I_{nn}$, it will be desired to shift the net interchange represented by $\Delta T_n$ in megawatt hours, over the time span, $H_n$, in hours, by the following relationship:

$$\Delta T_n = -(I_{nn}/H_n) \qquad (30)$$

Let the desired net interchange schedule offset for area n be represented by $\hat{\tau}_n$. The area control operating equation, Equation (4g), it being understood that $\hat{\tau}_n$ is separate and independent of any tau errors already included in $T'_{on}$ in accordance with Equation (4d), becomes:

$$E_n = (T'_n - T_{on} - \hat{\tau}_n) - 10B_n(F_n - F_{on}) \tag{31}$$

It will be clear from Equation (7) that the individual effect of the insertion of the corrective factor $\hat{\tau}_n$ in Equation (31) will produce, on operation of the area control system, a change in net interchange $\Delta T_n$ of the area as follows:

$$\Delta T_n = (1 - Y_n)\hat{\tau}_n \tag{32}$$

With the net interchange schedule shift to persist for a length of time, $H_n$, in hours, the magnitude of the desired change in net interchange to correct for the primary component of area inadvertent interchange, $I_{nn}$, by causing an area regulating state that will create an equal and algebraically opposite primary component of area inadvertent interchange in time $H_n$, is given by:

$$\hat{\tau}_n = \frac{-I_{nn}}{(1 - Y_n)(H_n)} \tag{33}$$

Replacing $\hat{\tau}_n$ in area n control Equation (31) with the equivalent expression of Equation (33), yields the following:

$$E_n = (T_n' - T_{on}' + \frac{I_{nn}}{(1 - Y_n)(H_n)}) - 10B_n(F_n' - F_{on}') \tag{34}$$

It will now be clear that corrective control in area n based on Equation (34), like the corrective control based on Equation (29) will, with simultaneous control action, correct for the primary component of inadvertent interchange of area n, the area n component of system time deviation, and the secondary components of inadvertent interchange in all other areas of the interconnected system caused by the primary component of inadvertent interchange of area n. The present practice of separate system-wide control of system time deviation with all control areas simultaneously making a common frequency schedule offset and separate unilateral or bilateral area corrections of area total inadvertent interchanges can be discarded, and replaced with the more equitable, effective and economic corrective control from either the area component of system time deviation of the area primary component of inadvertent interchange as disclosed in this invention.

Bearing in mind that thee area n component of system time deviation and the area n primary component of inadvertent interchange area caused by errors and offsets in area n, it follows that they can be corrected only by errors or offsets in the opposite direction in area n, and hence the corrective control techniques that have just been described are effective independently of whatever control action or lack of it is taking place concurrently in other areas of the interconnected system.

Turning back now to FIGS. 1a and 1b, the schematic block diagram for the invention will be reviewed. The two figures are to be taken together and it will be noted that each line that leaves FIG. 1a at its bottom has a correspondingly numbered line at the top of FIG. 1b, indicating the continuity between the two figures.

A first step is to identify the area for which the area component of system time deviation and the area primary and secondary components of area inadvertent interchange are to be separated. In FIGS. 1a and 1b this area is identified as area n. The next steps are to identify the time period over which the accumulated magnitudes of the several components of the area are to be determined, designated t in FIGS. 1a and 1b, and to identify the parameters, known or measurable, to be used in determining the magnitude of the components. These are: system time deviation; epsilon, at block 106; area inadvertent interchannge, $I_n$, at block 122; the frequency bias setting for area n, $10B_n$, at block 68; the individual frequency bias settings for remote areas, $10B_i$, shown for one area i at block 128, the asterisk in the block indicating that there would be similar blocks for other remote areas; and the sum of the frequency bias settings for all areas, $10B_s$, shown at block 130.

Arithmetic units such as summers, multipliers and dividers, as illustrated on FIGS. 1a and 1b, are shown as conventional analog units, well known in the art. To avoid ambiguity, dividers are marked to show which of the input parameters is the numerator, n, and which is the denominator, d. It will be understood that a digital computer may be used to carry out the computations which are illustrated.

The magnitude of system time deviation, epsilon ($\epsilon$), is determined by comparing system frequency, F, at block 58, and system reference frequency, $F_r$, at block 90, at summer 92, noting the applicable algebraic signs, the difference between the two frequencies being shown at block 94, and the differences integrated for time span t, at integrator 96.

To accomodate for the dimensional units used, the constant 3600 shown at block 98 is divided at 100 by the reference frequency, the quotient being shown at block 102, the double asterisk meaning that for this example, reference frequency is assumed to be 60 Hz. The constant 60 is multiplied at 104 by the output of integrator 96 to yield, at block 106, the measure in seconds of system time deviation.

As previously noted, automatic generation control for fulfillment of area regulating responsibilities with respect to other areas of the interconnected system is executed by determining the magnitude of area control error, $E_n$, shown at block 82, and causing over lines 83, 85 and 87, and by well known control techniques, the control units at 84, 86 and 88 to adjust the output of one or more of the generators at 10, 12 and 14, over lines 89, 91 and 93, to cause $E_n$ to return to zero. When $E_n$ is minus, generation is increased; when $E_n$ is plus, generation is decreased. The process of determining the magnitude of $E_n$ for conventional frequency biased net interchange control, which occurs when switch 78 is in position X, will now be reviewed.

System frequency as measured at 29 and connected over line 31 to block 56 is designated as $F'_n$. There may be an error in the measurement of $F'_n$ as illustrated with the dash line comparison at summer 60 with the true system frequency F yielding at block 62 the frequency measurement error $\phi_{In}$, a nonmeasurable parameter (except as integrated system time deviation), one of the several types of area errors that interfere with the area properly fulfilling its regulating responsibilities. The system frequency schedule as set in area n, and as shown at block 50 is designated $F'_{on}$. It may also have errors as shown by the dash line comparison at summer 52 with the true system frequency schedule $F_o$ shown at block 48, yielding the error parameter $\phi_{on}$ at block 54. $\phi_{on}$ is nonmeasurable and is another of the errors that interfere with effective fulfillment of area regulating responsibilities. The algebraic sum of $\phi_{on}$ and $\phi l n$ is shown as $\phi_n$ in Equation (4b) and subsequent equations.

A comparison of frequency as measured and frequency schedule as set is made at summer 64, yielding the frequency differential as shown at block 66. At multiplier 70 the frequency differential is multiplied by the frequency bias of block 68, yielding the biased frequency term shown at block 72.

Area inadvertent interchange $I_n$ at block 122 is measured by measuring the true net interchange, designated $T_n$ at block 34 and comparing it over line 35 at summer 116 with the true net interchange schedule designated $T_{on}$ shown at block 40, the difference being shown over line 117 at block 118. This differential is integrated at integrator 120 over time span t, yielding inadvertent interchange, $I_n$.

The area net interchange as actually measured, $T'_n$, shown at block 32, is obtained by adding at summer 30 the interchange flow at metering points 24 and 26, respectively, of the tie lines 23 and 25, over metering channels 27 and 28. There may be metering errors in $T'_n$ as measured, as indicated by the broken lines into summer 36 yielding the error parameter, which is nonmeasurable, $\tau_{In}$ at broken line block 38. This is another of the errors that would interfere with the area effectively fulfilling its regulating responsibilities.

The area net interchange schedule as actually set is designated $T'_{on}$ and shown at block 42. There may be errors in the actual setting as indicated schematically by the broken line comparison between blocks 42 and 40 at summer 44, yielding the error parameter $\tau_{on}$ shown at the broken line block 46. The error parameter $\tau_{on}$ is nonmeasurable and is still another of the factors that would interfere with the area effectively fulfilling its regulating responsibilities.

At summer 74 the net interchange schedule of block 42 is added to the biased frequency expression of block 72, yielding at block 76 the parameter $T'_{xon}$ which may be regarded as the interchange schedule $T'_{on}$ adaptively shifted for prevailing system frequency.

The algebraic sum of the error parameters $\tau_{on}$ and $\tau_{In}$ is shown as $\tau_n$ in Equation (4a) and subsequent equations.

It will be seen that $T'_{xon}$ is equal to all of the right-hand terms of Equation (4g) except $T'_n$. Thus by comparing $T'_{xon}$ over lines 77 and through the X position of switch 78 at summer 80 to $T'_n$ of box 32, the necessary computations will have been made to establish the magnitude of $E_n$ in accordance with Equation (4g).

The execution in FIGS. 1a and 1b for the determination of the magnitude of the area n component, $\epsilon_n$, of system time deviation, $\epsilon$, as separated from and independent of the magnitude of all other components of $\epsilon$, will now be discussed.

The frequency bias setting of area n from block 68 over line 69 is divided by the constant 60 from block 102 over line 103 at divider 108, yielding $B_n/6$ as shown in block 110. This parameter, from block 110 is multiplied by $\epsilon$ from block 106 at multiplier 122, yielding the product $(B_n\epsilon)/6$ as shown at block 114. At summer 124, the difference is taken between this parameter and area n total inadvertent interchange from block 122 over line 123 yielding the expression shown in block 126. At divider 148 the constant 60 over line 103 is divided by the total frequency bias for all areas, $10B_s$, from block 130 over line 131, yielding the parameter $6/B_s$ as shown at block 150. At multiplier 152 this parameter, $6/B_s$, is multiplied by the expression $I_n - (B_n\epsilon)/6$ in block 126, providing over line 153 to block 154, in accordance with Equation (16a), the parameter, $-\epsilon_n$, which is the new memory parameter, the area component of system time deviation, but with a minus sign. This parameter will have utility in this minus form as will later be shown, but as shown on FIG. 1b it is multiplied at multiplier 158 by the $-1$ shown in block 156 to yield $\epsilon_n$ at block 160, which in seconds, is the new parameter that is an index to how effectively area n has fulfilled its own regulating responsibilities in response to its own causes, which was one of the objects of this invention.

Determining the magnitude of the new parameter, area primary inadvertent, $I_{nn}$, as separated from and independently of the magnitude of all of the area secondary inadvertent components, will now be discussed.

Continuing on FIGS. 1a and 1b, the difference between the total of frequency bias settings for all areas at block 130 and the frequency bias setting for area n at block 68 is obtained over lines 131 and 69 respectively, at summer 132, yielding at block 134 the expression $10(B_s - B_n)$. As a next step this expression is divided by the total frequency bias for all areas from block 130 over line 131 at divider 140, yielding as shown at block 142, the expression $(1 - Y_n)$. This parameter it will be noted, is the equivalent of $(B_s - B_n)/B_s$. At multiplier 162, this expression, over line 143, is multiplied by the expression of block 126, yielding over line 163, in accordance with Equation (18a) the new memory parameter, $I_{nn}$, the primary component of inadvertent interchange of area n.

This new parameter in megawatt hours, like $\epsilon_n$ in seconds to which it is linearly related, is a measure of how effectively area n has fulfilled in time span t its regulating responsibilities. Its separation and determination of its magnitude was one of the objects of this invention.

As a next step, continuing with FIGS. 1a and 1b, determination of the magnitude of the total of secondary inadvertent components in area n will be discussed.

At summer 166 the algebraic difference of total area inadvertent interchange, $I_n$, over line 123 from block 122, and the magnitude of the primary component of inadvertent interchange over line 163 would yield at block 168 $\Sigma I_{ni}$, the total of the secondary components of inadvertent interchange of area n. What is of greater significance is to separate from the parameter $\Sigma I_{ni}$ the individual secondary components of inadvertent interchange at area n caused by each of the remote areas i. To take advantage of parameters already shown on FIGS. 1a and 1b, which pertain to area n, an analysis will be outlined which shows how each secondary component, $I_{in}$, caused at each remote area i by the primary component of inadvertent interchange, $I_{nn}$, at area n, is determined. It will be understood that comparable determinations would apply for each secondary component of inadvertent interchange at area n, utilizing the corresponding parameters related respectively to each remote area i. The asterisks in blocks 128, 138, 146, 172 and 176 are remainders that the process is shown for one remote area i, and would be repeated with appropriate selection of parameters for all remaining remote areas.

At divider 136 the frequency bias setting for a remote area i from block 128 is divided by the total frequency bias for all areas from block 130 over line 131, yielding at block 138 thea parameter $Y_i$ for remote area i. At divider 144 the ratio of $Y_i$ from block 138 to the parameter $(1 - Y_n)$ from block 142 over line 143 is determined, yielding over line 145 the ratio of these two parameters as shown at block 146.

The next step is to determine the product at multiplier 170 of the expression of block 146 and the area primary component of inadvertent interchange of area n from block 164, yielding at box 172, in accordance with Equation (24), the new memory parameter, $I_{in}$, which is the secondary component of inadvertent interchange at area i caused by area n, but with a minus sign. By taking the product of block 172 and block 156 at multiplier 174 there is obtained at block 176, $I_{in}$ without a minus sign, the separation of which from all other secondary inadvertent components at area i, and the determination of its magnitude, were objectives of this invention.

Next, still utilizing FIGS. 1a and 1b, there will be shown how with switch 78 in the Y position, the area n component $\epsilon_n$, of system time deviation can be utilized for corrective control which will introduce a system state which in time, $H_n$ expressed in hours, will simultaneously correct for the area n component of system time deviation, the area n primary component of inadvertent interchange, and the secondary components of inadvertent interchange in all remote areas caused by the area n primary component of inadvertent interchange, eliminating current industry practices as defined in the NAPSIC Operating Guides for area-wide system time correction and unilateral or bilateral area inadvertent interchange correction. The objective is to develop a frequency schedule offset for area n of $\hat{\phi}_n$ equal to the right-hand portion of Equation (28), or, for a 60 Hz system, the right-hand portion of Equation 28(a). This is achieved in the series of steps illustrated schematically in FIGS. 1a and 1b.

At divider 178 the total of frequency bias settings for all areas from block 130 is divided by the frequency bias setting of area n, yielding at block 180 the expression $1/Y_n$. This expression is fed to divider 182 over line 181 and there is divided by the constant 60 from block 102 over line 103, yielding the expression $1/60Y_n$ at block 184. At multiplier 186, this expression over line 185 is multiplied by $-\epsilon_n$ from block 154 and the reciprical of $H_n$ from block 188, yielding the expression shown in block 190, which it will be noted is identical to $\hat{\phi}_n$ of Equation (28a). The product of this expression and the frequency bias setting for the area from block 68 over line 69 is then determined at multiplier 192, yielding the expression shown at block 194, which in turn is combined at summer 196 with $T'_{xon}$ over line 77, yielding $T'_{yon}$ at block 198. Inspection will show that this parameter contains all the parameters of the right hand side of Equation (29) except $T'_n$, and hence represents the net interchange schedule set for area n, $T'_{on}$, adaptively shifted first by frequency bias to $T'_{xon}$ and then additionally shifted adaptively to correct for the area's past accumulation of area component of system time deviation.

With switch 78 in position Y the prevailing net interchange $T'_n$ at block 32 is compared at summer 80 with $T'_{yon}$ resulting in area control error $E_n$ at block 82, that is reduced to zero by automatic generation control as previously discussed.

Next, continuing to use FIGS. 1a and 1b, there will be shown how with switch 78 in position Z, corrective control action based on the new parameter area primary component of inadvertent interchange, $I_{nn}$, in megawatt hours, will provide for a selected time period, $H_n$ in hours, correction for the summation of past area states when the area has not regulated effectively, by establishing a new area state that will make that correction, thereby simultaneously correcting for the area n primary component of inadvertent interchange, the area n component of system time deviation and the secondary components of inadvertent interchange caused by area n in other areas of the interconnected system. The object is to develop an offset for net interchange schedule which is the equivalent of $\hat{\tau}_n$ in Equation (32), which is to say determine an area control error which is equal to the right-hand side of Equation (33). The steps to achieve this are illustrated in FIGS. 1a and 1b.

At divider 200, the ratio of area n primary component of inadvertent interchange from block 164 to the expression shown at block 142 over line 143 is determined, yielding the ratio shown in block 202. The product of this ratio and the reciprocal of $H_n$ from block 188 is determined at the multiplier 204, yielding the expression shown at block 206, which it will be noted is identical to the expression for $\hat{\tau}_n$ shown in Equation (33).

Combining the expression of block 206 at adder 208 with $T'_{xon}$ over line 77, yields $T'_{zon}$ at block 210 which may be regarded as a new net interchange schedule based on the original schedule $T'_{on}$, adaptively shifted for frequency bias to $T'_{xon}$ and now additionally adaptively shifted by a corrective control factor based on the area primary inadvertent interchange, in accordance with the expression at block 206. It will now be seen that $T'_{zon}$ contains all of the parameters of the right-hand side of Equation (34) except $T'_n$. Thus, comparing $T'_{zon}$ at summer 80 with $T'_n$ from block 32, with switch 78 in the Z position, yields the area control error at 82 which, when reduced to zero, will have inaugurated an area control state which in time $H_n$, in addition to fulfilling prevailing area regulating requirements, will have corrected for past accumulations of the area n primary component of inadvertent interchange, the area n component of system time deviation, and the secondary components of inadvertent interchange caused by area n in all other areas. In this manner the area will have fulfilled all of its regulating responsibilities, independently of the control actions being taken or not being taken concurrently in all other areas of the interconnected system.

FIG. 2 is a representation of a three-area interconnected system to which the application of the invention will shortly be discussed. It will be understood that present day interconnected systems have far more control areas than are shown in FIG. 2, but the basic elements of the invention will be the same for the three area systems as for the larger interconnected systems. It is generally industry practice to have power and energy metering between 2 areas serve both areas.

In FIG. 2, line 214 connects Area A to Area B and it will be understood that this line is representative of the many more lines between two areas that are usually encountered in actual practice. Similarly, line 215 is representative of all lines that connect Area B to Area C, and line 216 is representative of all lines that connect Area A to Area C. Metering elements on line 214 are represented by 236 for power flow and 256 for energy summation. Both are generally located at the same point in the line and both serve Area A and Area B. Similarly, metering elements 238 for power flow, and 258 for energy summation, are located at the same point on line 215 and both serve Area B and Area C. Also, metering elements 240 for power flow, and 260 for energy summation, are located at a common point on line 216, and both would generally serve Area A and Area C. The power metering elements, as mentioned in the discussion of FIGS. 1a and 1b, are likely to have errors, while the energy metering units, customarily watt hour meters, are regarded as providing accurate integration of inter-area power flow.

Turning now to FIGS. 3a and 3b, tie lines 214, 215 and 216 correspond to the similarly numbered lines in FIG. 2. Metering elements for power flow 236, 238 and 240 correspond to the similarly numbered elements in FIG. 2. The watt hour meter elements 256, 258 and 260 correspond to the similarly numbered metering elements of FIG. 2. Transmitter 242 transmits the net interchange between Areas A and B as metered at 236 over transmission channel 243a to the receiver 248 at Area A, and over transmission channel 243b to a comparable receiver at Area B, utilizing well known analog or digital telemetering and transmission techniques. Similarly, transmitter 244 transmits the net interchange between Areas B and C as metered as 238, over transmission channel 245c to receiver 254 at Area C and over transmission channel 245b to a comparable receiver at Area B. Also, transmitter 246 transmits the net interchange between Areas A and C, as metered at 240, over transmission channel 247a to receiver 250 at Area A and over transmission channel 247c to receiver 252 at Area C. Energy flow between Areas A and B as metered at 256 is transmitted by transmitter 262 over channel 263a to receiver 268, and over channel 263b to Area B, utilizing well known and widely used telemetering and transmission techniques. Similarly, the energy flow between Areas B and C as metered at 258 is transmitted by transmitter 264 over channel 265c to receiver 272 a Area C, and over channel 265b to a comparable receiver at Area B. The energy flow between Area A and Area C as metered at 260 is transmitted by transmitter 266 over channel 267a to receiver 270 at Area A, and over channel 267c to receiver 274 at Area C.

In FIG. 3b, Area C is designated to maintain the standard time reference for the interconnected system, and to provide information on system time deviation to all areas. System time deviation is determined at summer 228 which receives standard time from either of two sources. In position 1 of selector switch 222, standard time may be received from a government transmission station such as WWVB with receiver 221. In position 2 of switch 222, standard time is received from the output of a local frequency standard at 217, integrated at 218 and multiplied at 220 by the appropriate conversion factor which for 60 Hz is 60 as shown at block 219.

The standard time receiver at 221 and the local frequency standard at 217 may be similar to the Develco 3391 power system frequency standard described in my paper, "The Use of Synchronous Time and Frequency Standards to Improve Control of Interconnected Electric Power Systems," presented at the Feb. 26, 1969, meeting of NAPSIC and published in the Leeds & Northrup Technical Journal, Issue 7, Fall 1969, and additionally discussed by B. J. LaVeau in a paper titled, "A New Time Standard," appearing in the same issue of the L&N Technical Journal.

System frequency is metered on Area C bus 213 by metering device 223. The frequency is then integrated at 224 for time span t, and at multiplier 226 the result is multiplied by the conversion factor from 219, which is 60 for a 60 Hz system, the output of 226 being fed to summer 228 where it is compared with the output from switch 222.

The output of summer 228 is fed over line 229 to transmitter 230 which transmits over channel 231a to receiver 232 at Area A which in turn provides the $\epsilon$ value there at block 106. Transmitter 230 also transmits over channel 231b to Area B where there is a comparable receiver.

The adjustable setter and contact at 68a is set on power-supplied slidewire 68 to obtain the frequency bias setting for Area A in megawatts per Hz, $10B_a$, which is then fed on line 69 to perform several additional functions. Similarly, adjustable setter and contact 128a is set on power-supplied slidewire 128b to the value of the Area B frequency bias in megawatts per Hz. The asterisk at 128b signifies that the function of Area B frequency bias, in addition to that shown on FIG. 3a, is similar to that shown for Area C at 128c and 128d, the output of which is the Area C frequency bias in megawatts per Hz.

At summer 129 the frequency bias settings of Area A, Area B and Area C are added together providing on line 131 the total frequency bias, $10B_s$, in megawatts per Hz for all three areas. At divider 108 $10B_a$ is divided by the 60 Hz conversion constant from 102, yielding as an output from 108, the expression, $B_a/6$, which at multiplier 112 is multiplied by system time deviation from 106, yielding on line 114 the expression, $B_a\epsilon/6$.

The megawatt hour receivers at 268 and 270 are fed to counter generators at 274 and 276 respectively, whose outputs feed respectively digital to analog converters at 278 and 280, the analog outputs being added at summer 279, providing on line 35 a signal related to the integral of Area A net interchange over time span t.

At pulse generator 282 the schedule for Area A net interchange is set and impulses correspondingly fed to counter 284, which in turn feeds digital to analog converter 286, the output of which is a signal representing the integral of Area A net interchange schedule over time span t. The appropriate time spans, t, are introduced from synchronizing signal generator at 290 which simultaneously feeds counters 274 and 276, and system time deviation at block 106 so that all of these devices and their corresponding parameters relate to a common time span, t.

At summer 288, the difference between the outputs of summer 279 and the digital to analog converter at 286 is determined, representing on line 122 the inadvertent interchange, $I_a$, for Area A over time span t. At summer 124 there is subtracted from this parameter the output of multiplier 112 yielding as the input to the Sample and Hold device at 292 a signal related to $I_a - (B_a\epsilon)/6$. The Sample and Hold unit at 292 is fed from the synchronizing signal generator of 290 over line 291 so that in synchronism with other devices that receive the signal from 290, the input to 292 is released over line 126 to the multiplier at 152 as well as to the multiplier at 162, and in each case this signal represents $I_a - (B_a\epsilon)/6$.

Counters, digital to analog converters, pulse generators, synchronizing signals, and Sample and Hold units are included in the discussion of my previously mentioned U.S. Pat. Nos. 3,701,891 and 3,898,442, both of which are incorporated herein by reference.

At divider 148, the frequency conversion signal from 102 is divided by the total area frequency bias from 129 yielding on line 150 the expression $6/B_s$. This expression multiplied at multiplier 152 by the output of 292 on line 126 yields, minus the right-hand side of Equation (16a). The further step of multiplying this expression from line 153 at multiplier 158 by $(-1)$ from block 156 over line 157 yields at block 160 the new memory parameter, $\epsilon_a$, the area-caused component in seconds of system time deviation, a precise measure of the summation of regulating states in Area A over time span t, which is to say, a precise measure of the degree to which Area A has fulfilled in time span t, its regulating responsibilities with respect to the other areas of the interconnection.

At summer 132 the difference is taken between the total of all area frequency bias settings and the frequency bias settings of Area A. The difference is fed on line 141 as the numerator to divider 140, and is combined with the denominator which is the total frequency bias of all areas yielding on line 143 the expression $(B_s - B_a)/B_s$ which, it will be noted, is equivalent to $(1 - Y_a)$. This output from line 143 is multiplied at multiplier 162 by the output of the Sample and Hold unit 292 on line 126, yielding on line 163 and at block 164 the new memory parameter $I_{aa}$ which is the primary component of inadvertent interchange in Area A accumulated in time span t, an index to the summation of regulating states in Area A due to its own causes, and a precise measure in megawatt hours of the regulating performance of Area A in time span t. It is defined by Equation (18a), or equivalently by Equation (18b), and is related to the new parameter $\epsilon_a$, by Equations (19), (19a), (20) and (20a).

At summer 166 the Area A primary component of inadvertent interchange, $I_{aa}$ from line 163 is subtracted from the Area A total inadvertent interchange, $I_a$, from summer 288 on line 123, yielding a signal at 168 representative of Area A total secondary inadvertent interchange, $I_{ab} + I_{ac}$. Next, to obtain a signal representative of the new memory parameter, the secondary component of inadvertent interchange caused at a remote area, Area C, by the primary component of inadvertent interchange of Area A, the frequency bias of Area C from 128c is divided at divider 136 by the total frequency bias of all areas from line 131. The output of 136 on line 138 is divided at divider 144 by the expression $(B_s - B_a)/B_s$, from line 143 yielding on line 145 a signal representative of $B_c/(B_s - B_a)$. This signal is also representative of $Y_c/(1 - Y_a)$. It is then combined from line 145 at multiplier 170 with the signal on line 163 which is Area A primary component of inadvertent interchange, $I_{aa}$, yielding at 171 in accordance with Equation (24), a signal representative of $-I_{ca}$, minus the secondary component of inadvertent interchange at Area C caused by the primary component of inadvertent interchange of Area A. This signal is then multiplied by $(-1)$ from 156 on line 157 at multiplier 174, yielding at 175, the new memory parameter, $I_{ca}$, the secondary component of inadvertent interchange at Area C caused by the primary component of inadvertent interchange at Area A. It will be understood that signals representative of $-I_{ba}$, and the new memory parameter $I_{ba}$, the secondary component of inadvertent interchange at Area B caused by the primary component of inadvertent interchange at Area A, and shown respectively at 177 and 179, will be obtained by the process just described. That is the meaning of the asterisks shown at 177 and 179.

It will also be understood that the signals representative of the new memory parameters, $\epsilon_a$, $I_{aa}$, $(I_{ab} + I_{ac})$, $I_{ba}$, and $I_{ca}$, may each be indicated, recorded, charted or tabulated by analog or digital data presentation techniques well known to practitioners in the art.

The control relationships in FIGS. 3a and 3b for each of the three control modes positions X, Y and Z of switch 78, will now be discussed. System frequency is measured at Area A with measuring means 29 and the signal, representative of $F'_a$ is carried over line 31 to summer 64. A signal related to frequency schedule, $F'_{oa}$, is generated from power-supplied slidewire 51 and adjustable setter 51a and transmitted over line 50 to summer 64. The output of summer 64 is then representative of system frequency deviation as measured, and is multiplied at multiplier 70 by Area A frequency bias, the product appearing on line 72. On line 42 there is a signal from power-supplied slide-wire 43 and the adjustable contact 43a which is representative of the Area A net interchange schedule, $T'_{oa}$. At summer 74 the signals from lines 72 and 42 are combined, yielding on line 76 a signal which includes all the right-hand terms of Equation (4g), except $T'_n$. At adder 80 the signal from switch position X is subtracted from the net interchange signal $T'_a$ obtained on line 32 from adder 30 thus completing the relationships of the right-hand side of Equation (4g) and resulting in Area A control error $E_a$ which is then reduced towards zero by the control action of Area A generator controllers, already identified.

Turning now to the development of the new corrective signal for position Y of switch 78, the total frequency bias signal on line 131 is divided at divider 178 by the Area A frequency bias signal on line 69, yielding on line 180 the signal, $1/Y_a$. This signal is multiplied at multiplier 183 by the Area A frequency bias signal producing on line 191, the signal $10B_a/Y_a$. It will be noted that there are cancelling arithmetic steps here since the signal on 191 is equivalent to the total system frequency bias which could have been obtained directly from line 131 without the intermediate arithmetic steps, but is shown in the manner drawn in order to preserve consistency with FIG. 1a in the development of the corrective signal for switch position Y. The signal on line 191 is divided at divider 189 by the conversion constant 60 from 102 providing an input on line 193 to the multiplier 187 of $B_a/6Y_a$. Other inputs to multiplier 187 are the signals for minus the area component of system time deviation from 152 and the reciprocal of the time in which the correction action is to be achieved obtained from power-supplied slidewire 188 and adjustable contact 188a.

The output from 187 on line 194 is thus a signal for Area A equivalent to that shown for area n at block 194 in FIG. 1b. This is combined at summer 196 with the signal on line 76 from summer 174 yielding on line 198 a signal for Area A comparable to that shown for area n at block 198 in FIG. 1b. With switch 78 of FIG. 3a in the Y position, the signal on line 198 is then compared at summer 80 to the signal for measured net interchange on line 32 yielding on line 82 the signal for area control error in accordance with Equation (29). This signal actuates regulation of generation at Area A as previously discussed to reduce the area control error toward zero.

To achieve the comparable corrective control action based on the Area A primary component of inadvertent interchange, there is developed at divider 200 a signal based on dividing the primary component of inadvertent interchange signal on line 163 by the signal on line 143 yielding on line 202 a signal for Area A comparable to the expression for area n at block 202 in FIG. 1b. This signal is then multiplied at multiplier 204 by the signal obtained from adjustable point 188a of power-supplied slidewire 188 and which is the reciprocal of the time in hours during which the corrective control action is to be completed, yielding on line 206 a signal for Area A comparable to the expression for area n at block 206 in FIG. 1b. This is the offset signal for the Area A net interchange schedule which is combined at summer 208 with the signal from line 76 yielding on line 210 a combined signal for area A comparable to that shown for Area n in block 210 in FIG. 1b. This signal is then fed to position Z of switch 78 in FIG. 3a. A comparison is then made at summer 80 with the measured net interchange for the area on line 32 and the output is the area control error for Area A incorporating, in accordance with the disclosure of this invention, the signal for corrective control which, when the area control error is reduced to zero by regulation of Area A generators, will provide simultaneous corrective action for the Area A component of system time deviation, the Area A primary component of inadvertent interchange and the secondary components of inadvertent interchange in Areas B and C caused by the primary component of inadvertent interchange in Area A.

The table of FIG. 5 summarizes the components spectrum of area n inadvertent interchange, $I_n$. Area inadvertent interchange may be plus which signifies overgeneration in the area, with an excess in energy sent to others, or deficiency in energy received from others. $I_n$ may be minus, signifying net undergeneration in the area, with an excess in energy received from others, or deficiency in energy sent to others. Because of the many components of which $I_n$ is composed, the net figure for this parameter does not reveal whether the area is overgenerating or undergenerating insofar as its own causes are concerned, or whether it is overgenerating or undergenerating insofar as remote causes are concerned. The net interchange will simply be the algebraic sum of the many overgeneration and undergeneration components.

As shown additionally on the table, if $I_{nn}$, the self-caused or primary component of inadvertent interchange of area n is plus, it indicates that area n is overgenerating because of its own causes and hence is sending energy "out" in excess of its net interchange schedule, or is receiving energy "in" at a level less than the net interchange schedule. If $I_{nn}$ is minus, then area n is undergenerating as a result of its own causes, and as a result will be deficient in its energy transmission to others or will be operating with excess receipt of energy from others.

The algebraic significance for remotely caused, which is to say secondary components of inadvertent interchange, $I_{ni}$, of area inadvertent interchange is also shown in the table of FIG. 5. When $I_{ni}$ is plus, area n is correspondingly overgenerating in response to remote causes and transmitting to others excess energy beyond schedule or receiving from others energy below schedule because of those remote causes. When $I_{ni}$ is minus, area n is correspondingly undergenerating on account of remote causes, and is receiving energy in excess of schedule or transmitting energy under schedule to accomodate remote needs.

The concepts of this invention related to the separation and determination of the magnitude of the area-caused components of system time deviation, and of the primary and secondary components of area inadvertent interchange will be illustrated with specific examples using known and measurable parameters derived from actual operating surveys on U.S.-Canadian interconnected systems. One set of examples is based on one of the weekly regulating surveys of the Western System, for the hour ending (HE) at 0400 PST on Feb. 22, 1977.

The other is based on the data of a periodic control error survey by the Eastern System, for the hour ending (HE) 0700 CST, on Jan. 11, 1977.

As has previously been noted, the Western System has more than thirty control areas contained in four Regions. While the separation and determination of the magnitude of individual components for all areas can readily be achieved utilizing the techniques of this invention, for greater simplicity in the presentation of this data, the results will be presented for the four Regions only. Similarly, for the Eastern System, with its approximately one hundred control areas contained in six Regions, the data will be presented for the Regions only. It will be understood that all references in this specification to "areas" apply equally as well to "regions."

It will be understood that in illustrating aspects of this invention with specific data from actual systems operation, no representation is made that the performance reported for the selected hour of operation is indicative of general control performance of any of the Regions.

Data on frequency bias settings and inadvertent interchange accumulations during the designated hour for the Western System Regions is summarized in Table I. System time deviation accumulated during the designated hour amounted to −0.24 second.

TABLE I

| WESTERN SYSTEM REGULATION SURVEY February 22, 1977  HE 0400 PST  $\epsilon = -0.24$ sec | | |
|---|---|---|
| | Freq. Bias MW/0.1 Hz $B_n$ | Inadvertent Interchange MW - HRS $I_n$ |
| 1. Northwest Power Pool (NWPP) | −767 | −8 |
| 2. Calif-Nevada (CANE) | −615 | 16 |
| 3. Ariz-New Mexico (AZNM) | −117 | 17 |
| 4. Rocky Mtn Power Pool (RMPP) | −98 | −25 |
| TOTAL | −1597 | 0 |

Similar data for the Regions of the Eastern System is tabulated in Table II.

TABLE II

| EASTERN SYSTEM CONTROL ERROR SURVEY January 11, 1977  HE 0700 CST  $\epsilon = -3.04$ sec. | | |
|---|---|---|
| | Freq. Bias MW/0.01 Hz. $B_n$ | Inadvertent Interchange MW - HRS* $I_n$ |
| 1. Northeast Power Coord. Council (NPCC) | −940 | 644 |
| 2. PA-New Jersey-MD Pool (PJM) | −420 | 223 |
| 3. East Central Systems (ECS) | −1087 | −179 |
| 4. Southeastern Region (SER) | −1170 | −1205 |
| 5. Southwest Power Pool (SWPP) | −639 | 141 |
| 6. North Central Region (NCR) | −1080 | 376 |
| TOTAL | −5336 | 0 |

The asterick in the inadvertent interchange column of Table II means that the original data for that column did not add up algebraically to zero, and adjustments have been made in the raw data to correct for this. Had the corrections not been made, the results finally achieved would have been off by about one-half of one percent. This adjustment is referred to in my paper, "Who Does What to Whom in Interconnected Power System Control-Some New Considerations for Achieving More Equitable Bulk Power Transfers," in which concepts of this invention were presented at the Annual Meeting of the North American Power Systems Interconnection Committee, Toronto, Ontario, Canada, May 18, 1978, and in a comparable paper entitled, "New Considerations for Achieving More Reliable and Equitable Bulk Powder Transfers", presented to the Technical Advisory Committe of the National Electric Reliability Council at Denver, Colorado, on July 6, 1978.

The tabulation of FIG. 6 shows the regionally-caused components of system time deviation and the primary components of inadvertent interchange in the second and third columns respectively for the Regions listed in the first column. These two new parameters for each Region have been separated from other components and their magnitudes determined in accordance with the methods and means disclosed in this invention. It is interesting to note that the regional components of time deviation have differing algebraic signs, Region 3 being plus while Regions 1, 2 and 4 are minus, but algebraically they all add up to the total magnitude of system time deviation for the designated one hour period.

Examining the regional primary component of inadvertent interchange in the third column of FIG. 6, it will be noted that they are of varying algebraic sign, always, however, of the same algebraic sign as the component of system time deviation of the Region, but not necessarily of the same algebraic sign as the total regional inadvertent interchange tabulated in column 4. For Region 2, for example, the primary component of inadvertent interchange is 5.3 megawatt hours "in" while total inadvertent is 16 megawatt hours "out". This means that the Region itself was undergenerating for its own regulating commitments, but at the same time overgenerated to serve the needs of remote regions.

In FIG. 7 there is a tabulation of comparable data on regional components of system time deviation and regional primary components of inadvertent interchange for the regions of the Eastern System. Again, in the second column, it will be noted that the regional time deviation components are of vary algebraic sign, Regions 1 and 2 being plus, and Regions 3 to 6 inclusive being minus, but all adding algebraically to the −3.04 seconds lost during the hour of the survey. It will be further noted that the regional component of system time deviation is always of the same algebraic sign as the regional primary component of inadvertent interchange tabulated in the third column, but not necessarily of the same algebraic sign as total regional inavertent interchange, which is tabulated in the fourth column. Region 5 is undergenerating by 161 megawatt hours with respect to its own regulating responsibilities, but this is obscured by overgeneration to assist remote areas to an extent that provides a net of 141 megawatt hours outward flow. Similarly, Region 6 has undergenerated by 136 megawatt hours in the fulfillment of its own regulating responsibilities, but this is obscured by the secondary component of inadvertent interchange in the outward direction to assist other regions, and in amount large enough to show a net output transfer of 376 megawatt hours.

There are two important points to be noted from these tables insofar as concerns techniques for correcting for system time deviation and regional or area inadvertent interchange accumulations.

It will be recalled that the present practice in accordance with the NAPSIC Operating Manual is for all areas to participate simultaneously in system time correction, on orders originating at the central timekeeping area. If for example, the Eastern System were to undertake a time correction period to counter balance the 3.04 seconds lost during the hour of the control survey, all areas would set their frequency schedules upward by the same amount thereby speeding up the system to compensate for the previously lost time. In this process, each participating area would accumulate a fast or plus time component. This would be helpful to those regions having a previously accumulated slow or minus component which would be reduced correspondingly. On the other hand, Regions such as 1 and 2 which already have plus system time deviation components would create further increases in these components. Bearing in mind that an area or regional component of system time deviation can be corrected only by the area or region that caused it in the first place, sooner or later two regions that, by the process described, have added to their plus components would have to undertake further corrective regulation in the opposite direction to counter balance the new incorrect accumulation. Thus universal time correction as currently practiced creates unnecessary regulation, which is wasteful of energy and is preferably to be avoided. By having each area or region correct only for the time deviations for which it itself is responsible, as described in this invention, regulation would be minimized and energy conserved.

Similar improper corrective action, which is energy wasteful and costly, can readily occur when two areas or regions undertake bilateral correction for inadvertent interchange as described in the NAPSIC Operating Manual. Suppose for example Regions 2 and 4 of the Western System decide to undertake bilateral inadvertent interchange correction in accordance with the present practice, Region 2 having inadvertent interchange "out" and Region 4 having inadvertent interchange "in". Those are indeed differing directions of inadvertent interchange as disclosed by regional total inadvertent interchange tabulated in column 4 of FIG. 6. On inspection of column 3 of that figure, however, it will be seen that the primary inadvertent in each of these two areas are of the same sign, not of differing signs, and when Region 2 takes power in to correct for its total inadvertent interchange, it will in effect be increasing its already negative primary component of inadvertent interchange, even though it is decreasing its total inadvertent. Thus this is not a useful correction, and sooner or later Region 2 will have to again increase outgoing energy beyond its schedule in order to compensate for the negative accumulation of its primary component of inadvertent interchange.

Figure 8:
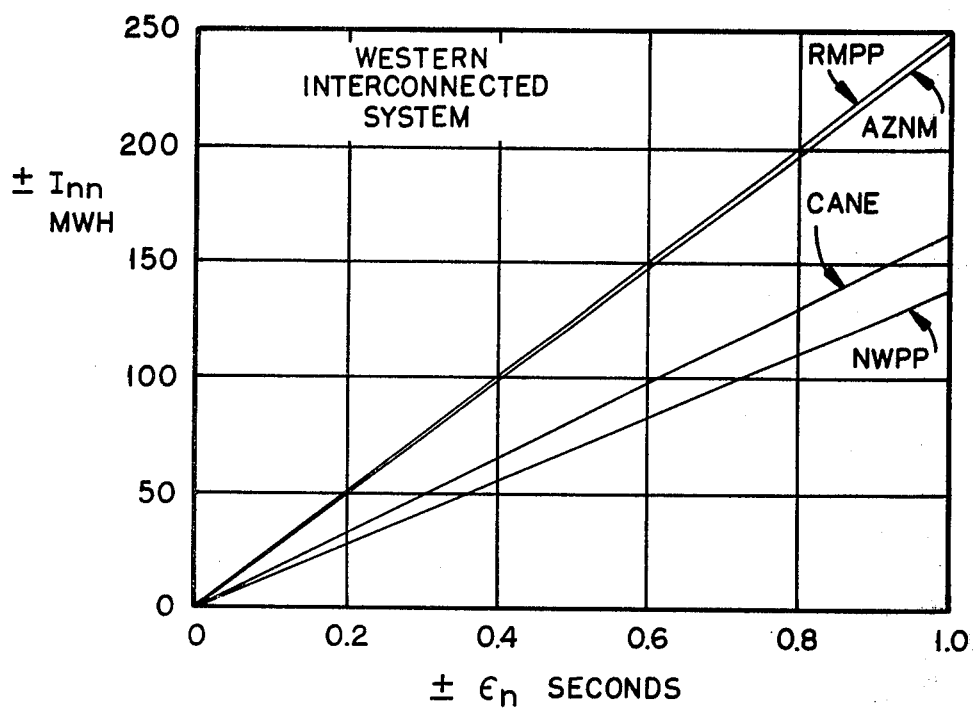
FIG. 8 shows curves of regional components of system time deviation versus regional primary inadvertent interchanges for the four regions of the Western Interconnected System; note that all curves go through the origin, so that when the component of system time is zero, the primary component of inadvertent interchange is zero.

The relationships between regional components of system time deviation and primary components of inadvertent interchange are disclosed in Equations (19), (19a), (20) and (20a) which make it clear why these two parameters are always of the same algebraic sign. In addition, it will be noted that when one of these parameters is zero, the other is also zero. These relationships are illustrated in FIG. 8 for the Regions of the Western System, and in FIG. 9 for the Regions of the Eastern System. Because the total of all frequency biases on the Eastern System is so much larger than that of the Western System it will be noted that a given component of system time deviation on the Eastern System corresponds to a correspondingly greater primary component of inadvertent interchange than on the Western System.

Figure 10:
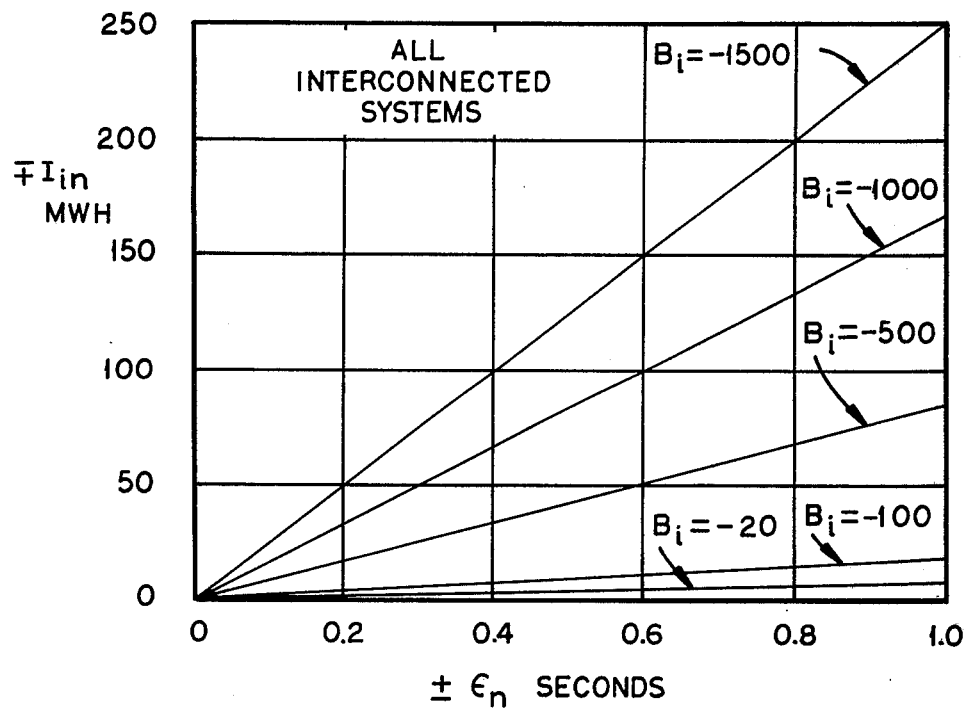
FIG. 10 shows curves of area components of system time deviations in area n versus the secondary inadvertent interchange component caused in a remote area i by area n, for varying values of the frequency bias setting in area i, applicable to all areas of al interconnected systems; note that all curves go through the origin.

Another set of curves of interest are those of FIG. 10 which plots area or regional components of system time deviation versus the secondary components of inadvertent interchange caused in remote area i by the primary component of inadvertent interchange of local area n and drawn for varying frequency biases of remote areas. The relationships for these curves are shown in Equations (24) and (25). It is to be noted that these curves apply to all interconnected systems that utilize frequency biased net interchange control, regardless of size or the magnitude of total system frequency bias.

Figure 9:
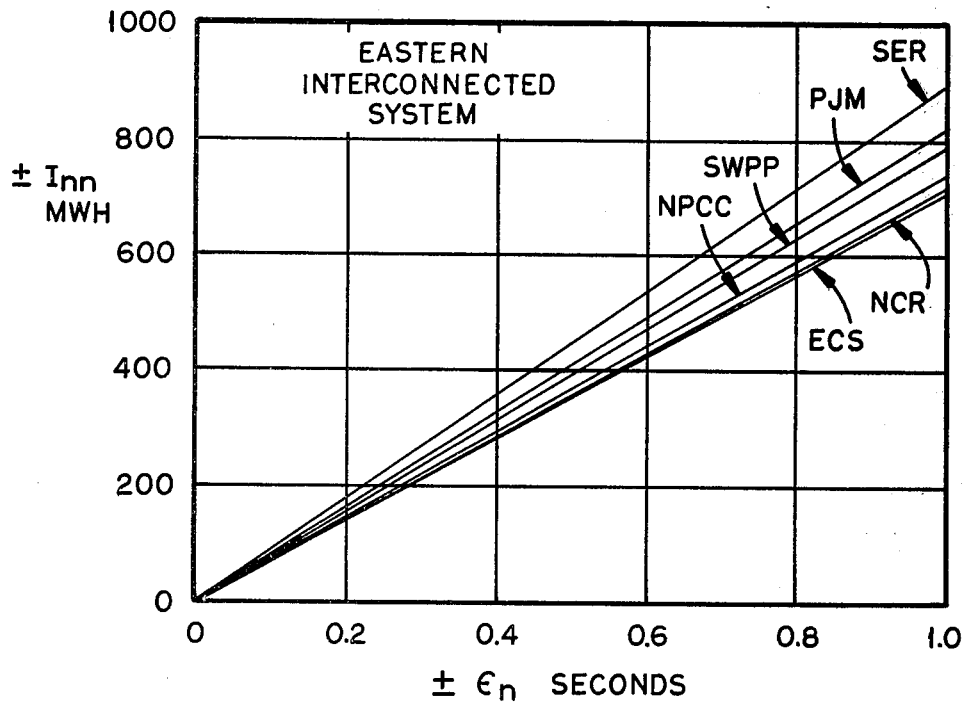
FIG. 9 shows curves of regional components of system time deviation versus regional primary inadvertent interchanges for the six regions of the Eastern Interconnected System; note that all curves go through the origin.

The fact that the curves of FIG. 10 like the curves of FIGS. 8 and 9 go through the zero coordinates is important. It means that when the area or region has a system time deviation component of zero, not only is its primary component of inadvertent interchange zero, but all secondary components of inadvertent interchange created in all remote areas are also zero.

This is why corrective control from either the component of system time deviation or the area primary component of inadvertent interchange concurrently corrects for all of these parameters.

Reference has been made earlier to the technique used by the NAPSIC interconnected systems for the determination of "control error" in megawatt hours, and the fact that it does not provide a precise performance measure. The new parameter, the primary component of inadvertent interchange of the area as disclosed in this invention does, however, represent a precise measure of area control error. A comparison of "control error" as recorded for its six regions in the Eastern System Control Error Survey of Jan. 11, 1977, hour ending 0700 CST, is shown in the column correspondingly headed in FIG. 11. The adjacent column of the Figure shows the primary component of inadvertent interchange for each of the regions as determined by the techniques of this invention. The substantial differences in the two columns is shown in the final column on the right. Thus as has already been noted, this invention provides, for the first time since the adoption more than thirty years ago of frequency biased net interchange control for interconnected systems, a precise measure in megawatt hours of the control error of each area or region.

Utilizing the methods and means disclosed in this invention, and the data from the previously referred to Western and Eastern and Eastern Surveys respectively, the magnitude of all secondary components of inadvertent interchange for each of the regions has been determined and is tabulated for the Western System in FIG. 12. The first horizontal row of numbers applies to Region 1, and shows the secondary components of inadvertent interchange at Region 1 caused by the primary components of inadvertent interchange at Regions 2, 3 and 4 respectively, utilizing the relationships of Equation (23a).

It will be noted that the components derived from Regions 2 and 4 respectively are plus, meaning excess energy is transmitted by Region 1 to those regions because of undergeneration regulating states there. The secondary component of inadvertent interchange at Region 1 caused by Region 3 is minus, reflecting undergeneration at Region 1 to assist absorbing a share of the overgeneration regulating state at Region 3. At the extreme right of the first row of the Table is shown the net of secondary components of inadvertent interchange for Region 1, 12.1 MWH.

The second row of the Table of FIG. 12 shows the secondary components of inadvertent interchange at Region 2 as caused by Regions 1, 3 and 4 respectively, and the net of these components is shown at the extreme right of the second row as the net of secondary components of inadvertent interchange at Region 2, 21.3 MWH.

The third row of the Table shows the secondary components at Region 3 derived from the regulating states at Regions 1, 2 and 4 respectively, and the net of secondary components of inadvertent interchange for Region 3 is shown at the extreme right of the third row of the Table, 5.6 MWH.

Similarly, the fourth row shows the secondary components of inadvertent interchange at Region 4 derived respectively from the regulating states of Regions 1, 2 and 3, and the net of these components for Region 4 is shown at the extreme right of row 4, 2.1 MWH.

The figure at the bottom of the second column of the Table, 20.1 megawatt hours, is the total of the secondary components of inadvertent interchange at Regions 2, 3 and 4 created by the regulating state at Region 1, and as will be noted, it is the negative of the primary component of inadvertent interchange of Region 1 of the Western System as shown in FIG. 6. Similarly, the figure at the bottom of column 3, 5.3 MWH, is the summation of the secondary components of inadvertent interchange caused at Regions 1, 3 and 4 by the regulating state of Region 2, and is the negative of the primary component of inadvertent interchange of Region 2 of the Western System as shown in FIG. 6.

The figure at the bottom of column 4 of FIG. 12, −11.4 MWH, is the total of the secondary components of inadvertent interchange at Regions 1, 2 and 4 caused by the regulating state of Region 3 of the Western System and is equal to minus the component of the primary component of inadvertent interchange at Region 3 as shown in FIG. 6.

In comparable manner, the figure at the bottom of column 5 of FIG. 12, 27.1 MWH is the summation of the secondary components of inadvertent interchange at Regions 1, 2 and 3 created by the regulating state of Region 4 and is thus equal to minus the primary component of inadvertent interchange of Region 4, as shown in FIG. 6.

The figure shown at the bottom of row 6, 41.1 MWH, is for one thing, the summation of secondary components in all regions of the Western System caused by the regulating states of all other regions. It is also the summation of the numbers of the bottom row of the Table and hence is minus the summation of the effects of the regulating states of all four regions.

Thus it will be noted that the summation of the primary components of inadvertent interchange for all four regions, minus 41.1 MWH, as shown also at the bottom of the $I_{nn}$ column of FIG. 6, is equal to minus the summation of the secondary components of inadvertent interchange, 41.1 MWH, as shown at the bottom of the last column of FIG. 12. In other words, all primary components of inadvertent overgeneration or undergeneration are matched with comparable secondary components of inadvertent undergeneration or overgeneration in other regions so that for the system as a whole there is a zero sum of all primary components of inadvertent interchange and all secondary components of inadvertent interchange.

It will be understood that the matrix of FIG. 12 shown for four regions can be extended utilizing the techniques of this invention to a matrix for all present 33 areas of the Western System, including therein the (33×32) or 1056 separated components of secondary components of inadvertent interchange, as well as the minus values of the 33 components of primary components of inadvertent interchange, thus providing a complete, precise numerical spectrum of the effects of the regulating states in each of the areas, as well as the effect on all other areas of the regulating state in each area.

FIG. 13 is a comparable spectrum of the effects of the regulating states in the six regions of the Eastern System, and of the secondary components of inadvertent interchange that develop in all other regions as a result of each region's regulating state.

On the top data row, designated as n=1, there is shown in successive blocks the secondary components of inadvertent interchange in Region 1 caused by the regulating states in Regions 2, 3, 4, 5 and 6. The secondary component caused by Region 2, −2 MWH, results from the primary component of inadvertent overgeneration of 9 MWH in Region 2. The secondary component at Region 1 resulting from the regulating state in Region 3 amounts to 129 MWH of contribution toward the undergeneration in Region 3, contained in its primary component inadvertent of −581 MWH as shown also in FIG. 7. The extreme right-hand figure in the row for Region 1 of FIG. 13 shows a total secondary inadvertent for Region 1 of 506 MWH overgeneration to assist regulating deficiencies elsewhere. When added algebraically to the 128 MWH primary component of inadvertent interchange for Region 1 shown in FIG. 7, it adds up to the 644 MWH shown for total inadvertent interchange for Region 1 in FIG. 7, and of which all of the secondary components caused by Regions 2, 3, 4, 5, and 6, 506 MWH, and its own primary component of inadvertent interchange, 138 MWH, are the constituent parts.

Similar analyses can be made of each of the other lines of FIG. 13 showing the secondary components of a region caused by the regulating states of other regions, yielding in each case the total of secondary components for the region shown at the extreme right of the line. Also it will be noted that each vertical column represents the secondary components of inadvertent interchange in all of the other regions caused by the primary component of inadvertent interchange in a given region. It will be noted that the figure at the bottom of each column is the algebraic sum of the numbers above it and represents the minus primary component of inadvertent interchange of that region, the magnitude of which is also shown in the central column of FIG. 7.

Again, it will be understood that though the spectrum of the secondary components of inadvertent interchange shown in FIG. 13 is tabulated on a regional basis for the Eastern System, it also can be executed using the means and methods of this invention for all 100 areas of the Eastern System. Such a table or series of tables would then show (100) (99) or 9900 secondary components of inadvertent interchange caused by the regulating states, which is to say by the primary components of inadvertent interchange of the 100 control areas.

Thus the performance of each area of an interconnected system can be precisely monitored and the interconnected system, as a matter of economy and reliability for all, can insist on effective regulation in each area by that area, can, as an incentive to improvement, apply sanctions or penalties to areas that persistently regulate poorly, can achieve significant energy conservation by substituting unilateral independent corrective control action, based on individual area component of system time deviation or individual area primary component of inadvertent interchange, in place of prevailing energy-wasteful and inequitable techniques for universal time deviation correction and the bilateral or unilateral techniques for inadvertent interchange correction.

One technique for devising a system of incentive penalties and rewards for a designated time span would be to recognize that electrical energy has a unit cost that varies during the course of a day, depending on which generating units, with which efficiencies and fuel costs, are in operation, and on prevailing transmission losses. It is precisely this difference in cost in various areas at varying times of the day that stimulates scheduled bulk power transfers between areas. Unscheduled transfers, however, considering that they apply unexpected demands on other areas to supply or receive power, may have differing cost values depending on when they occur. Subsequent return of energy to compensate for previously taken unscheduled energy may be inequitable if it it done with low-cost energy to replace high-cost energy taken on a non-scheduled basis. With the information available as a result of this invention of the extent to which depatures from scheduled transfers are caused by which constituent areas, it would be possible to assign debits and credits for departures from schedules based on where the fault rested and what the prevailing cost was at that particular time.

Figure 14:
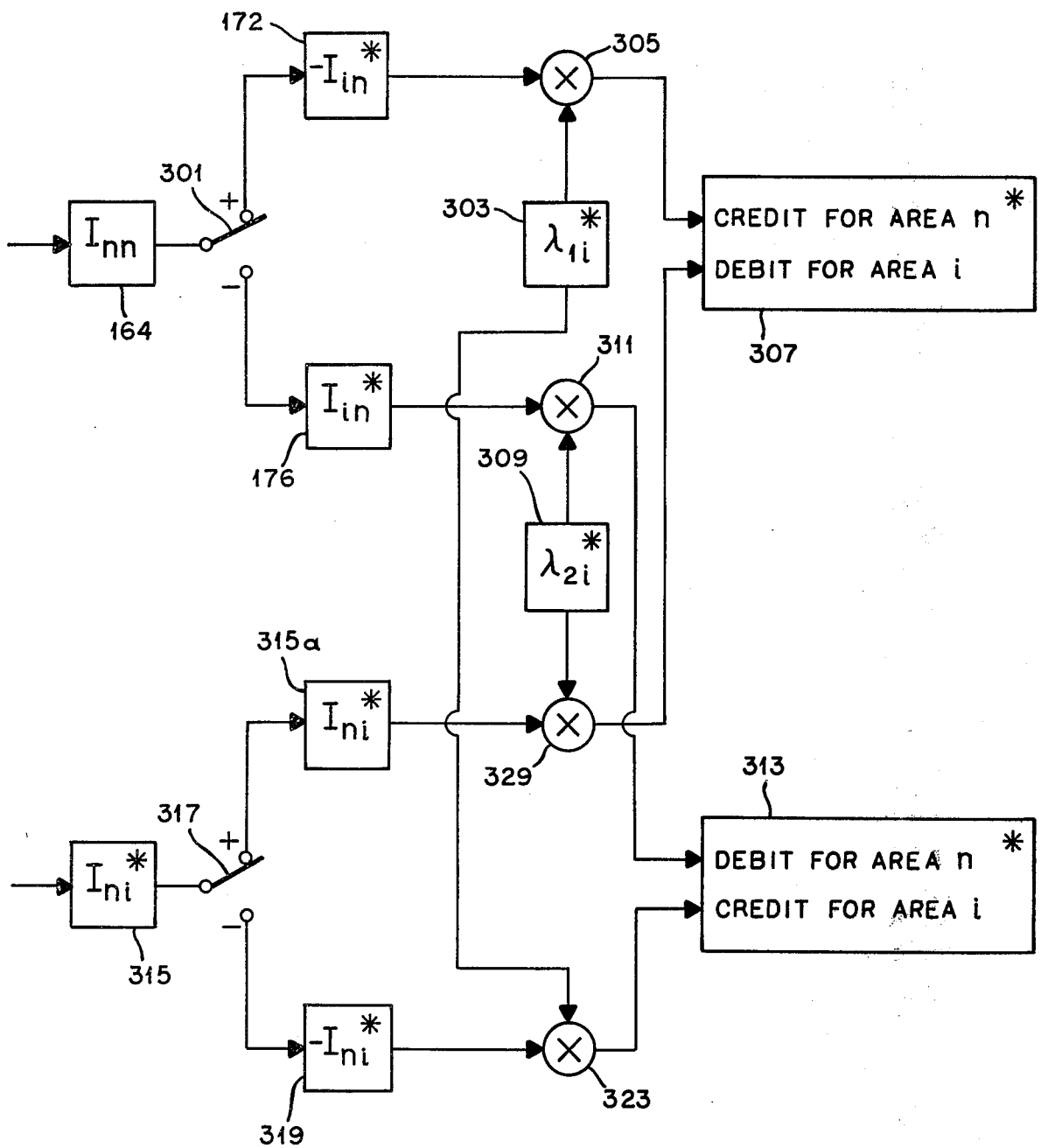
FIG. 14 is a schematic block diagram indicating how components of secondary inadvertent interchange can be evaluated for each area with respect to each other area of an interconnected system, with varying values assigned to unscheduled interchanges depending on direction of flow and prevailing area and system conditions.

FIG. 14 illustrates one such technique. A signal from the new memory parameter, the primary component of inadvertent interchange of area n at block 164 is switched to the plus position of selector switch 301 when the primary component of inadvertent interchange is excess energy "out". It this position there is a minus secondary component of inadvertent interchange at each remote area i, shown at block 172, reflecting excess energy "in" at those areas caused by the plus primary component of inadvertent interchange at area n. The asterisk in block 172 indicates there is one such signal for each remote area. Similarly, when selector switch 301 is in the minus position, indicating that the primary component of inadvertent interchange at area n is excess energy "in", there are excess energy "out" or plus secondary components of inadvertent interchange at all remote areas i, as indicated for one of them in block 176.

A signal representing each secondary component of inadvertent interchange at area n, one of which is shown at block 315, is routed through selector switch 317 to block 315a when the polarity is plus meaning excess energy "out", and through selector switch 317 to block 319 when polarity is minus, indicating excess energy "in". Again, the asterisks in the blocks indicate there are corresponding signals at area n caused by all remote areas i.

The values of energy during each time span for which the process is applied may be unique to each transmitting or receiving area or may be common to many or all areas. FIG. 14 is illustrative of a two-tier value system between area n and a specific remote area i. $\lambda_{1i}$ is the incremental value per MWH, derived using well known techniques as in Early U.S. Pat. Nos. 2,836,730 and 2,871,374, applicable to a primary component of inadvertent interchange flow from area n to area i, or a primary component of inadvertent interchange flow from area i to area n. The signal for this value is set at block 303. The value of energy per MWH of a secondary component of inadvertent interchange from area n to area i, or a secondary component of inadvertent interchange from area i to area n is $\lambda_{2i}$, the signal for which is set at block 309. It may well be that the value $\lambda_{1i}$ is relatively low since the energy to which it is applied derives from an area that is itself at fault in providing it to an area that may not need or wish to have it, and the transmitting area should be encouraged not to provide it. On the other hand, $\lambda_{2i}$ may be relatively high since the transmitting area is supplying it as unscheduled assistance to an area in need as a mandatory requirement of inter-area operation, and the receiving area should be encouraged to satisfy its own needs as fully as possible.

It will now be seen that the signals from blocks 172 and 303 are multiplied at 305 providing valuation of a primary component of inadvertent interchange flow from area n to area i resulting for the designated time span in a credit for area n and a debit for area i as indicated at block 307, the values of each of which may be relatively low for the reasons already noted. Similarly, the product of the signals from 319 and 303 at multiplier 323 fed to block 313 will represent for the designated time span a debit for area n and a credit for area i on account of a primary component of inadvertent interchange flow from area i received as a secondary component of inadvertent interchange at area n, with the values again being relatively low.

The product of the signals from 176 and 309 at multiplier 311 represents the value of a secondary component of inadvertent interchange transmitted from area i to fill the need of a negative primary component of inadvertent interchange at area n, the value being fed to block 313 as a debit for area n and a credit for area i, which value may be relatively high for the reasons already noted. Similarly, the signals from 315a and 309 as multiplied by multiplier 329 and fed to block 307 will represent the energy transmitted during the designated time span as a secondary component of inadvertent interchange from area n to satisfy a primary component of inadvertent interchange need at area i, and will be fed to block 307 as a credit for area n and a debit for area i, both of which may again be relatively high.

In this manner, utilizing analog or digital apparatus or combinations of them, all of which are well known to practitioners of the art, unscheduled transfers between areas are separated into primary and secondary components for each area. Equitable values can be assessed respectively, and overall credits and debits established to encourage the areas at fault to improve their control performance and to minimize unscheduled transfers.

What is claimed is:

1. In an interconnected electric power system including a plurality of control areas, each of said areas including at least one turbine-generator unit, said system operating under a set frequency schedule and a selected net interchange power transfer schedule for each of its constituent control areas, and wherein each of said constituent control areas utilizes a frequency-biased net interchange control system to fulfill its operating objective of maintaining a zero-error summation of its regulating states by automatically adjusting area generation in order to match changes in area load, to maintain area net interchange power transfers at a preset schedule when system frequency is on schedule, to deviate from said area net interchange power transfer schedule as a function of system frequency deviation when system frequency deviates from schedule, to participate in control of system frequency, to participate in correction of accumulations in the system memory parameter representing system time deviation, and to correct for accumulations in the area memory parameter representing area inadvertent interchange, and wherein the system time deviation is a total measure of the algebraic summation during a designated time span of the regulating states in all areas of the interconnected system, and consists of and is equal to the algebraic sum of area-caused components of varying magnitudes and signs including zero, in number equal to the number of constituent control areas, and each of which is an area memory parameter totally representative of the algebraic summation of the regulating states of said area during said designated time span, and each of which is separable from all other components independently of their respective magnitudes and algebraic signs, and the magnitude and sign of each is determinable utilizing known or measurable area and system parameters, the improvement comprising the method of measuring and utilizing said area-caused component of system time deviation for a particular area, including the following steps:

generating first signals corresponding to selected parameters of said particular area including the area frequency-bias setting and the area memory parameter representing the measured total inadvertent interchange accumulated during said designated time span;

combining said first signals with second signals corresponding to selected system parameters common to all areas including the measured system time deviation accumulated during said designated time span and the sum of the frequency-bias settings for all areas, to separate and measure the magnitude and sign of a new area memory parameter representing the component of system time deviation caused by the algebraic summation of regulating states in said particular area during said designated time span, and which is a total measure in units of time deviation, of the control performance of said particular area during said designated time span, and generating control signals for controlling the area generation through adjustment of the energy input to one or more area turbine-generator units so as to create an area regulating state that will simultaneously reduce toward zero said new area memory parameter as well as the primary component of the total inadvertent interchange of the area representing the portion of area total inadvertent interchange self-caused by regulating deficiencies of the area, and the secondary component of total inadvertent interchange of each remote area representing the portion of total inadvertent interchange of each said remote area caused by said regulating deficiencies of said particular area, by offsetting the frequency schedule of the frequency biased net interchange control system of said particular area to an extent that is a function of said new area parameter.

2. The method of claim 1, wherein the step of combining said first and second signals corresponding respectively to selected area and system parameters to separate and measure the magnitude and sign of the new memory parameter for area n, includes the step of computing $\epsilon_n$ from the equation:

$$\epsilon_n = -\frac{360}{B_s F_r}(I_n - \frac{B_n F_r \epsilon}{360})$$

where,
 ε is the system memory parameter representing the system time deviation, in seconds, accumulated during the designated time span,
 $I_n$ is the area n memory parameter representing the total area inadvertent interchange, in MWH, accumulated during the designated time span, and is plus for energy out,
 $B_s$ is the sum, in MW/0.1 Hz, of all area frequency bias settings, and has a minus sign,
 $B_n$ is the frequency bias setting in MW/0.1 Hz of area n, and has a minus sign,
 $F_r$ is the system reference frequency in Hz, and
 $\epsilon_n$ is the new area n memory parameter representing the area n caused component, in seconds, of system time deviation, and is a measure of area n control performance during the designated time span.

3. The method of claim 2 wherein the step of controlling the area generation by offsetting the frequency schedule of the frequency-biased net interchange control system of area n, includes the step of computing $\phi_n$ from the equation:

$$\phi_n = -\frac{F_r \epsilon_n}{3600 Y_n H_n}$$

where,
 $Y_n$ is the ratio of the area n frequency bias setting, $B_n$, to the sum of all frequency bias settings, $B_s$,
 $F_r$ is the system reference frequency in Hz,
 $H_n$ is time span, in hours, during which the corrective control action is to take place,
 $\epsilon_n$ is the area n component of system time deviation, in seconds, and
 $\phi_n$ is the offset, in Hz, in the area n frequency schedule to achieve in time span $H_n$ simultaneous corrective control of the area component of system time deviation, the area n primary component of inadvertent interchange, and the secondary component of area total inadvertent interchange caused in each remote area by the primary component of area n total inadvertent interchange.

4. In an interconnected electric power system including a plurality of control areas, each of said areas including at least one turbine-generator unit, said system operating under a set frequency schedule and a selected net interchange power transfer schedule for each of its control areas, and wherein each of said constituent control areas utilizes a frequency-biased net interchange control system to fulfill its operating objective of maintaining a zero-error summation of its regulation states by automatically adjusting area generation in order to match changes in area load,
 to maintain area net interchange power transfers at a preset schedule when system frequency is on schedule,
 to deviate from said area net interchange power transfer schedule as a function of system frequency deviation when system frequency deviates from schedule,
 to participate in control of system frequency,
 to participate in correction of accumulations in the system memory parameter representing system time deviation, and
 to correct for accumulations in the area memory parameter representing area inadvertent interchange, and wherein the total inadvertent interchange of a particular area during a designated time span consists of and is equal to the algebraic sum of components in number equal to the number of constituent control areas, all of which said components are memory parameters, each of which is caused respectively by the regulating deficiencies of an area of the interconnected system, one by the regulating deficiencies of said particular area and identified as the primary component of said total inadvertent interchange of said particular area, and totally representative of the algebriac summation of the regulating states of said particular area during said designated time span, while each of the others, identified as a secondary component of the total inadvertent interchange of said particular area, is caused by the regulating deficiencies of a corresponding remote area of the interconnected system, and the primary component and each of the secondary components of the total inadvertent interchange of said particular area are individually separable from all other components independently of their respective magnitude and algebraic signs, and the magnitude and sign of each is determinable utilizing known or measurable area and system parameters, the improvement comprising the method of measuring and utilizing said area-caused primary component of area inadvertent interchange for a particular area including the following steps:

generating first signals corresponding to selected parameters of said particular area including the area frequency-bias setting and the area memory parameter representing measured total inadvertent interchange accumulated during said designated time span, combining said first signals with second signals corresponding to selected system parameters common to all areas including the measured system time deviation accumulated during said designated time span and the sum of the frequency-bias settings for all areas, to separate and measure the magnitude and sign of a new area memory parameter representing the primary component of total area inadvertent interchange caused by the algebraic sum of regulating states in said particular area during said designated time span, and which is a total measure, in units of energy, of the control performance of said area during said designated time span, and generating control signals for controlling the area generation through adjustment of the energy input to one or more area turbine-generator units so as to create an area regulating state that will reduce toward zero said new area memory parameter representing the primary component of total area inadvertent interchange, as well as the area component of system time deviation and the secondary component of total inadvertent interchange in each remote area caused therein by said regulating deficiencies of said particular area, by offsetting the net interchange schedule of the frequency-biased net interchange control system of said particular area to an extent that is a function of said new area parameter representing the primary component of the total area inadvertent interchange of said particular area.

5. The method of claim 4, wherein the step of combining said first and second signals corresponding respectively to selected area and system parameters to separate and measure the magnitude and sign of the new area memory parameter, for area n, includes the step of computing $I_{nn}$ from the equation:

$$I_{nn} = (1 - Y_n)(I_n - \frac{B_n F_r \epsilon}{360})$$

where,
- $B_n$ is the frequency-bias setting in MW/0.1 Hz of area n, and has a minus sign,
- $Y_n$ is the ratio of $B_n$ to the sum of all area frequency bias settings, $B_s$, in MW/0.1 Hz,
- $\epsilon$ is the system memory parameter representing the system time deviation, in seconds, accumulated during the designated time span,
- $I_n$ is the area n memory parameter representing the total area inadvertent interchange, in MWH, accumulated during the designated time span, and is plus for energy out,
- $F_r$ is the system reference frequency, in Hz, and
- $I_{nn}$ is the new area n memory parameter representing the area n caused primary component, in MWH, of the total area n inadvertent interchange, is a measure of area n control performance during the designated time spane, and is plus for energy out.

6. The method of claim 5, wherein the step of controlling the area generation by offsetting the net interchange schedule of the frequency-biased net interchange control system of area n, includes the step of computing $\hat{\tau}_n$ from the equation:

$$\hat{\tau}_n = \frac{-I_{nn}}{(1 - Y_n)(H_n)}$$

where,
- $Y_n$ is the ratio of the area n frequency-bias setting, $B_n$, to the sum of all area frequency bias settings, $B_s$,
- $H_n$ is the time span, in hours, during which the corrective control action is to take place, and
- $I_{nn}$ is the primary component, in MWH, of total area n inadvertent interchange, energy out being plus, and
- $\tau_n$ is the offset in MW, in area n net interchange power transfer schedule to achieve simultaneous corrective control of the area n primary component of inadvertent interchange, of the secondary component of total area inadvertent interchange caused in each remote area by the primary component of area n total inadvertent interchange, and of the area n component of system time deviation.

7. The method of claim 4 further comprising the separation and measurement of magnitude and sign of the secondary component of total inadvertent interchange of a designated remote area caused by the primary component of total inadvertent interchange in said particular area including the following steps:

generating a third signal corresponding to the frequency-bias setting of said designated remote area, combining said first and second signals with said third signal, to separate and measure the magnitude and sign of a new remote area memory parameter representing the secondary component of total inadvertent interchange of said remote area caused by the primary component of inadvertent interchange of said particular area, and which is a measure, in units of energy, of the effect of the control performance of said particular area on the inadvertent interchange of said designated remote area.

8. The method of claim 7, wherein the step of combining said first and second and said third signals to separate and measure the magnitude and sign of the secondary component of total inadvertent interchange in designated remote area i caused by the primary component of inadvertent interchange in particular area n, includes the step of computing $I_{in}$ from the equation:

$$I_{in} = -\frac{Y_i}{1 - Y_n}(I_{nn})$$

where,
- $Y_i$ is the ratio of the frequency-bias setting, $B_i$, of area i to the sum of frequency-bias settings, $B_s$, for all areas,
- $Y_n$ is the ratio of the frequency-bias setting, $B_n$, of area n to the sum of frequency-bias settings, $B_s$, for all areas,
- $I_{nn}$ is the primary component, in MWH, of the total inadvertent interchange in area n, energy out being plus, and
- $I_{in}$ is the new area i memory parameter representing the secondary component, in MWH, of area i total inadvertent interchange caused by the regulating deficiencies of area n, energy in being minus.

9. The method of claim 7 further comprising the measurement and evaluation of unscheduled energy transferred between areas and appearing as secondary components of total inadvertent interchange of each area, including the following steps:

generating fourth signals corresponding to incremental values of secondary components of inadvertent interchange energy caused by each particular area and sent to said particular area from other areas, and generating fifth signals corresponding to incremental values of secondary components of inadvertent interchange energy caused by each said particular area and received at other areas during a designated time period, not all values for energy sent out being necessarily the same for all areas, nor the values for energy received being necessarily the same for all areas, combining each of said fourth signals with individual sixth signals each corresponding to a secondary component of inadvertent interchange supplied to a particular area by a designated remote area, each combination being an eighth signal serving as credit to said designated remote area as the supplying area and debit to said particular area as the receiving area in which said remote area secondary component appears as a part of the primary component of inadvertent interchange of said receiving area, combining each of said fifth signals with individual seventh signals each corresponding to a secondary component of inadvertent interchange received by a designated remote area from a particular area, each combination being a ninth signal serving as debit to said designated remote area as the receiving area and credit to said particular area as the supplying area in which said remote area secondary component appears as a part of the primary component of inadvertent interchange of said supplying area, and combining said eighth and ninth signals corresponding to all credits and debits for each area to produce for that area a tenth signal that represents the composite value during said designated time period of unscheduled interchanges of that area with each of the other areas of the interconnected system, thereby providing an overall evaluation of unscheduled interchange between areas of the interconnected system during a designated time span, and providing an incentive for improved operating reliability and economy of the interconnected system.

10. In an interconnected electric power system including a plurality of control areas, each of said areas including at least one turbine-generator unit, said system operating under a set frequency schedule and a selected net interchange power transfer schedule for each of its constituent control area, and wherein each of said constituent control areas utilizes a frequency-biased net interchange control system to fulfill its operating objective of maintaining a zero-error summation of the regulating states by automatically adjusting area generation in order to match change in area load, to maintain area net interchange power transfers at a preset schedule when system frequency is on schedule, to deviate from said area net interchange power transfer schedule as a function of system frequency deviation when system frequency deviates from schedule, to participate in control of system frequency, to participate in correction of accumulations in the system memory parameter representing system time deviation, and to correct for accumulations in the area memory parameter representing area inadvertent interchange, and wherein the system time deviation is a total measure of the algebraic summation during a designated time span of the regulating states in all states of the interconncted system, and consists of and is equal to the algebraic sum of area-caused components of varying magnitudes and signs including zero, in number equal to the number of constituent control areas, and each of which is an area memory parameter totally representative of the algebraic summation of the regulating states of said area during said designated time span, and each of which is separable from all other components independently of their respective magnitudes and algebraic signs, and the magnitude and sign of each is determinable utilizing known or measurable area and system parameters, the improvement comprising the method of measuring and utilizing the magnitude and sign of said area-caused component of system time deviation for a particular area, including the following steps:

generating first signals corresponding to selected parameters of said particular area including the area frequency-bias setting and the area memory parameter representing the total inadvertent interchange accumulated during said designated time span, combining said first signals with second signals corresponding to selected system parameters common to all areas including the measured system time deviation accumulated during said designated time spane and the sum of the frequency-bias settings for all areas, to separate and measure the magnitude and sign of a new area memory parameter representing the component of system time deviation caused by the algebraic summation of regulating states in said particular area during said designated time span, and which is a total measure in units of time deviation, of the control performance of said particular area during said designated time span.

11. The method of claim 10, wherein the step of combining said first and second signals corresponding respectively to selected area and system parameters to separate and measure the magnitude and sign of the new area memory parameter for area n, includes the step of computing $\epsilon_n$ from the equation:

$$\epsilon_n = -\frac{360}{B_s F_r}(I_n - \frac{B_n F_r \epsilon}{360})$$

where, $\epsilon$ is the system memory parameter representing the system time deviation, in seconds, accumulated during the designated time span, $I_n$ is the area n memory parameter representing the total area inadvertent interchange, in MWH, accumulated during the designated time span, and is plus for energy out, $B_s$ is the sum, in MW/0.1 Hz, of all area frequency bias settings, and has a minus sign, $B_n$ is the frequency bias setting in MW/0.1 Hz of area n, and has a minus sign, $F_r$ is the system reference frequency in Hz, and $\epsilon_n$ is the new area n memory parameter representing the area n caused component, in seconds, of system time deviation, and is a measure of area n control performance during the designated time span.

12. In an interconnected electric power system, including a plurality of control areas, each of said areas including at least one turbine-generator unit, said system operating under a set frequency schedule and a selected net interchange power transfer schedule for each of its control areas, and wherein each of said constituent control areas utilizes a frequency-biased net interchange control system to fulfill its operating objective of maintaining a zero-error summation of its regulating states by automatically adjusting area generation in order to match changes in area load, to maintain area net interchange power transfers at a preset schedule when system frequency is on schedule, to deviate from said area net interchange power transfer schedule as a function of system frequency deviation when system frequency deviates from schedule, to participate in control of system frequency, to participate in correction of accumulations in the system memory parameter representing system time deviation, and to correct for accumulations in the area memory parameter representing area inadvertent interchange, and wherein the total inadvertent interchange of a particular area during a designated time span consists of and is equal to the algebraic sum of components in number equal to the number of constituent control areas, all of which said components are memory parameters, each of which is caused respectively by the regulating deficiencies of an area of the interconnected system, one by the regulating deficiencies of said particular area and identified as the primary component of said total inadvertent interchange of said particular area, and totally representative of the algebraic summation of the regulating states of said particular area during said designated time span, while each of the others, identified as a secondary component of the total inadvertent interchange of said particular area, is caused by the regulating deficiencies of a corresponding remote area of the interconnected system, and the primary component and each of the secondary components of the total inadvertent interchange of said particular area are individually separable from all other components indendently of their respective magnitudes and algebraic signs, and the magnitude and sign of each is determinable utilizing known or measurable area and system parameters, the improvement comprising the method of measuring and utilizing said area-caused primary component of area inadvertent interchange for a particular area including the following steps:

generating first signals corresponding to selected area parameters of said particular area including the area frequency-bias setting and the area memory parameter representing measured total inadvertent interchange accumulated during said designated time span, combining said first signals with second signals corresponding to selected system parameters common to all areas including the measured system time deviation accumulated during said designated time span and the sum of the frequency-bias settings for all areas, to separate and measure the magnitude and sign of a new area memory parameter representing the primary component of total area inadvertent interchange caused by the algebraic sum of regulating states in said particular area during said designated time span, and which is a total measure, in units of energy, of the control performance of said area during said designated time span.

13. The method of claim 12, wherein the step of combining said first and second signals corresponding respectively to selected area and system parameter to separate and measure the magnitude and sign of the new area memory parameter, for area n, includes the step of computing $I_{nn}$ from the equation:

$$I_{nn} = (1 - Y_n)(I_n - \frac{B_n F_r \epsilon}{360})$$

where, $B_n$ is the frequency-bias setting in MW/0.1 Hz of area n, and has a minus sign, $Y_n$ is the ratio of $B_n$ to the sum of all area frequency bias settings, $B_s$, in MW/0.1 Hz, $\epsilon$ is the system memory parameter representing the system time deviation, in seconds, accumulated during the designated time span, $I_n$ is the area n memory parameter representing the total area inadvertent interchange, in MWH, accumulated during the designated time span, and is plus for energy out, $F_r$ is the system reference frequency, in Hz, and $I_{nn}$ is the new area n memory parameter representing the area n caused primary component, in MWH, of the total area n inadvertent interchange, is a measure of area n control performance during the designated time span, and is plus for energy out.

14. The method of claim 12 further comprising the separation and measurement of magnitude and sign of the secondary component of total inadvertent interchange of a designated remote area caused by the primary component of total inadvertent interchange in said particular area including the following steps:

generating a third signal corresponding to the frequency-bias setting of said designated remote area, combining said first, second and third signals, to separate and measure the magnitude and sign of a new remote area memory parameter representing the secondary component of total inadvertent interchange of said remote area caused by the primary component of inadvertent interchange of said particular area, and which is a measure, in units of energy, of the effect of the control performance of said particular area on the inadvertent interchange of said designated remote area.

15. The method of claim 14, wherein the step of combining said first, second and third signals to separate and measure the magnitude and sign of the secondary component of total inadvertent interchange in designated remote area i caused by the primary component of inadvertent interchange in particular area n, includes the step of computing $I_{in}$ from the equation:

$$I_{in} = -\frac{Y_i}{1 - Y_n}(I_{nn})$$

where, $Y_i$ is the ratio of the frequency-bias setting, $B_i$, of area i to the sum of frequency-bias settings, $B_s$, for all areas, $Y_n$ is the ratio of the frequency-bias setting, $B_n$, of area n to the sum of frequency-bias settings, $B_s$, for all areas, $I_{nn}$ is the primary component, in MWH, of the total inadvertent interchange in area n, energy out being plus, and $I_{in}$ is the new area i memory parameter representing the second component, in MWH, of area i total inadvertent interchange caused by the regulating deficiencies of area n, energy in being minus.

16. The method of claim 14 further comprising the measurement and evaluation of unscheduled energy transferred between areas and appearing as secondary components of total inadvertent interchange of each area, including the following steps:

generating fourth signals corresponding to incremental values of secondary components of inadvertent interchange energy caused by each particular area and sent to each particular area from other areas, and generating fifth signals corresponding to incremental values of secondary components of inadvertent interchange energy caused by each said particular area and received at other areas during a designated time period, not all values for energy sent out being necessarily the same for all areas, nor the values for energy received being necessarily the same for all areas, combining each of said fourth signals with individual sixth signals each corresponding to a secondary component of inadvertent interchange supplied to a particular area by a designated remote area, each combination being an eighth signal serving as credit to said designated remote area as the supplying area and debit to said particular area as the receiving area in which said remote area secondary component appears as a part of the primary component of inadvertent interchange of said receiving area, combining each of said fifth signals with individual seventh signals each corresponding to a secondary component of inadvertent interchange received by a designated remote area from a particular area, each combination being a ninth signal serving as debit to said designated remote area as the receiving area and credit to said particular area as the supplying area in which said remote area secondary component appears as a part of the primary component of inadvertent interchange of said supplying area, and combining said eighth and ninth signals corresponding to all credits and debits for each area to produce for that area a tenth signal that represents the composite value during said designated time period of unscheduled interchanges of that area with each of the other areas of the interconnected system, thereby providing an overall evaluation of unscheduled interchange between areas of the interconnected system during a designated time span, and providing an incentive for improved operating reliability and accuracy of the interconnected system.

17. In an interconnected electric power system including a plurality of control areas, each of said areas including at least one turbine-generator unit, said system operating under a set frequency schedule and a selected net interchange power transfer schedule for each of its constituent control areas, and wherein each of said constituent control areas utilizes a frequency-biased net interchange control system to fulfill its operating objective of maintaining a zero-error summation of its regulating states by automatically adjusting area generation in order to match changes in area load, to maintain area net interchange power transfers at a preset schedule when system frequency is on schedule, to deviate from said area net interchange power transfer schedule as a function of system frequency deviation when system frequency deviates from schedule, to participate in control of system frequency, to participate in correction of accumulations in the system memory parameter representing system time deviation, and to correct for accumulations in the area memory parameter representing area inadvertent interchange, and wherein the system time deviation is a total measure of the algebraic summation during a designated time span of the regulating states in all areas of the interconnected system, and consists of and is equal to the algebraic sum of area-caused components of varing magnitudes and signs including zero, in number equal to the number of constituent control areas, and each of which is an area memory parameter totally representative of the algebraic summation of the regulating states of said area during said designated time span, and each of which is separable from all other components independently of their respective magnitudes and algebraic signs, and the magnitude and sign of each is determinable utilizing known or measurable area and system parameters, the improvement comprising means for measuring and utilizing said area-caused component of system time deviation for a particular area, including:

first means for identifying the particular area by selecting the area parameters related thereto including the area frequency-bias setting and the area memory parameter representing the measured total inadvertent interchange accumulated during said designted time span;

second means coupled to said first means for utilizing the selected area parameters in combination with system parameters common to all areas including the measured system time deviation accumulated during said designated time span and the sum of the frequency-bias settings for all areas, to separate and measure the magnitude and sign of a new area memory parameter representing the component of system time deviation caused by the algebraic summation of regulating states in said particular area during said designated time span, and which is a total measure in units of time deviation, of the control performance of said particular area during said designated time span, and third means coupled to said second means for controlling the area generation through adjustment of the energy input to one or more area turbine-generator units so as to create an area regulating state that will simultaneously reduce toward zero said new area memory parameter as well as the primary component of the total inadvertent interchange of the area representing the portion of area total inadvertent interchange self-caused by regulating deficiencies of the area, and the secondary component of total inadvertent interchange of each remote area representing the portion of total inadvertent interchange of each said remote area caused by said regulating deficiencies of said particular area, by offsetting the frequency schedule of the frequency biased net interchange control system of said particular area to an extent that is a function of said new area parameter.

18. The system of claim 17, wherein said second means for utilizing the area and system parameters to separate and measure the magnitude and sign of the new memory parameter for area n includes means for solving the equation:

$$\epsilon_n = -\frac{360}{B_s F_r}(I_n - \frac{B_n F_r \epsilon}{360})$$

where, $\epsilon$ is the system memory parameter representing the system time deviation, in seconds, accumulated during the designated time span, $I_n$ is the area n memory parameter representing the total area inadvertent interchange, in MWH, accumulated during the designated time span, and is plus for energy out, $B_s$ is the sum, in MW/0.1 Hz, of all area frequency bias settings, and has a minus sign, $B_n$ is the frequency bias setting in MW/0.1 Hz of area n, and has a minus sign, $F_r$ is the system reference frequency in Hz, and $\epsilon_n$ is the new area n memory parameter representing the area n caused component, in seconds, of system time deviation, and is a measure of area n control performance during the designated time span.

19. The system of claim 18, wherein said third means for controlling the area generation by offsetting the frequency schedule of the frequency-biased net interchange control system of area n includes means for solving the equation:

$$\hat{\phi}_n = -\frac{F_r \epsilon_n}{3600 Y_n H_n}$$

where, $Y_n$ is the ratio of the area n frequency bias setting, $B_n$, to the sum of all frequency bias settings, $B_s$, $F_r$ is the system reference frequency in Hz, $H_n$ is time span, in hours, during which the corrective control action is to take place, $\epsilon_n$ is the area n component of system time deviation, in seconds, and $\hat{\phi}_n$ is the offset, in Hz, in area n frequency schedule to achieve in time span $H_n$ simultaneous corrective control of the area component of system time deviation, the area n primary component of inadvertent interchange, and the secondary component of area total inadvertent interchange caused in each remote area by the primary component of area n total inadvertent interchange.

20. In an interconnected electric power system including a plurality of control area, each of said areas including at least one turbine-generator unit, said system operating under a set frequency schedule and a selected net interchange power transfer schedule for each of its control areas, and wherein each of said constituent control areas utilizes a frequency-biased net interchange control system to fulfill its operating objective of maintaining a zero-error summation of its regulating states by automatically adjusting area generation in order to match changes in area load, to maintain area net interchange power transfers at a preset schedule when system frequency is on schedule, to deviate from said area net interchange power transfer schedule as a function of system frequency deviation where system frequency deviates from schedule, to participate in control of system frequency, to participate in correction of accumulations in the system memory parameter representing system time deviation, and to correct for accumulations in the area memory parameter representing area inadvertent interchange, and wherein the total inadvertent interchange of a particular area during a designated time span consists of and is equal to the algebraic sum of components in number equal to the number of constituent control areas, all of which said components are memory parameters, each of which is caused respectively by the regulating deficiencies of an area of the interconnected system, one by the regulating deficiencies of said particular area and identified as the primary component of said total inadvertent interchange of said particular area, and totally representative of the algebraic summation of the regulating states of said particular area during said designated time span, while each of the others, identified as a secondary component of the total inadvertent interchange of said particular area, is caused by the regulating deficiencies of a corresponding remote area of the interconnected system, and the primary component and each of the secondary components of the total inadvertent interchange of said particular area are individually separable from all other components independently of their respective magnitudes and algebraic signs, and the magnitude and sign of each is determinable utilizing known or measurable area and system parameters, the improvement comprising the means for measuring and utilizing said area-caused primary component of area inadvertent interchange for a particular area including:

first means for identifying the particular area by selecting the area parameters related thereto including the area frequency-bias setting and the area memory parameter representing measured total inadvertent interchange accumulated during said designated time span, second means coupled to said first means for utilizing the selected area parameters in combination with system parameters common to all areas including the measured system time deviation accumulated during said designated time span and the sum of the frequency-bias settings for all areas, to separate and measure the magnitude and sign of a new area memory parameter representing the primary component of total area inadvertent interchange caused by the algebraic sum of regulating states in said particular area during said designated time span, and which is a total measure, in units of energy, of the control performance of said area during said designated time span, and third means coupled to said second means for controlling the area generation through adjustment of the energy input to one or more area turbine-generator units so as to create an area regulating state that will reduce toward zero said new area memory parameter representing the primary component of total area inadvertent interchange, as well as the area component of system time deviation and the secondary component of total inadvertent interchange in each remote area caused therein by said regulating deficiencies of said particular area, by offsetting the net interchange schedule of the frequency-biased net interchange control systems of said particular area to an extent that is a function of said new area parameter representing the primary component of the total area inadvertent interchange of said particular area.

21. The system of claim 20, wherein said second means for utilizing the area and system parameters to separate and measure the magnitude and sign of the new area memory parameter, for area n, includes means for solving the equation:

$$I_{nn} = (1 - Y_n)(I_n - \frac{B_n F_r \epsilon}{360})$$

where,
- $B_n$ is the frequency-bias setting in MW/0.1 Hz of area n, and has a minus sign,
- $Y_n$ is the ratio of $B_n$ to the sum of all area frequency bias settings, $B_s$, in MW/0.1 Hz,
- $\epsilon$ is the system memory parameter representing the system time deviation, in seconds, accumulated during the designated time span,
- $I_n$ is the area n memory parameter representing the total area inadvertent interchange, in MWH, accumulated during the designated time span, and is plus for energy out,
- $F_r$ is the system reference frequency, in Hz, and
- $I_{nn}$ is the new area n memory parameter representing the area n caused primary component, in MWH, of the total area n inadvertent interchange, is a measure of area n control performance during the designated time span, and is plus for energy out.

22. The system of claim 21, wherein said third means for controlling the area generation by offsetting the net interchange schedule of the frequency-biased net interchange control system of area n, includes means for solving the equation:

$$\tau_n = \frac{-I_{nn}}{(1 - Y_n)(H_n)}$$

where,
- $Y_n$ is the ratio of the area n frequency-bias setting, $B_n$, to the sum of all area frequency bias settings, $B_s$,
- $H_n$ is the time span, in hours, during which the corrective control action is to take place, and
- $I_{nn}$ is the primary component, in MWH, of total area n inadvertent interchange, energy out being plus, and
- $\tau_n$ is the offset in MW, in area n net interchange power transfer schedule to achieve simultaneous corrective control of the area n primary component of inadvertent interchange, of the secondary component of total area inadvertent interchange caused in each remote area by the primary component of area n total inadvertent interchange, and of the area n component of system time deviation.

23. The system of claim 20 further comprising means for the separation and measurement of magnitude and sign of the secondary component of total inadvertent interchange of a designated remote area caused by the primary component of total inadvertent interchange in said particular area including:

fourth means for identifying the designated remote area by selecting a parameter related thereto representing its frequency-bias setting, and fifth means coupled to said fourth means utilizing the selected parameter of said designated remote area in combination with the frequency-bias setting and the primary inadvertent interchange component of said particular area, and with system parameters common to all areas including the sum of the bias settings of all areas, to separate and measure the magnitude and sign of a new remote area memory parameter representing the secondary component of total inadvertent interchange of said remote area caused by the primary component of inadvertent interchange of said particular area, and which is a measure, in units of energy, of the effect of the control performance of said particular area on the inadvertent interchange of said designated remote area.

24. The system of claim 23, wherein said fifth means for utilizing the area and system parameters to separate and measure the magnitude and sign of the secondary component of total inadvertent interchange in designated remote area i caused by the primary component of inadvertent interchange in particular area n, includes means for solving $$I_{in} = -\frac{Y_i}{1 - Y_n}(I_{nn})$$

where,
- $Y_i$ is the ratio of the frequency-bias setting, $B_i$, of area i to the sum of frequency-bias settings, $B_s$, for all areas,
- $Y_n$ is the ratio of the frequency-bias setting, $B_n$, of area n to the sum of frequency-bias settings, $B_s$, for all areas,
- $I_{nn}$ is the primary component, is MWH, of the total inadvertent interchange in area n, energy out being plus, and
- $I_{in}$ is the new area i memory parameter representing the secondary component, in MWH, of area i total inadvertent interchange caused by the regulating deficiencies of area n, energy in being minus.

25. The system of claim 23 further comprising means for the measurement and evaluation of unscheduled energy transferred between areas and appearing as secondary components of total inadvertent interchange of each area, including:

sixth means for assigning incremental values to secondary components of inadvertent interchange energy sent to other areas, and incremental values to secondary components of inadvertent interchange energy received from other areas during a designated time period, not all values for energy sent out being necessarily the same for all areas, nor the values for energy received being necessarily the same for all areas, seventh means coupled to said sixth means for determining the product of each positive secondary component of inadvertent interchange and the correspondingly assigned values to serve as credit to the supplying area and debit to the receiving area in which said positive secondary component appears as a part of the negative primary component of inadvertent interchange of said receiving area, eighth means coupled to said sixth means for determining the product of each negative secondary component of inadvertent interchange and the correspondingly assigned value to serve as debit to the receiving area and credit to the supplying area in which said negative secondary component appears as a part of the positive primary component of inadvertent interchange of said supplying area, and ninth means coupled to said seventh and eighth means for compiling all credits and debits for each area to establish the composite value during said designated time period of unscheduled interchanges of each of said areas with each of the other said areas of the interconnected system, thereby providing an overall evaluation of unscheduled interchange between each pair of areas of the interconnected system during a designated time span, and providing an incentive for improved operating reliability and economy of the interconnected system.

26. In an interconnected electric power system including a plurality of control areas, each of said areas including at least one turbine-generator unit, said system operating under a set frequency schedule and a selected net interchange power transfer schedule for each of its constituent control areas, and wherein each of said constituent control areas utilizes a frequency-biased net interchange control system to fulfill its operating objective of maintaining a zero-error summation of its regulating states by automatically adjusting area generation in order to match changes in area load, to maintain area net interchange power transfers at a preset schedule when system frequency is on schedule, to deviate from said area net interchange power transfer schedule as a function of system frequency deviation when system frequency deviates from schedule, to participate in control of system frequency, to participate in correction of accumulations in the system memory parameter representing system time deviation, and to correct for accumulations in the area memory parameter representing area inadvertent interchange, and wherein the system time deviation is a total measure of the algebraic summation during a designated time span of the regulating states in all areas of the interconnected system, and consists of and is equal to the algebraic sum of area-caused components of varying magnitudes and signs including zero, in number equal to the number of constituent control areas, and each of which is an area memory parameter totally representative of the algebraic summation of the regulating states of said area during said designated time span, and each of which is separable from all other components independently of their respective magnitudes and algebraic signs, and the magnitude and sign of each is determinable utilizing known or measurable area and system parameters, the improvement comprising means for measuring and utilizing the magnitude and sign of said area-caused component of system time deviation for a particular area, including:

first means for identifying the particular area by selecting the area parameters related thereto including the area frequency-bias setting and the area memory parameter representing the total inadvertent interchange accumulated during said designated time span, second means coupled to said first means for utilizing the selected area parameters in combination with system parameters common to all areas including the measured system time deviation accumulated during said designated time span and the sum of the frequency-bias settings for all areas, to separate and measure the magnitude and sign of a new area memory parameter representing the component of system time deviation caused by the algebraic summation of regulating states in said particular area during said designated time span, and which is a total measure in units of time deviation, of the control performance of said particular area during said designated time span.

27. The system of claim 26, wherein said second means for utilizing the area and system parameters to separate and measure the magnitude and sign of the new area memory parameter for area n, includes means for solving the equation:

$$\epsilon_n = -\frac{360}{B_s F_r}(I_n - \frac{B_n F_r \epsilon}{360})$$

where, $\epsilon$ is the system memory parameter representing the system time deviation, in seconds, accumulated during the designated time span, $I_n$ is the area n memory parameter representing the total area inadvertent interchange, in MWH, accumulated during the designated time span, and is plus for energy out, $B_s$ is the sum, in MW/0.1 Hz, of all area frequency bias settings, and has a minus sign, $B_n$ is the frequency bias setting in MW/0.1 Hz of area n, and has a minus sign, $F_r$ is the system reference frequency in Hz, and $\epsilon_n$ is the new area n memory parameter representing the area n caused component, in seconds, of system time deviation, and is a measure of area n control performance during the designated time span.

28. In an interconnected electric power system, including a plurality of control area, each of said areas including at least one turbine-generator unit, said system operating under a set frequency schedule and a selected net interchange power transfer schedule for each of its control areas, and wherein each of said constituent control areas utilizes a frequency-biased net interchange control system to fulfill its operating objective of maintaining a zero-error summation of its regulating states by automatically adjusting area generation in order to match changes in area load, to maintain area net interchange power transfers at a preset schedule when system frequency is on schedule, to deviate from said area net interchange power transfer schedule as a function of system frequency deviation where system frequency deviates from schedule, to participate in control of system frequency, to participate in correction of accumulations in the system memory parameter representing system time deviation, and to correct for accumulations in the system memory parameter representing system time deviation, and to correct for accumulations in the area memory parameter representing area inadvertent interchange, and wherein the total inadvertent interchange of a particular area during a designated time span consists of and is equal to the algebraic sum of components in number equal to the number of constituent control areas, all of which said components are memory parameters, each of which is caused respectively by the regulating deficiencies of an area of the interconnected system, one by the regulating deficiencies of said particular area and identified as the primary component of said total inadvertent interchange of said particular area, and totally representative of the algebraic summation of the regulating states of said particular area during said designated time span, while each of the others, identified as a secondary component of the total inadvertent interchange of said particular area, is caused by the regulating deficiencies of a corresponding remote area of the interconnected system, and the primary component and each of the secondary components of the total inadvertent interchange of said particular area are individually separable from all other components independently of their respective magnitudes and algebraic signs, and the magnitude and sign of each is determinable utilizing known or measurable area and system parameters, the improvement comprising means for measuring and utilizing said area-caused primary component of area inadvertent interchange for a particular area including:

first means for identifying the particular area by selecting the area parameters related thereto including the area frequency-bias setting and the area memory parameter representing measured total inadvertent interchange accumulated during said designated time span, second means coupled to said first means for utilizing the selected area parameters in combination with system parameters common to all areas including the measured system time deviation accumulated during said designated time span and the sum of the frequency-bias settings for all areas, to separate and measure the magnitude and sign of a new area memory parameter representing the primary component of total area inadvertent interchange caused by the algebraic sum of regulating states in said particular area during said designated time span, and which is a total measure, in units of energy, of the control performance of said area during said designated time span.

29. The system of claim 28, wherein said second means for utilizing the area and system parameter to separate and measure the magnitude and sign of the new area memory parameter, for area n, includes means for solving the equation:

$$I_{nn} = (1 - Y_n)(I_n - \frac{B_n F_r \epsilon}{360})$$

where, $B_n$ is the frequency-bias setting in MW/0.1 Hz of area n, and has a minus sign, $Y_n$ is the ratio of $B_n$ to the sum of all area frequency bias settings, $B_s$, in MW/0.1 Hz, $\epsilon$ is the system memory parameter representing the system time deviation, in seconds, accumulated during the designated time span, $I_n$ is the area n memory parameter representing the total area inadvertent interchange, in MWH, accumulated during the designated time span, and is plus for energy out, $F_r$ is the system reference frequency, in Hz, and $I_{nn}$ is the new area n memory parameter representing the area n caused primary component, in MWH, of the total area n inadvertent interchange, is a measure of area n control performance during the designated time span, and is plus for energy out.

30. The system of claim 28 further comprising means for the separation and measurement of magnitude and sign of the secondary component of total inadvertent interchange of a designated remote area caused by the primary component of total inadvertent interchange in said particular area including:

third means for identifying the designated remote area by selecting a parameter related thereto representing its frequency-bias setting, and fourth means coupled to said third means for utilizing the selected parameter of said designated remote area in combination with the frequency-bias setting and the primary inadvertent interchange component of said particular area, and with system parameters common to all areas including the sum of the bias settings of all areas, to separate and measure the magnitude and sign of a new remote area memory parameter representing the secondary component of total inadvertent interchange of said remote area caused by the primary component of inadvertent interchange of said particular area, and which is a measure, in units of energy, of the effect of the control performance of said particular area on the inadvertent interchange of said designated remote area.

31. The system of claim 30, wherein said fourth means for utilizing the area and system parameters to separate and measure the magnitude and sign of the secondary component of total inadvertent interchange in designated remote area i caused by the primary component of inadvertent interchange in particular area n, includes means for solving the equation:

$$I_{in} = -\frac{Y_i}{1 - Y_n}(I_{nn})$$

where, $Y_i$ is the ratio of the frequency-bias setting, $B_i$, of area i to the sum of frequency-bias settings, $B_s$, for all areas, $Y_n$ is the ratio of the frequency-bias setting, $B_n$, of area n to the sum of frequency-bias settings, $B_s$, for all areas, $I_{nn}$ is the primary component, in MWH, of the total inadvertent interchange in area n, energy out being plus, and $I_{in}$ is the new area i memory parameter representing the secondary component, in MWH, of area i total inadvertent interchange caused by the regulating deficiencies of area n, energy in being minus.

32. The system of claim 30 further comprising means for the measurement and evaluation of unscheduled energy transferred between areas and appearing as secondary components of total inadvertent interchange of each area, including:

fifth means for assigning incremental values to secondary components of inadvertent interchange energy sent to other areas, and incremental values to secondary components of inadvertent interchange energy received from other areas during a designated time period, not all values for energy sent out being necessarily the same for all areas, nor the values for energy received being necessarily the same for all areas, sixth means coupled to said fifth means for determining the product of each positive secondary component of inadvertent interchange and the correspondingly assigned values to serve as credit to the supplying area and debit to the receiving area in which said positive secondary component appears as a part of the negative primary component of inadvertent interchange of said receiving area, seventh means coupled to said fifth means for determining the product of each negative secondary component of inadvertent interchange and the correspondingly assigned value to serve as debit to the receiving area and credit to the supplying area in which said negative secondary component appears as a part of the positive primary component of inadvertent interchange of said supplying area, and eighth means coupled to said sixth and seventh means for compiling all credits and debits for each area to establish the composite value during said designated time period of unscheduled interchanges of each of said areas with each of the other said areas of the interconnected system, thereby providing an overall evaluation of unscheduled interchange between each pair of areas of the interconnected system during a designated time span, and providing an incentive for improved operating reliability and economy of the interconnected system.

33. In an interconnected electric power system comprised of a plurality of control areas each operating under a frequency and net interchange schedule, and each having the output of at least one turbine-generator unit automatically regulated with a frequency-biased net interchange control system, the method of measuring the control performance of a particular control area during a designated time span, the improvement comprising the following steps:

generating a first signal representing the magnitude and sign of the system time deviation accumulated during said designated time span;

generating a second signal representing the magnitude and sign of the inadvertent interchange of said particular control area accumulated during said designated time span;

generating a third signal representing the frequency-bias setting utilized by said particular control area during said designated time span;

generating a fourth signal representing the sum of the frequency-bias settings utilized by all control areas during said designated time span; and combining said first, second, third and fourth signals to produce, separate and measure the magnitude and sign of at least one of two fifth signals corresponding to two new parameters, linearly related to each other, one in dimensions of time deviation representative of a component of system time deviation, the other in dimensions of energy representative of a component of the inadvertent interchange of said particular control area, both of said components having been uniquely and simultaneously caused by the regulating deficiencies of said particular control area during said designated time span, either component therefore constituting a quantitive measure of the control performance of said particular control area during said designated time span.

34. The method of claim 33 further comprising measurement of the effect of regulating deficiencies in said particular control area during said designated time span on the inadvertent interchange of a designated remote control area, including the following steps:

generating a sixth signal representing the frequency-bias setting utilized by said designated remote control area during said designated time span; and combining said third, fourth, and sixth signals and the fifth signal having dimensions of energy to produce, separate, and measure the magnitude and sign of a seventh signal corresponding to a third new parameter, in dimensions of energy, representative of the component of inadvertent interchange at said designated remote control area caused uniquely by the regulating deficiencies of said particular control area during said designated time span.

35. The method of claim 33, further comprising utilization of said new parameter representative of a component of system time deviation caused by the regulating deficiencies of said particular control area to provide simultaneous corrective control for said component of system time deviation, for said component of the inadvertent interchange of said particular area, and for the components of the inadvertent interchange of all remote areas caused by the regulating deficiencies of said particular area, including the following steps:

offsetting the frequency portion of said frequency and net interchange schedule in said particular area to an extent that is a function of said new parameter;

automatically adjusting by action of the frequency-biased net interchange control system in said particular area the input to, and thereby altering the generation output from, one or more of the turbine-generator units in said particular area to simultaneously reduce toward zero the component of system time deviation, the component of the inadvertent interchange of said particular area and the components of inadvertent interchange of all remote areas caused by the regulating deficiencies in said particular area during said designated time span.

36. The method of claim 33, further comprising utilization of said new parameter representative of a component of the inadvertent interchange of said particular control area caused by the regulating deficiencies of said particular control area to provide simultaneous corrective control for said component of the inadvertent interchange of said particular control area, for said component of system time deviation, and for the components of the inadvertant interchange of all remote areas caused by the regulating deficiencies of said particular area, including the following steps:

offsetting the net interchange portion of said frequency and net interchange schedule in said particular area to an extent that is a function of said new parameter;

automatically adjusting by action of the frequency-biased net interchange control system in said particular area, the input to, and thereby altering the generation output from one or more of the turbine-generator units in said particular area to reduce toward zero the component of the inadvertent interchange of said particular area, the component of system time deviation of said particular area, and the components of inadvertent interchange of all remote areas caused by the regulating deficiencies in said particular area during said designated time span.

37. The method of claim 35, in which the step of offsetting the frequency portion of the frequency and net interchange schedule in said particular area includes generating an additional signal representing a selected time span within which the simultaneous corrective control is to be achieved, the offset in the frequency portion of said frequency and net interchange schedule then being a function of said new parameter and said selected time span.

38. The method of claim 36, in which the step of offsetting the net interchange portion of the frequency and net interchange schedule in said particular area includes generating an additional signal representing a selected time span within which the simultaneous corrective control is to be achieved, the offset in the net interchange portion of said frequency and net interchange schedule then being a function of said new parameter and said selected time span.

39. The method of claim 34 further comprising the measurement and evaluation of unscheduled energy transferred between areas, including the following steps:

assigning incremental values to components of inadvertent interchange energy sent to each remote area by each particular area during said designated time span as a result of regulating deficiencies in each said particular area, and assigning incremental values to components of inadvertent interchange energy received at each particular area from each remote area during said designated time span as a result of regulating deficiencies in each said particular area, not all values for energy sent out being necessarily the same for all areas, nor the values for energy received being necessarily the same for all areas;

determining the product of each such component supplied by each said particular area to each said remote area and the correspondingly assigned value to serve as credit to the supplying area and debit to the receiving area;

determining the product of each such component received by each said particular area from each said remote area and the correspondingly assigned value to serve as debit to the receiving area and credit to the supplying area; and compiling all credits and debits for each area to establish the composite value during said designated time span of unscheduled interchanges of each of said particular areas with each of said remote areas, thereby providing an overall evaluation of unscheduled interchange between each pair of areas of the interconnected system during a designated time span, and providing an incentive for improved operating reliability and economy of the interconnected system.

40. The method of claim 33 wherein the step of combining said first, second, third and fourth signals to produce, separate and measure the magnitude and sign of the fifth signal corresponding to the new parameter representative of a component of system time deviation, includes the step of computing $\epsilon_n$ from the equation:

$$\epsilon_n = -\frac{360}{B_s F_r}(I_n - \frac{B_n F_r \epsilon}{360})$$

where, $\epsilon$ is the system time deviation, in seconds, accumulated during the designated time span;

$I_n$ is the inadvertent interchange, in MWH, accumulated in the particular control area, area n, during the designated time span, and is plus for energy out;

$B_s$ is the sum, in MW/0.1 Hz, of all area frequency bias settings, and has a minus sign;

$B_n$ is the frequency bias setting, in MW/0.1 Hz, of the particular control area, and has a minus sign;

$F_r$ is the system reference frequency in Hz;

$\epsilon_n$ is the new parameter, in seconds, representing the component of system time deviation caused by regulating deficiencies in the particular control area during the designated time span.

41. The method of claim 33, wherein the step of combining said first, second, third and fourth signals to produce, separate and measure the magnitude and sign of the fifth signal corresponding to the new parameter representative of the component of inadvertent interchange of said particular area, includes the step of computing $I_{nn}$ from the equation:

$$I_{nn} = (1 - Y_n)(I_n - \frac{B_n F_r \epsilon}{360})$$

where, $B_n$ is the frequency-bias setting in MW/0.1 Hz of area n, and has a minus sign;

$Y_n$ is the ratio of $B_n$ to the sum of all area frequency bias settings, $B_s$, in MW/0.1 Hz;

$\epsilon$ is the system time deviation, in seconds, accumulated during the designated time span;

$I_n$ is the inadvertent interchange, in MWH, accumulated in the particular area during the designated time span, and is plus for energy out;

$F_r$ is the system reference frequency, in Hz; and $I_{nn}$ is the new parameter, in MWH, representing the component of inadvertent interchange of area n caused by its own regulating deficiencies during the designated time span.

42. The method of claim 34 wherein the step of combining said third, fourth and sixth signals and the fifth signal having dimensions of energy to produce, separate and measure the magnitude and sign of a seventh signal corresponding to a third new parameter representative of the component of inadvertent interchange at a designated remote area, includes the step of computing $I_{in}$ from the equation:

$$I_{in} = -\frac{Y_i}{1 - Y_n}(I_{nn})$$

where, $Y_i$ is the ratio of the frequency bias setting, $B_i$, of remote area i to the sum of frequency bias settings, $B_s$, for all areas;

$Y_n$ is the ratio of the frequency bias setting, $B_n$ of the particular area, area n, to the sum of frequency bias settings, $B_s$, for all areas;

$I_{nn}$ is the component, in MWH, representing the component of inadvertent interchange of area n caused by its own regulating deficiencies during the designated time span; and $I_{in}$ is the new parameter; in MWH, representing the component of inadvertent interchange in remote area i caused by regulating deficiencies in area n during the designated time span.

43. The method of claim 37 wherein the step of applying automatic corrective control to the generation of the particular area, area n, by offsetting the frequency portion of the frequency biased net interchange control system schedule, includes the step of computing $\hat{\phi}_n$ from the equation:

$$\hat{\phi}_n = -\frac{F_r \epsilon_n}{3600 Y_n H_n}$$

where,
$Y_n$ is the ratio of the area n frequency bias setting, $B_n$, to the sum of all area frequency bias settings, $B_s$;
$F_r$ is the system reference frequency in Hz;
$H_n$ is the selected time span, in hours, during which the corrective control action is to take place;
$\epsilon_n$ is the new parameter, area n component of system time deviation, in seconds; and
$\hat{\phi}_n$ is the offset, in Hz, in the frequency portion of the area n frequency and net interchange schedule to achieve in selected time span $H_n$ simultaneous corrective control of the area n component of system time deviation, the component of area n inadvertent interchange and the component of inadvertent interchange in each remote area caused by the regulating deficiencies in area n during said designated time span.

44. The method of claim 38 wherein the step of applying automatic corrective control to the generation of the particular area, area n, by offsetting the net interchange portion of the frequency biased net interchange control system schedule, includes the step of computing $\hat{\tau}_n$ from the equation:

$$\hat{\tau}_n = \frac{-I_{nn}}{(1 - Y_n)(H_n)}$$

where,
$Y_n$ is the ratio of the area n frequency bias setting, $B_n$, to the sum of all area frequency bias settings, $B_s$;
$H_n$ is the selected time span, in hours, during which the corrective control action is to take place;
$I_{nn}$ is the new parameter, the component of area n inadvertent interchange caused by its own regulating deficiencies; and
$\hat{\tau}_n$ is the offset, in MW, in the net interchange portion of the area n frequency and net interchange schedule to achieve in selected time span $H_n$ simultaneous corrective control of the component of area n inadvertent interchange caused by the regulating deficiencies in area n during the designated time span, the area n component of system time deviation caused by the regulating deficiencies in area n during the designated time span, and the component of inadvertent interchange in each of the remote areas caused by the regulating deficiencies in area n during the designated time span.

45. In an interconnected electric power system comprising of a plurality of control areas each operating under a frequency and net interchange schedule, and each having the output of at least one turbine-generator unit automatically regulated with a frequency-biased net interchange control system, the improvement comprising means for measuring the control performance of a particular control area during a designated time span, including the following:
first means responsive to the magnitude and sign of the system time deviation accumulated during said designated time span;
second means coupled to said first means responsive to the magnitude and sign of the inadvertent interchange of said particular control area accumulated during said designated time span;
third means coupled to said second means responsive to the frequency-bias setting utilized by said particular control area during said designated time span;
fourth means coupled to said third means responsive to the sum of frequency-bias settings utilized by all control areas during said designated time span; and
fifth means coupled to said fourth means for producing and measuring the magnitude and sign of at least one of two new parameters, linearly related to each other, the first new parameter having dimensions of time deviation and being representative of a component of system time deviation, the second new parameter having dimensions of energy and being representative of a component of the inadvertent interchange of said particular control area, both of said new components having been uniquely and simultaneously caused by the regulating deficiencies of said particular control area during said designated time span, either component therefore constituting a quantitative measure of the control performance of said particular control area during said designated time span.

46. The system of claim 45 further comprising measurement of the effect of regulating deficiencies in said particular control area during said designated time span on the inadvertent interchange of a designated remote control area, including the following:
sixth means coupled to said fifth means responsive to the frequency-bias setting utilized by said designated remote control area during said designated time span; and
seventh means coupled to said sixth means for producing and measuring the magnitude and sign of a third new parameter having dimensions of energy, representative of the component of inadvertent interchange at said designated remote control area caused uniquely by the regulating deficiencies of said particular control area during said designated time span.

47. The system of claim 45, further comprising utilization of said first new parameter representative of the component of system time deviation caused by the regulating deficiencies of said particular control area to provide simultaneous corrective control for said component of system time deviation, for said component of the inadvertent interchange of said particular area, and for the components of the inadvertent interchange of all remote areas caused by the regulating deficiencies of said particular area, including the following:
sixth means coupled to said fifth means for offsetting the frequency portion of said frequency and net interchange schedule in said particular area to an extent that is a function of said first new parameter; and
seventh means coupled to said sixth means for automatically adjusting by action of the frequency-biased net interchange control system in said particular area the input to, and thereby altering the generation output from, one or more of the turbine-generator units in said particular area to simultaneously reduce toward zero the component of system time deviation, the component of the inadvertent interchange of said particular area and the components of inadvertent interchange of all remote areas caused by the regulating deficiencies in said particular area during said designated time span.

48. The system of claim 45 further comprising utilization of said second new parameter representative of the component of the inadvertent interchange of said particular control area caused by the regulating deficiencies of said particular control area to provide simultaneous corrective control for said component of the inadvertent interchange of said particular control area, for said component of system time deviation, and for the components of the inadvertent interchange of all remote areas caused by the regulating deficiences of said particular area, including the following:

sixth means coupled to said fifth means for offsetting the net interchange portion of said frequency and net interchange schedule in said particular area to an extent that is a function of said second new parameter; and seventh means coupled to said sixth means for automatically adjusting by action of the frequency-biased net interchange control system in said particular area the input to, and thereby altering the generation output from, one or more of the turbine-generator units in said particular area to simultaneously reduce toward zero the component of the inadvertent interchange in said particular area, the component of system time deviation of said particular area, and the components of all remote areas caused by the regulating deficiencies in said particular area during said designated time span.

49. The system of claim 47, to which there is added the following:

eighth means coupled to said sixth means for selecting and setting the time span within which the simultaneous corrective control initiated by said seventh means is to be achieved, the offset in the frequency portion of said frequency and net interchange schedule then being a function of said first new parameter and said selected time span.

50. The system of claim 48 to which there is added the following:

eighth means coupled to said sixth means for selecting and setting the time span within which the simultaneous corrective control initiated by said seventh means is to be achieved, the offset in the net interchange portion of said frequency and net interchange schedule then being a function of said second new parameter and said selected time span.

51. The system of claim 46 further comprising the measurement and evaluation of unscheduled energy transferred between areas, including the following:

eighth means coupled to said seventh means to select and assign incremental values to components of inadvertent interchange sent to each remote area by each particular area during said designated time span as a result of regulating deficiencies in each said particular area, and to select and assign incremental values to components of inadvertent interchange received at each particular area from each remote area during said designated time span as a result of regulating deficiencies in each said particular area, not all values for energy sent out being necessarily the same for all areas, nor the values for energy received being necessarily the same for all areas;

ninth means coupled to said eighth means to determine the product of each such component supplied by each said particular area to each said remote area and the correspondingly assigned value to serve as credit to the particular area and debit to the remote area;

tenth means coupled to said eighth means to determine the product of each such component received by a particular area from each said remote area and the correspondingly assigned value to serve as debit to the particular area and credit to the remote area;

eleventh means coupled to said ninth and tenth means to compile all credits and debits for each area to establish the composite value during said designated time span of unscheduled interchanges of each of said particular areas with each of said remote areas thereby providing an overall evaluation of unscheduled interchange between each pair of areas of the interconnected system during a designated time span, and providing an incentive for improved operating reliability and economy of the interconnected system.

52. The system of claim 45, wherein said fifth means for producing and measuring the magnitude and sign of said first new parameter of said particular area, area n, includes means for solving the equation:

$$\epsilon_n = -\frac{360}{B_s F_r}(I_n - \frac{B_n F_r \epsilon}{360})$$

where, $\epsilon$ is the system time deviation, in seconds, accumulated during the designated time span;

$I_n$ is the inadvertent interchange, in MWH, accumulated in the particular control area, area n, during the designated time span, and is plus for energy out;

$B_s$ is the sum, in MW/0.1 Hz, of all area frequency bias settings, and has a minus sign;

$B_n$ is the frequency bias setting, in MW/0.1 Hz, of the particular control area, and has a minus sign;

$F_r$ is the system reference frequency in Hz;

$\epsilon_n$ is the new parameter, in seconds, representing the component of system time deviation caused by regulating deficiencies in the particular control area during the designated time span.

53. The system of claim 45, wherein said fifth means for producing and measuring the magnitude and sign of said second new parameter of said particular area, area n, includes means for solving the equation:

$$I_{nn} = (1 - Y_n)(I_n - \frac{B_n F_r \epsilon}{360})$$

where, $B_n$ is the frequency-bias setting in MW/0.1 Hz of area n, and has a minus sign;

$Y_n$ is the ratio of $B_n$ to the sum of all area frequency bias settings, $B_s$, in MW/0.1 Hz;

$\epsilon$ is the system time deviation, in seconds, accumulated during the designated time span;

$I_n$ is the inadvertent interchange, in MWH, accumulated in the particular area during the designated time span, and is plus for energy out;

$F_r$ is the system reference frequency, in Hz; and $I_{nn}$ is the new parameter, in MHW, representing the component of inadvertent interchange of area n caused by its own regulating deficiencies during the designated time span.

54. The system of claim 46 wherein said seventh means for producing and measuring the magnitude and sign of said third new parameter of said remote area, area i, includes means for solving the equation:

$$I_{in} = -\frac{Y_i}{1 - Y_n}(I_{nn})$$

where,
- $Y_i$ is the ratio of the frequency bias setting, $B_i$, of remote area i to the sum of frequency bias settings, $B_s$, for all areas;
- $Y_n$ is the ratio of the frequency bias setting, $B_n$ of the particular area, area n, to the sum of frequency bias settings, $B_s$, for all areas;
- $I_{nn}$ is the component, in MWH, representing the component of inadvertent interchange of area n caused by its own regulating deficiencies during the designated time span; and
- $I_{in}$ is the new parameter, in MWH, representing the component of inadvertent interchange in remote area i caused by regulating deficiencies in area n during the designated time span.

55. The system of claim 49 wherein said sixth means coupled to said seventh and eighth means for applying automatic control to the generation of the particular area, area n, by offsetting the frequency portion of the frequency biased net interchange control system schedule, includes means for solving the equation:

$$\phi_n = -\frac{F_r \epsilon_n}{3600 Y_n H_n}$$

where,
- $Y_n$ is the ratio of the area n frequency bias setting, $B_n$, to the sum of all area frequency bias settings, $B_s$;
- $F_r$ is the system reference frequency in Hz;
- $H_n$ is the selected time span, in hours, during which the corrective control action is to take place;
- $\epsilon_n$ is the new parameter, area n component of system time deviation, in seconds; and
- $\phi_n$ is the offset, in Hz, in the frequency portion of the area n frequency and net interchange schedule to achieve in selected time span $H_n$ simultaneous corrective control of the area n component of system time deviation, the component of area n inadvertent interchange and the component of inadvertent interchange in each remote area caused by the regulating deficiencies in area n during said designated time span.

56. The system of claim 50, wherein said sixth means coupled to said seventh and eighth means for applying automatic control to the generation of the particular area, area n, by offsetting the net interchange portion of the frequency biased net interchange schedule, includes means for solving the equation:

$$\hat{\tau}_n = \frac{-I_{nn}}{(1 - Y_n)(H_n)}$$

where,
- $Y_n$ is the ratio of the area n frequency bias setting, $B_n$, to the sum of all area frequency bias settings, $B_s$;
- $H_n$ is the selected time span, in hours, during which the corrective control action is to take place;
- $I_{nn}$ is the new parameter, the component of area n inadvertent interchange caused by its own regulating deficiencies; and
- $\hat{\tau}_n$ is the offset, in MW, in the net interchange portion of the area n frequency and net interchange schedule to achieve in selected time span $H_n$ simultaneous corrective control of the component of area n inadvertent interchange caused by the regulating deficiencies in area n during the designated time span, the area n component of system time deviation caused by the regulating deficiencies in area n during the designated time span, and the component of inadvertent interchange in each of the remote areas caused by the regulating deficiencies in area n during the designated time span.

57. In an interconnected electric power system comprised of a plurality of control areas each operating under a frequency and net interchange schedule, and each having the output of at least one turbine-generator unit automatically regulated with a frequency-biased net interchange control system, the method of applying corrective control unilaterally in a particular control area to at least one said turbine-generator unit to correct for the regulating deficiencies accumulated in said particular control area during a designated time period, to provide thereby simultaneous control for the component of system time deviation caused by said particular control area, for the component of inadvertent interchange of said particular control area caused by said particular control area, and for the components of inadvertent interchange of all remote areas caused by said particular control area, doing so regardless of any concurrent corrective control or lack of it in other control areas, and eliminating the need for said particular control area to participate in the practice of achieving corrective control of system time deviation by system-wide offset of the frequency portion of said frequency and net interchange schedule of each area in proportion to total system time deviation, or in the separate practice of an individual area undertaking to correct for the total inadvertent interchange of said individual area by unilaterally or in concert with at least one other area offsetting the net interchange portion of said frequency and net interchange schedule in proportion to said total inadvertent interchange, the improvement including the following steps:

offsetting the frequency portion of said frequency and net interchange schedule in said particular control area to an extent that is a function of said component of system time deviation;

generating control signals in said particular control area by action of the frequency-biased net interchange control system in said particular area to automatically adjust the input to, and alter the generation output from, one or more turbine-generator units in said particular control area, thereby reducing toward zero the component of system time deviation of said particular control area, the component of inadvertent interchange of said particular control area, and the components of inadvertent interchange of all remote area caused by the regulating deficiencies in said particular area during said designated time span.

58. The method of claim 57 wherein the step of applying corrective control to the generation of the particular control area, area n, by offsetting the frequency portion of the frequency and net interchange schedule, includes the step of computing $\phi_n$ from the equation:

$$\phi_n = -\frac{F_r \epsilon_n}{3600 Y_n H_n}$$

where, $Y_n$ is the ratio of the area n frequency bias setting, $B_n$, to the sum of all area frequency bias settings, $B_s$;

$F_r$ is the system reference frequency in Hz;

$H_n$ is the selected time span, in hours, during which the corrective control action is to take place;

$\epsilon_n$ is the new parameter, area n component of system time deviation, in seconds; and $\phi_n$ is the offset, in Hz, in the frequency portion of the area n frequency and net interchange schedule to achieve in selected time span $H_n$ simultaneous corrective control of the area n component of system time deviation, the component of area n inadvertent interchange and the component of inadvertent interchange in each remote area caused by the regulating deficiencies in area n during said designated time span.

59. In an interconnected electric power system comprised of a plurality of control areas each operating under a frequency and net interchange schedule, and each having the output of at least one turbine-generator unit automatically regulated with a frequency-biased net interchange control system, the method of applying corrective control unilaterally in a particular control area to at least one said turbine-generator unit to correct for the regulating deficiencies accumulated in said particular control area during a designated time period, to provide thereby simultaneous control for the component of system time deviation caused by said particular control area, for the component of inadvertent interchange of said particular control area caused by said particular control area, and for the components of inadvertent interchange of all remote areas caused by said particular control area, doing so regardless of any concurrent corrective control or lack of it in other control areas, and eliminating the need for said particular control area to participate in the practice of achieving corrective control of system time deviation by system-wide offset of the frequency portion of said frequency and net interchange schedule of each area in proportion to total system time deviation, or in the separate practice of an individual area undertaking to correct for the total inadvertent interchange of said individual area by unilaterally or in concert with at least one other area offsetting the net interchange portion of said frequency and net interchange schedule in proportion to said total inadvertent interchange, the improvement including the following steps:

offsetting the net interchange portion of said frequency and net interchange schedule in said particular control area to an extent that is a function of said component of inadvertent interchange of said particular control area;

generating control signals in said particular control area by action of the frequency-biased net interchange control system in said particular area to automatically adjust the input to, and alter the output from, one or more turbine-generator units in said particular control area, thereby reducing toward zero the component of inadvertent interchange of said particular control area, the component of system time deviations of said particular control area, and the components of inadvertent interchange of all remote areas caused by the regulating deficiencies in said particular area during said designated time span.

60. The method of claim 59 wherein the step of applying automatic corrective control to the generation of the particular area, area n, by offsetting the net interchange portion of the frequency and net interchange schedule, includes the step of computing $\hat{\tau}_n$ from the equation:

$$\hat{\tau}_n = \frac{-I_{nn}}{(1 - Y_n)(H_n)}$$

where, $Y_n$ is the ratio of the area n frequency bias setting, $B_n$, to the sum of all area frequency bias settings, $B_s$, $H_n$ is the selected time span, in hours, during which the corrective control action is to take place;

$I_{nn}$ is the new parameter, the component of area n inadvertent interchange caused by its own regulating deficiencies; and $\hat{\tau}_n$ is the offset, in MW, in the net interchange portion of the area n frequency and net interchange schedule to achieve in selected time span $H_n$ simultaneous corrective control of the component of area n inadvertent interchange caused by the regulating deficiencies in area n during the designated time span, the area n component of system time deviation caused by the regulating deficiencies in area n during the designated time span, and the component of inadvertent interchange in each of the remote areas caused by the regulating deficiencies in area n during the designated time span.

61. In an interconnected electric power system comprised of a plurality of control areas each operating under a frequency and net interchange schedule, and each having the output of at least one turbine-generator unit automatically regulated with a frequency-biased net interchange control system, means for applying corrective control unilaterally in a particular control area to at least one said turbine-generator unit to correct for the regulating deficiencies accumulated in said particular control area during a desigated time period, to provide thereby simultaneous control for the component of system time deviation caused by said particular area, for the component of inadvertent interchange of said particular area caused by said particular area, and for the components of inadvertent interchange of all remote areas caused by said particular area, doing so regardless of any concurrent corrective control or lack of it in other control areas, and eliminating the need for said particular control area to participate in the practice of achieving corrective control of system time deviation by system-wide offset of the frequency portion of said frequency and net interchange schedule of each area in proportion to total system time deviation, or in the separate practice of an individual area undertaking to correct for the total inadvertent interchange of said individual area by unilaterally or in concert with at least one other area offsetting the net interchange portion of said frequency and net interchange schedule in proportion to said total inadvertent interchange, the improvement including the following:

first means for offsetting the frequency portion of said frequency and net interchange schedule in said particular area to an extent that is a function of the component of system time deviation caused by said regulating deficiencies accumulated in said particular control area;

second means coupled to said first means for automatically adjusting by action of the frequency-biased net interchange control system in said particular area the input to, and thereby altering the generation output from, one or more of the turbine-generator units in said particular area to simultaneously reduce towards zero the component of system time deviation, the component of inadvertent interchange of said particular area and the components of inadvertent interchange of all remote areas caused by the regulating deficiencies of said particular area during said designated time span.

62. The system of claim 61, wherein said first means coupled to said second means for applying automatic control to the generation of the particular area, area n, by offsetting the frequency portion of the frequency-biased net interchange control system schedule, includes means for solving the equation:

$$\hat{\phi}_n = -\frac{F_r \epsilon_n}{3600 Y_n H_n}$$

where, $Y_n$ is the ratio of the area n frequency bias setting, $B_n$, to the sum of all area frequency bias settings, $B_s$;

$F_r$ is the system reference frequency in Hz;

$H_n$ is the selected time span, in hours, during which the corrective control action is to take place;

$\epsilon_n$ is the new parameter, area n component of system time deviation, in seconds; and $\hat{\phi}_n$ is the offset, in Hz, in the frequency portion of the area n frequency and net interchange schedule to achieve in selected time span $H_n$ simultaneous corrective control of the area n component of system time deviation, the component of area n inadvertent interchange and the component of inadvertent interchange in each remote area caused by the regulating deficiencies in area n during said designated time span.

63. In an interconnected electric power system comprised of a plurality of control areas each operating under a frequency and net interchange schedule, and each having the output of at least one turbine-generator unit automatically regulated with a frequency-biased net interchange control system, means for applying corrective control unilaterally in a particular control area to at least one said turbine-generator unit to correct for the regulating deficiencies accumulated in said particular control area during a designated time period, to provide thereby simultaneous control for the component of time deviation caused by said particular area, for the component of inadvertent interchange of said particular area caused by said particular area, and for the components of inadvertent interchange of all remote areas caused by said particular area, doing so regardless of any concurrent corrective control or lack of it in other control areas, and eliminating the need for said particular control area to participate in the practice of achieving corrective control of system time deviation by system-wide offset of the frequency portion of said frequency and net interchange schedule of each area in proportion to total system time deviation, or in the separate practice of an individual area undertaking to correct for the total inadvertent interchange of said individual area by unilaterally or in concert with at least one other area offsetting the net interchange portion of said frequency and net interchange schedule in proportion to said total inadvertent interchange, the improvement including the following:

first means for offsetting the net interchange portion of said frequency and net interchange schedule in said particular area to an extent that is a function of the component of inadvertent interchange caused by said regulating deficiencies accumulated in said particular control area;

second means coupled to said first means for automatically adjusting by action of the frequency-biased net interchange control system in said particular area the input to, and thereby altering the generation output from, one or more of the turbine-generator units in said particular area to simultaneously reduce toward zero the component of inadvertent interchange of said particular area, the component of system time deviation, and the components of inadvertent interchange of all remote areas caused by the regulating deficiencies of said particular area during said designated time span.

64. The system of claim 63 wherein said first means coupled to said second means for applying automatic control to the generation of the particular area, area n, by offsetting the net interchange portion of the frequency-biased net interchange control system schedule includes means for solving the equation:

$$\hat{\tau}_n = \frac{-I_{nn}}{(1 - Y_n)(H_n)}$$

where, $Y_n$ is the ratio of the area n frequency bias setting, $B_n$, to the sum of all area frquency bias settings, $B_s$;

$H_n$ is the selected time span, in hours during which the corrective control action is to take place;

$I_{nn}$ is the new parameter, the component of area n inadvertent interchange caused by its own regulating deficiencies; and $\tau_n$ is the offset, in MW, in the net interchange portion of the area n frequency and net interchange schedule to achieve in selected time span $H_n$ simultaneous corrective control of the component of area n inadvertent interchange caused by the regulating deficiencies in area n during the designated time span, the area n component of system time deviation caused by the regulating deficiencies in area n during the designated time span, and the component of inadvertent interchange in each of the remote areas caused by the regulating deficiencies in area n during the designated time span.

* * * * *